US009449750B2

(12) United States Patent
Francoeur et al.

(10) Patent No.: US 9,449,750 B2
(45) Date of Patent: Sep. 20, 2016

(54) ELECTRICAL TRANSFORMER ASSEMBLY

(71) Applicant: HYDRO-QUEBEC, Montreal (CA)

(72) Inventors: Bruno Francoeur, Beloeil (CA); Pierre Couture, Boucherville (CA)

(73) Assignee: HYDRO-QUEBEC, Montreal (CA)

( * ) Notice: Subject to any disclaimer, the term of this patent is extended or adjusted under 35 U.S.C. 154(b) by 0 days.

(21) Appl. No.: 14/961,001

(22) Filed: Dec. 7, 2015

(65) Prior Publication Data
US 2016/0086712 A1    Mar. 24, 2016

Related U.S. Application Data

(63) Continuation of application No. 13/510,943, filed as application No. PCT/CA2010/001845 on Nov. 18, 2010, now Pat. No. 9,208,933.

(60) Provisional application No. 61/262,603, filed on Nov. 19, 2009.

(51) Int. Cl.
*H01F 27/06* (2006.01)
*H01F 27/26* (2006.01)
*H01F 27/24* (2006.01)
(Continued)

(52) U.S. Cl.
CPC ............ *H01F 27/06* (2013.01); *C21D 8/0205* (2013.01); *C21D 8/125* (2013.01); *C21D 8/1272* (2013.01); *C21D 9/573* (2013.01); *C22C 38/02* (2013.01); *C22C 45/02* (2013.01); *F28D 21/00* (2013.01); *H01F 7/00* (2013.01); *H01F 27/00* (2013.01); *H01F 41/02* (2013.01); *H05B 6/105* (2013.01); *H05B 6/145* (2013.01); *C21D 2201/03* (2013.01);

*F28D 11/02* (2013.01); *Y02P 10/253* (2015.11); *Y10T 29/49071* (2015.01); *Y10T 29/5187* (2015.01)

(58) Field of Classification Search
CPC ...................................................... F28D 11/02
USPC ................... 336/65, 67, 210, 211; 29/605
See application file for complete search history.

(56) References Cited

U.S. PATENT DOCUMENTS

| 3,128,443 A | 4/1964 | Herman et al. |
| 3,662,308 A | 5/1972 | Muschong |

(Continued)

FOREIGN PATENT DOCUMENTS

| EP | 0318322 A1 | 5/1989 |
| EP | 0518565 A1 | 12/1992 |

(Continued)

*Primary Examiner* — Elvin G Enad
*Assistant Examiner* — Ronald Hinson
(74) *Attorney, Agent, or Firm* — Baker and Hostetler LLP

(57) ABSTRACT

A support frame for an electrical transformer assembly, comprising two loop-shaped parts, each loop-shaped part having a plurality of limbs, each limb having a peripheral recessed portion in which a primary electrical coil is mountable, and at least one secondary coil is mountable in piggyback on the primary electrical coil, one limb of each loop-shaped part having a straight section. The frame also includes an adjustable attaching means for attaching one of the loop-shaped parts with respect to the other loop-shaped part and adjusting a distance therebetween, so that only the straight sections are adjacent and form a central leg, the central leg being for receiving a magnetic core distinct from the attaching means. The frame provides a means and a method to efficiently secure adjacent windings in a circular core transformer kernel.

19 Claims, 47 Drawing Sheets

(51) Int. Cl.

| | |
|---|---|
| *H01F 7/06* | (2006.01) |
| *C21D 8/12* | (2006.01) |
| *C21D 9/573* | (2006.01) |
| *C22C 38/02* | (2006.01) |
| *C22C 45/02* | (2006.01) |
| *H01F 27/00* | (2006.01) |
| *H01F 41/02* | (2006.01) |
| *C21D 8/02* | (2006.01) |
| *F28D 21/00* | (2006.01) |
| *H01F 7/00* | (2006.01) |
| *H05B 6/10* | (2006.01) |
| *H05B 6/14* | (2006.01) |
| *F28D 11/02* | (2006.01) |

(56) References Cited

U.S. PATENT DOCUMENTS

| | | |
|---|---|---|
| 3,686,561 A | 8/1972 | Spreadbury |
| 3,774,298 A | 11/1973 | Eley |
| 4,024,486 A | 5/1977 | Klappert |
| 4,651,412 A | 3/1987 | Beisser |
| 4,781,348 A | 11/1988 | Cutforth et al. |
| 5,155,457 A | 10/1992 | Oda et al. |
| 5,168,255 A | 12/1992 | Poulsen |
| 5,227,745 A | 7/1993 | Oda et al. |
| 5,608,371 A | 3/1997 | Valencic et al. |
| 6,005,468 A | 12/1999 | Shirahata et al. |
| 6,249,204 B1 | 6/2001 | Larranaga et al. |
| 8,049,590 B2 | 11/2011 | Huh et al. |
| 2002/0057180 A1 | 5/2002 | Shirahata et al. |

FOREIGN PATENT DOCUMENTS

| | | |
|---|---|---|
| GB | 126271 | 3/1920 |
| JP | 4314422 Y1 | 6/1968 |
| JP | 55121624 A | 9/1980 |
| JP | 56119603 U | 9/1981 |
| JP | 57168954 U | 10/1982 |
| JP | 58502174 A | 12/1983 |
| JP | 06181135 A | 6/1994 |
| JP | 0851034 A | 2/1996 |
| JP | 2007035804 A | 2/2007 |
| JP | 2009188034 A | 8/2009 |

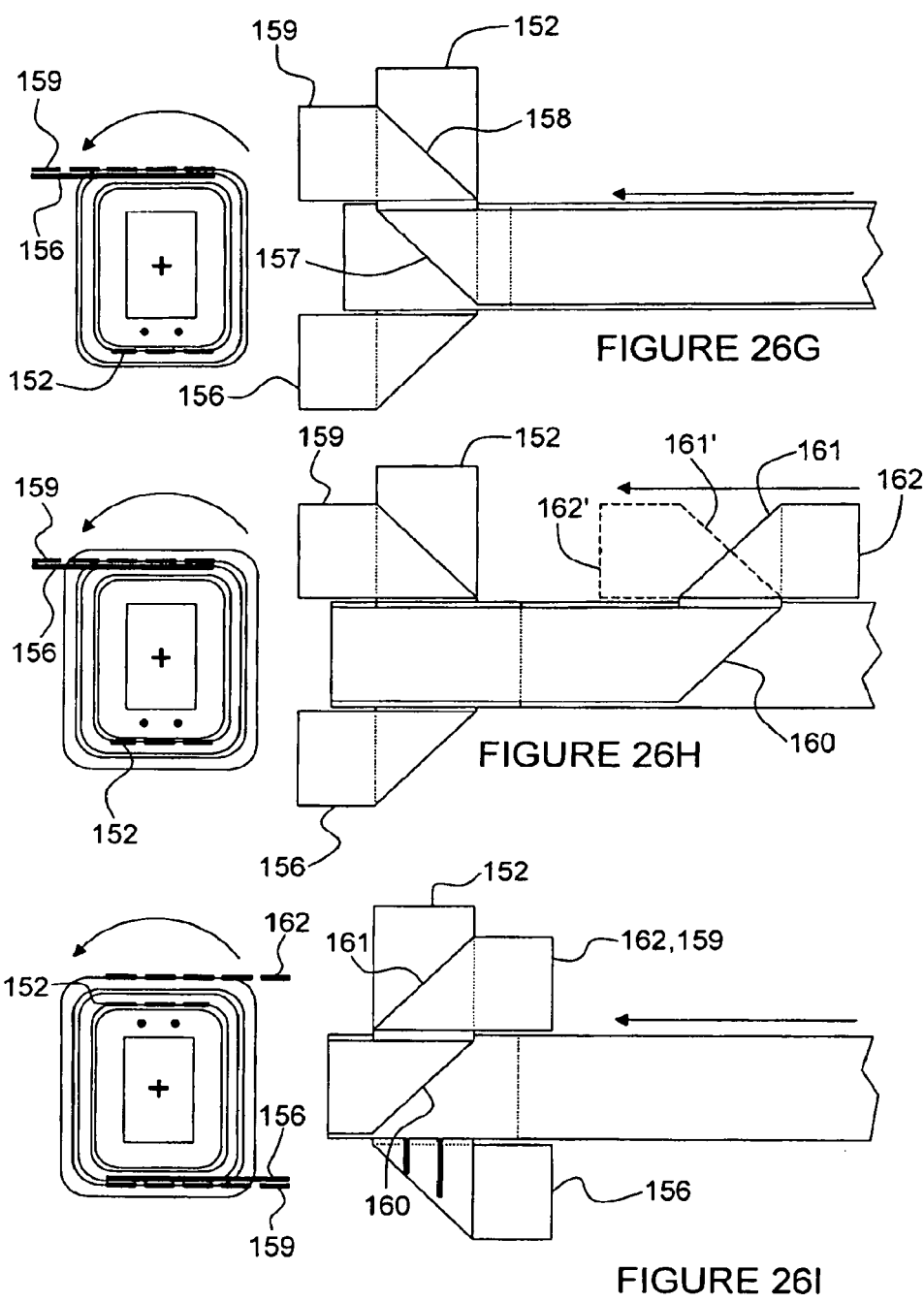

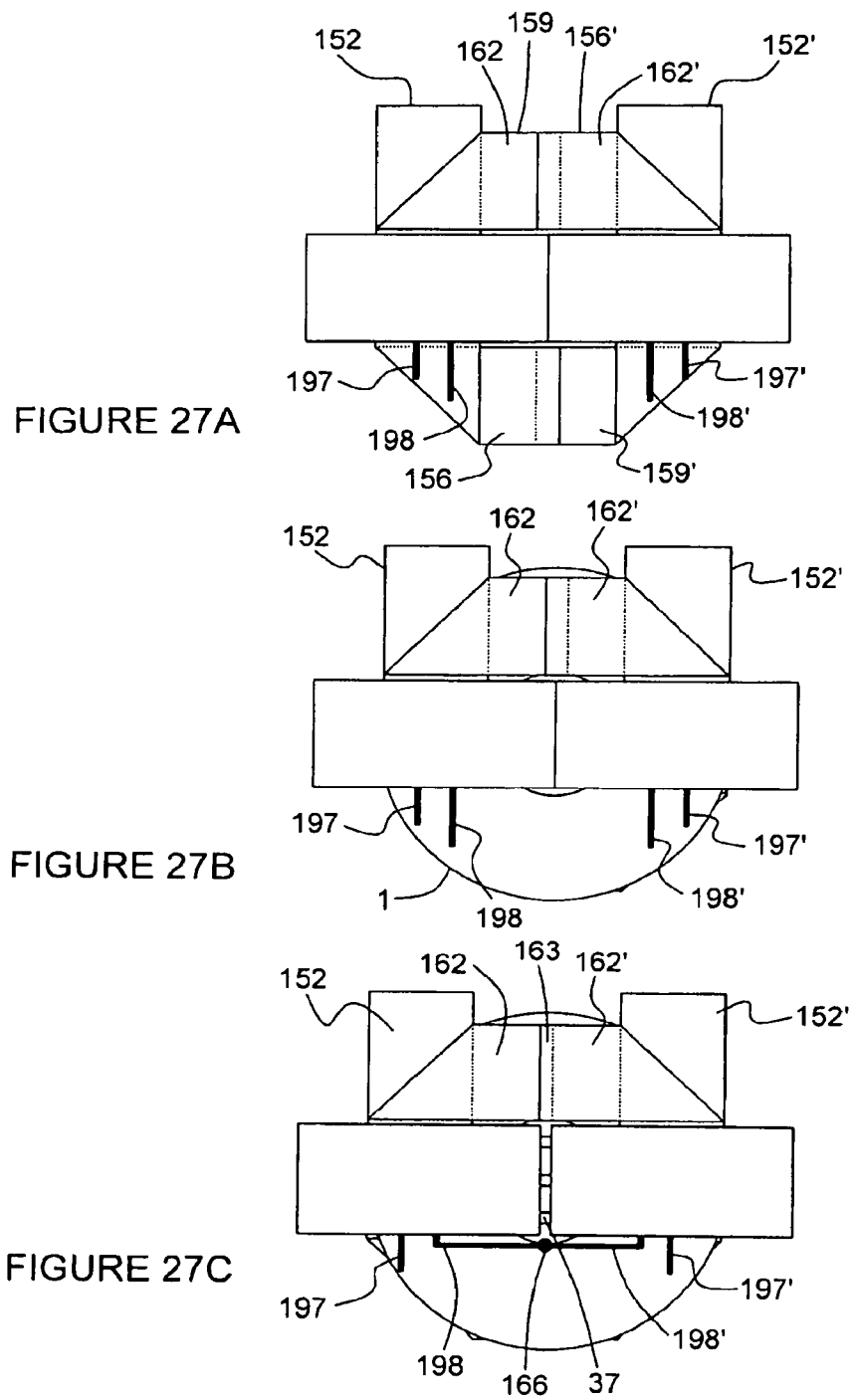

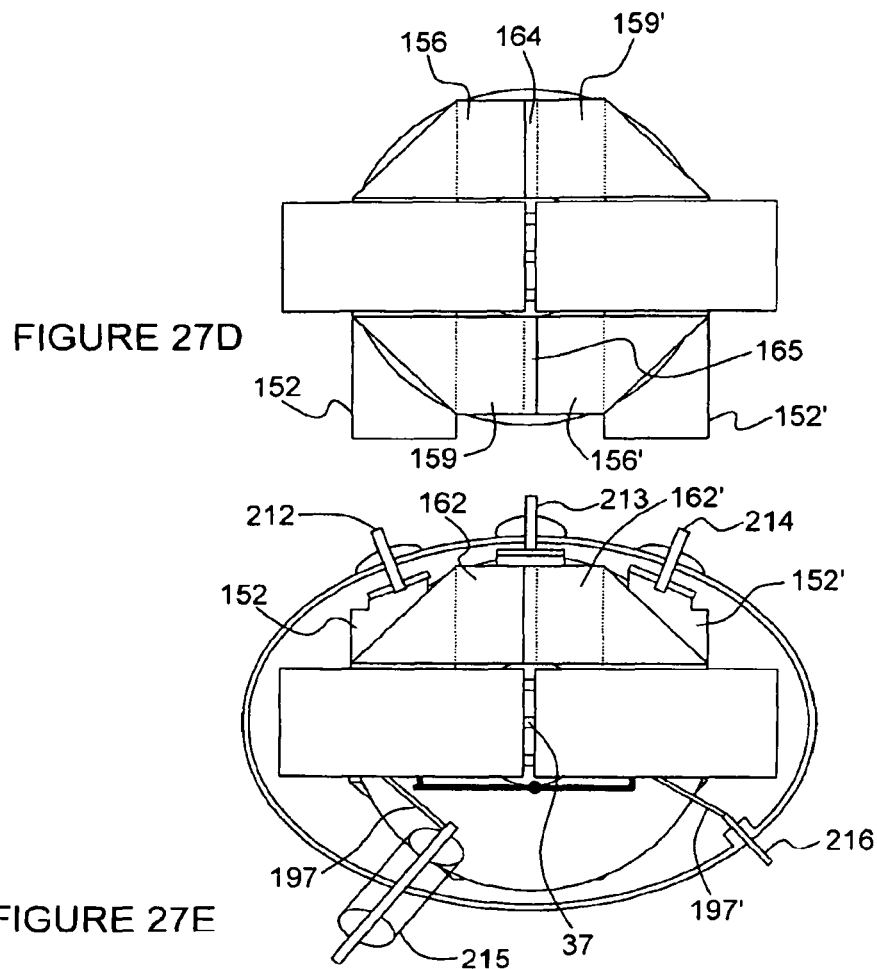
FIGURE 27D
FIGURE 27E
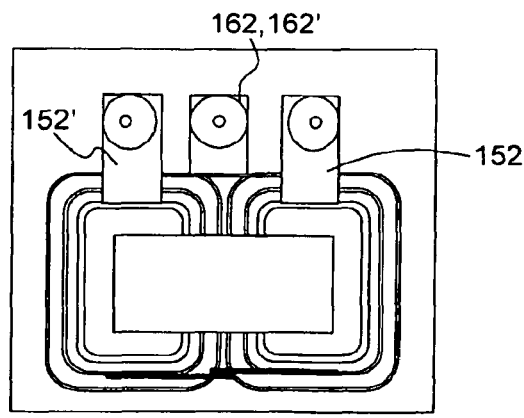
FIGURE 28

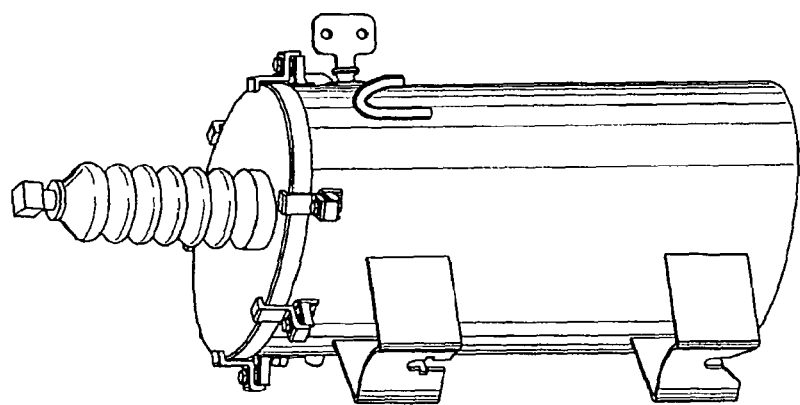
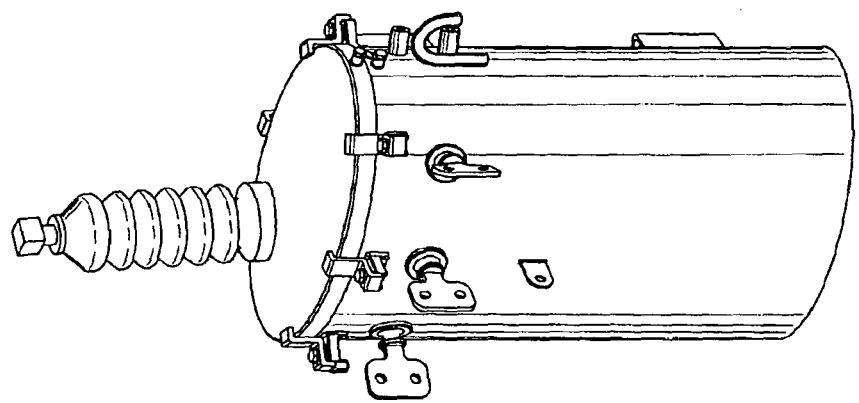
FIG. 42

ELECTRICAL TRANSFORMER ASSEMBLY

CROSS-REFERENCE TO RELATED APPLICATIONS

This application is a Continuation of U.S. patent application Ser. No. 13/510,943 filed Dec. 27, 2012, which is a National Stage of International Patent Application No. PCT/CA10/01845 filed Nov. 18, 2010, which further claims priority to U.S. Provisional Application No. 61/262,603 filed Nov. 19, 2009, the disclosures of which are incorporated by reference in their entirety.

FIELD OF THE INVENTION

The present invention relates to electrical transformers. More particularly, it relates to distribution transformers for use in an electrical grid. More particularly, it also relates to single phase and three-phase distribution transformers.

BACKGROUND OF THE INVENTION

Electricity is produced, transmitted and distributed at an oscillating frequency of 50 or 60 Hz. Transformers are electrical apparatus used for modifying electricity oscillating voltage and current. Because of the transformer, produced electricity can be transformed and transmitted at high voltage and low current over long distances with minimal joule loss before being transformed again to a lower voltage. Distribution transformers are located at the end of the power lines to reduce the voltage to usable values. Conventional distribution transformers comprise discrete primary and secondary electrical conducting coils each made by winding multiple loops of an electrical conductor while providing proper voltage insulation between loops. Both primary and secondary coils enlace a core made of a ferromagnetic alloy to create a path for a magnetic flux to circulate in a closed loop through both of said coils. When an oscillating voltage is applied across the leads of the primary coil, it induces a fluctuating magnetic flux in the core which, by reverse effect, induces back a voltage across the lead terminals of the secondary coil. The ferromagnetic property of the core allows an increase of the peak magnetic flux density induced by the coils in order to reduce the coils loop size and therefore to reduce the size of the transformer. The primary coil of a distribution transformer is on the high voltage side, and the secondary coil is on the low voltage side. More than one secondary coil may enlace the core to provide more than one low voltage.

For households and small plants which account for the majority of loads, most distribution transformers installed on the grid are single-phase units having a load capacity mostly ranging from 10 to 200 kVA. A typical primary voltage ranges between 5 to 30 kV, and the secondary voltage ranges from 110 volts to up to 480 volts. The coils and the core form an interlaced assembly and are generally attached in an enclosure filled with dielectric oil and which is equipped with feed-through bushings for electrically connecting the leads (an insulated electrical conductor connected to an electrical device) of the coils respectively to the power line and to the load. For purpose of clarity, the term "transformer kernel" in this document will refer to the coils and core assembly without the enclosure and accessories.

Two main types of transformer kernels are used for producing distribution transformers: shell-type and core-type. In the shell-type design, the return flux paths in the core are external to the enclosed coils. This is not the case for the core-type design. A single phase shell-type distribution transformer has two cores respectively enlaced around two distinct limbs of a single enclosed winding arrangement comprising the primary and secondary coils. Alternately, a single phase core-type transformer has two winding arrangements respectively enlaced around two limbs of a single enclosed core. If the distribution transformer has two secondary coils, typically for outputting 120/240 volts, then each secondary coil in the core-type design must be subdivided and distributed among both winding arrangements to ensure proper operation of the transformer under unbalanced loading; otherwise, excessive tank heating will result from magnetic flux leakage. Doing so requires making additional connections to link in series lead terminals from the sub-coils composing each secondary coil. Shell-type transformers may operate correctly with non-subdivided secondary coils. However, subdividing the secondary coils provides a balanced impedance for each 120-volt circuit, thus resulting in better voltage regulation, minimizes circulating current in the secondary coils when connected in parallel to supply one phase of a three-phase distributed voltage, and offers greater coil reliability against lightning surges. Many manufacturers produce non-subdivided secondary coils in their shell-type distribution transformers to avoid the need for additional connections, which requires bulky leads that significantly increase the radial builds of the coils, often resulting in a requirement for a larger tank. As making these connections is done manually, it is believed that the reliability can be increased by avoiding them, which also reduces the cost of the transformer while still providing acceptable voltage regulation and circulating current characteristics.

Choices of conductor materials for making the coils are limited to copper and aluminum. Copper is more conductive than aluminum but weighs more. Insulating materials mostly used are oil, kraft or aramid paper, cardboard, pressboard, varnish, resin epoxy or reinforced epoxy. There are more available choices of magnetic materials for making the core. Two family types of ferromagnetic alloys are mainly used for making distribution transformer cores: grain-oriented silicon-steels and amorphous-steels. Other alloys are available but are not cost effective and are targeted for making motors, high frequency cores.

Grain-oriented silicon-steels are crystalline alloys formed in multiple interrupted steps involving casting; annealing; quenching; rolling; decarburisation; and coating, which come out into sheet thicknesses ranging from 0.23 to 0.35 mm and in different grades. Their crystal grains are oriented in the sheet in order to provide uniaxial magnetic anisotropy which is parallel to the rolling direction. Uniaxial anisotropy reduces the transformer exciting current and core loss. The sheet must therefore be positioned within the transformer core to have the rolled direction following the circulating path of the induced magnetic flux. Prior to being used, silicon-steel sheets must be heated in the form they will occupy in the core in order to relieve applied bending stresses that impair on the magnetic properties and in order to retain the shape. Heating of the steel is generally performed by annealing the preformed cores in batch for a prolonged time in a furnace at a temperature above 800° C.

Amorphous-steels are non-crystalline alloys formed by casting the melted alloy on the surface of a cooling wheel rotating at high speed, which will form a ribbon having a thicknesses measuring from 0.02 to 0.05 mm. They are cheaper to form than silicon-steels because of the single step casting process advantage. Even when considering composition of both alloys, the price of as-cast amorphous steel ribbons is cheaper than most popular grain-oriented silicon-steels. Amorphous-steels also need to be heated to relieve internal residual stresses incurred during casting and due to applied bending stresses. In addition, it is preferable to anneal amorphous-steels in a magnetic field to reduce the coercive force and to induce uniaxial magnetic anisotropy which will be in parallel with the applied field. Conventionally, the amorphous-steel ribbon is positioned within the transformer core to have its longitudinal axis oriented following the circulating path of the induced magnetic flux. Cores are conventionally batch annealed in a furnace at a temperature above 300° C. and with an applied magnetic field that follows the circulating path. Following annealing, the amorphous-steel cores remain very sensitive to externally applied stresses and the ribbon is rendered brittle. This makes amorphous-steels cores difficult to handle and to assemble with the coils.

Internal power loss is inherent to all distribution transformers as they degrade their efficiency and, efficiency of distribution transformers is an important aspect for energy savings considerations. Internal power loss is generated in the transformer when it is energized and it increases during loading. When only energized, an induced fluctuating magnetic flux density is continuously present in the core. This generates core loss in the ferromagnetic material associated with the magnetization cycle and induces current loops within the metal alloy which create joule loss. At a same level of fluctuating magnetic flux density, amorphous-steel cores produce about one third of the core loss generated in silicon-steel cores. When a load is added, load currents flowing in the conductors of the transformer coils produce additional joule loss that is inversely proportional to the conductor size. At a same size, a copper conductor will heat less than an aluminum conductor. The efficiency of the transformer will be the ratio of the outputted power with respect to the total of outputted power and internal power loss (core and coils).

The distribution transformer power output capability is rated based on the temperature rise above ambient of the coils. Immersing the transformer kernel in oil contained in a smooth tank is the most economic means for providing efficient cooling for keeping the coils temperature rise within permissible limits. Heat is transferred from the hot transformer kernel to the oil, from the oil to the tank walls, and then from the tank walls to the outside. For higher cooling capability, the wall surface of the tank can be increased by corrugation or by means of either external metal tubes welded into the sides of a tank or by external radiators attached to the plain tank. Heat removal from the transformer kernel must also take into account the transfer of heat from the interior parts of the kernel. Heat can be transferred by means of conduction, radiation, and convection. Of all three, convection is the most important. Convection occurs by exposing hot surfaces to oil. Heat conducted from the hot surface to the oil increases the fluid temperature and decreases its density. This produces a circulating current as the lighter hot oil moves up in the tank to be replaced by the cooler heavier fluid. The hot oil will be cooled by convecting along the tank surface and will go back to the bottom. An increase of the heat transfer can be gained by creating ducts on or within the kernel, mainly in the coils, with one opening located near the bottom of the tank and another near the top for oil to flow through. This will increase the oil convective current by a chimney effect (or stack effect).

Proper choice of material and sizing of the transformer kernel will have an impact on the transformer efficiency and rating. At equivalent transformer efficiencies, the significant subtracted core loss gained over silicon-steel cores by using amorphous-steel cores can be transformed into additional joule loss within the coils by using smaller conductor sizes. Doing so has the advantage of reducing transformer size but will increase the joule loss density within the coils. This extra heat in the coils may become a problem for evacuation if proper heat transfer means cannot be provided from the interior of the coils to the oil.

Manufacturing of coils generally involves winding conductors and paper sheets on a coil form using semi-automated or fully automated winding machines. The primary and secondary coils have distinct numbers of coiled loops (winding turns). The number of coiled loops of the primary coil will establish the peak magnetic flux in the magnetic path of the core and the ratio of coiled loops of the primary coil over the secondary coil will transform the input voltage to be outputted across the secondary coil. The high voltage primary coil is normally made of several coiled loops arranged in stacked rows (in the present document, a row is a number of objects arranged in a "straight line") of a small conductor size covered by a varnish to insulate the side by side stacked conductors. Preferably, a paper is added between adjacent rows to provide an increased voltage withstanding capability. A spacer may be added in between adjacent rows to provide cooling ducts for the coil. The low voltage secondary coil having fewer turns, it becomes cheaper to wind a single width of a bare conductor strip side by side with a wider paper strip. Exit leads must be provided on the side of the coils at both ends of the coiled conductor to allow connection between coils or to the feed-through bushings. The lead terminals are normally welded to the ends of the coiled conductor, and are dressed with insulating sleeves to ensure proper voltage isolation. Lead terminal installation, dressing and connection with the bushing are mostly done manually, which increases transformer costs.

Manufacturing of transformer cores involves adjoining or overlapping multiple stacked flat ferromagnetic metal sheets (stacked-cut-core), or butting or overlapping both ends of metal sheets that are bent into a closed loop shape (wound-cut-core), or rolling up multiple turns of a continuous strip of metal sheet (rolled-up-uncut-core). Cut cores have significant disadvantages over uncut cores. Firstly, manufacturing of cut cores involve a lot of labour for cutting and forming, which increases transformer costs. Secondly, an increase in transformer exciting current and power loss are associated with the presence of joints in the cores. Thirdly, cut cores lose the ability to withstand hoop stresses and must therefore must be strapped and framed to prevent the joints from opening. Of all types of cores, amorphous-steel wound-cut-cores are the most expensive to produce, as they require, among other things: more cutting steps; a special annealing furnace, and careful post handling.

Interlacing the electrical coils with the magnetic core is achieved either by manually opening and reclosing the cut core around the pre-wound electrical coils, or by winding the conductor of the electrical coils around a limb of the magnetic core (cut or uncut), or inversely, by rolling up the metal strip around a limb of the coils to form an uncut core. In the second and third cases, the coils to be wound or the uncut core to be rolled up must be of circular shape. However, winding a continuous conductor or metal strip around a limb is a smooth continuous task better adapted for mass production in an automated industrial process. In a transformer having circular coils, it is preferable to have a core limb of substantial cylindrical shape to maximize the filling of the window of the coils in order to minimize the size of the transformer. Therefore, different steel sheet widths must be stacked or wound to create a core cross-section delimited by a circular boundary. Manufacturing of such a core requires production of magnetic strips of different widths or material slitting and more labour. On the other hand, a transformer having a circular core is preferable as each conductor coiled loop can be arranged in the coils for all of them to occupy most of the circular window of the core. Accordingly, the electrical conductors are wound with a different number of coiled loops per row to fit within a circular boundary. This can be done with the small electrical conductor commonly constituting the high voltage primary coil. Generally, the primary coil is made with circular conductors, but may also be made with rectangular conductors for a better filling of the circular window. However, coiling and stacking up different widths of rows of conductors to fit within a circular boundary, and winding an insulating sheet between adjacent rows is not obvious as conductors would tend to pack themselves in a distorted manner and break the row, especially at the ends of each row near the edges of the circular boundary, thereby creating difficulties in winding the insulating sheet without tearing the edges. Therefore, ensuring organisation of coiled conductors in stacked rows is critical as insulating sheets must be wound between adjacent rows. As for the low voltage secondary conductors, they are generally produced by simultaneously coiling a large bare conductor strip and an insulating strip so that they pile up at each coiled loop in the middle portion of the circular area with the rows of the conductors of the high voltage primary coil being distributed on both sides. The assembled coil must then provide gaps between the edges of the window of the coils to allow rotation of the core to be formed. Core lacing can be made simple by using coils having an overall rectangular shape in order to provide a rectangular window in the coils for rolling up a single width continuous ferromagnetic metal strip. If necessary, a two-part rotating mandrel can be installed on the limb of the coils as a support to easily roll up the strip.

A circular magnetic uncut core can be manufactured using a continuous single strip width of a silicon-steel sheet or, of an amorphous-steel ribbon. For silicon-steel, the complete core must first be rolled up on a second mandrel having the same diameter as the one mounted on the coil limb and then annealed in a furnace. Once annealed, the core must be unrolled and rolled up again on the electrical coils by inserting the internal end of the strip first in order to put the strip back to its annealed configuration. Given that conventional grain-oriented silicon-steel sheets show significant stiffness, proper care must be taken to roll up the strip without bending the material beyond its elastic limit. This makes the rolling up process more difficult and the cores still need to be rolled up at first, annealed and handled separately, which increase transformer costs. Annealed amorphous-steel circular uncut cores, on the other hand, are built with a ribbon so thin that it can be severely bent during transfer without reaching plastic deformation. Because the alloy remains sensitive to externally applied stresses once annealed, tightly rolling up the ribbon increases core loss and exciting currents. The best practice is to gently roll up the ribbon at a low tensile stress and to hold the finished core in place without adding significant stresses with the framing structure. However, when the ribbon is rolled up at low tensile stress, the formed core has no self structural integrity and the ribbon can easily telescope if allowed to slide at one end. If the core axis is positioned vertically, a supporting base is required. Also, because amorphous steel gets very brittle following the furnace annealing treatment, unrolling and rolling up again is not obvious. The method of unrolling, transferring and rolling up on another mandrel of a ribbon from a furnace annealed ferromagnetic amorphous steel circular core has been considered in U.S. Pat. No. 4,668,309 and in many articles such as: "Induction Accelerator Development for Heavy Ion Fusion", L. L. Reginato, IEEE Proceedings of the 1993 Particle Accelerator Conference, vol. 1, p. 656-660, and: "Exciting New Coating For Amorphous Glass Pulse Cores", R. R. Wood, IEEE 1999 12$^{th}$ International Pulsed Power Conference, vol. 1, p. 393-396, and: "Induction Core Alloys for Heavy-ion Inertial Fusion-energy Accelerators", A. W. Molvik, The American Physical Society, Physical Review Special Topics—Accelerators and Beams, vol. 5, 080401, 2002. From these prior art analyses, this method is believed to be impractical as the ribbon tends to break too often during the transfer because of its severe brittleness.

Another important aspect of a distribution transformer kernel is its ability to withstand a short-circuit fault at the output of the secondary coil. During short-circuit conditions, repulsive forces are generated between the primary and secondary coils. These repulsive forces act on the coils in a way that they want to adopt a circular shape. These forces will not impair on the structural integrity of the coils if they are already made in a circular shape or, they can be sufficiently alleviated using elliptical shape coils but this would require winding a series of strips having different widths which will increase transformer cost as stated above. A core formed by rolling up a single width steel strip will have a rectangular cross-section. Therefore, the coils must have 4 straight limbs delimiting a rectangular window for the core rectangular cross-section to pass through. Conductors and paper forming rectangular coils lack the self structural integrity required to withstand the repulsive forces. Strong inward forces will appear at each corner of the coils, which may cause the insulation at the corners to fail if no adequate support is provided at the corners. Support at the corner may be provided if the coils are firmly leaning against the core. A silicon-steel circular core may be strong enough to sustain the inward forces on its corners, but this is not possible for an amorphous steel circular core having poor structural integrity and which reacts negatively to applied stresses as stated above. Coiling a bandage around the coils or impregnating the coils in resin will improve the mechanical strength to a certain extent. Proper self mechanical strength can be obtained by encapsulating the coils in a casting resin to provide external reinforcing structure. However, care must be taken to ensure that no bubbles are trapped during the casting to avoid a corona discharge. There is also a risk of de-lamination between the conductors/paper and the resin. Furthermore, cooling of the coils is made more difficult.

Once a transformer kernel is completely assembled, means must be provided to attach and secure the kernel in the enclosure. Conventional silicon-steel distribution transformers are solidly fixed to the enclosure via the core. The practice is to use the core as a support for the coils and then to clamp and secure the core in the enclosure with a frame. This method is not suitable for amorphous-steel distribution transformers and attaching the kernel via the coils is impractical. A best practice for amorphous-steel distribution transformers is to have a frame for supporting both the coils and the core without stressing them too much.

The U.S. Pat. No. 5,387,894 discloses a core-type distribution transformer comprising a circular core made by rolling up a continuous strip of ferromagnetic material on a mandrel located around the cylindrical shape of two adjacent windings having a limb of semi-circular cross section. The ferromagnetic strip can be an amorphous steel strip which was first rolled up on a mandrel and then annealed under magnetic saturation before being unrolled and rolled up again around the coils. However, the document does not discuss the embrittlement of the amorphous steel strip occurring after core annealing and the difficulty to transfer a brittle amorphous-steel strip and, does not teach how to provide support to the formed amorphous steel core. Additionally, no teaching is provided on how to efficiently coil stacked up rows of conductors of different widths and to wind an insulating sheet between adjacent rows of conductors within a circular boundary. Additionally, no teaching is provided on how to make, locate and connect the conductor lead terminals exiting from the coils. Additionally, no means are provided to secure the adjacent windings and to secure the transformer kernel into the tank. Additionally, no mechanical structural means are provided to the coils to adequately sustain short-circuit mechanical forces at the corners of the rectangular coils as the document alleviates the problem by making these corners of the coils curved in an elliptical configuration. Finally, the document does not teach how to provide cooling means to transfer the heat generated in the conductors outside of the coils, especially when using an amorphous steel core where such heat is more intense and is being generated in smaller coils for a given transformer efficiency.

SUMMARY OF THE INVENTION

Accordingly, it is an object of the present invention to provide methods and apparatus to overcome at least one drawback of the prior art.

According to the present invention, there is provided a support frame for an electrical transformer assembly, comprising:
  two loop-shaped parts, each loop-shaped part having a plurality of limbs, each limb having a peripheral recessed portion in which a primary electrical coil is mountable, and at least one secondary coil is mountable in piggyback on said primary electrical coil, one limb of each loop-shaped part having a straight section; and
  an adjustable attaching means for attaching one of the loop-shaped parts with respect to the other loop-shaped part and adjusting a distance therebetween, so that only the straight sections are adjacent and form a central leg, the central leg being for receiving a magnetic core distinct from the attaching means.

Preferably, the loop-shaped parts are made of a material selected from the group comprising fibreglass, epoxy, paper, cardboard, wood and wood composites.

Preferably, the support frame further comprises securing means for securing the loop-shaped parts to a transformer tank.

Preferably, according to a first embodiment, the securing means comprises:
  a base frame;
  first fixing means for fixing a bottom portion of the loop-shaped parts to the base frame; and
  second fixing means for fixing the base frame to the transformer tank.

Preferably, according to another embodiment, the securing means comprises:
  a base frame;
  first fixing means for fixing a top portion of the loop-shaped parts to the base frame; and
  second fixing means for fixing the base frame to the transformer tank.

Preferably, the securing means comprises alignment means for aligning the loop-shaped parts with respect to the base frame.

Preferably, the support frame further comprises handling means located on a top portion of the loop-shaped parts for handling and displacing the support frame from one location to another.

Preferably, according to another embodiment, the securing means comprises:
  a base frame;
  first fixing means for fixing the handling means of the loop-shaped parts to the base frame; and
  second fixing means for fixing the base frame to the transformer tank.

Preferably, a selected one of said plurality of limbs other than those forming the central leg further provides channels for conducting fluids adjacently and transversely to the coils, each of the channels having one inlet on one side of said one limb and one outlet on the other side of said one limb.

Preferably, the channels form an angle with respect to the horizontal to produce a chimney effect in the fluids.

Preferably, the support frame further comprises a first chimney for enclosing the inputs of the channels, the first chimney having a closed top and an open bottom, and a second chimney for enclosing the outputs of the channels, the second chimney having a closed bottom and an open top, to produce, by means of the first chimney and the second chimney, a chimney effect in the fluids.

Preferably, in one embodiment of the invention, the channels are formed by transversal grooves in the recessed portion of the loop-shaped parts.

Preferably, in another embodiment of the invention, the channels are delimited by insulating spacers positioned between adjacent rows of coils once mounted on the loop-shaped parts.

Preferably, one of the loop-shaped parts is positionable with respect to the other loop-shaped part by the adjustable attaching means such that the loop-shaped parts are selectively separated by a first spacing distance and a second spacing distance, said second spacing distance being greater than the first spacing distance, the support frame further comprising a mandrel surrounding the central leg, said mandrel being sized to rotate freely around the central leg with the loop-shaped parts separated by said first spacing distance and said mandrel being inhibited from rotating around the central leg with the loop-shaped parts separated by said second spacing distance.

Preferably, the mandrel is made from an insulating material selected from the group comprising fibreglass, epoxy, paper, cardboard, wood and wood composites.

Preferably, the mandrel comprises interlockable first and second half portions.

Preferably, the mandrel further comprises opposite flanges at extremities thereof.

Preferably, the support frame further comprises at least one bracing member mountable on an external surface of at least one of said limbs other than those forming the central leg for securing the coils, once mounted, in position within the loop-shaped parts.

Preferably, the at least one bracing member provides channels for conducting fluids adjacently to the coils, each of the channels provided by said at least one bracing member having an inlet and an outlet for allowing circulation by a chimney effect. According to the present invention, there is also provided a loop-shaped part of a support frame of an electrical transformer assembly, comprising:

a plurality of limbs on which a primary electrical coil and at least one secondary electrical coil are mountable, each limb having a peripheral recessed portion in which the primary electrical coil is mountable, and said at least one secondary coil being mountable in piggyback on said primary electrical coil, one limb of the loop-shaped part having a straight section, the peripheral recessed portion comprising:

a base portion for supporting said primary electrical coil;

slanting sidewall portions extending from both sides of said base portion, said slanting portions comprising a plurality of steps allowing a stacking of rows of conductors and insulating layers of the primary electrical coil.

Preferably, a height of a step in a corner between adjacent perpendicular limbs is gradually reduced.

Preferably, one of said plurality of limbs further provides channels for conducting fluids adjacently and transversely to the coils, each of the channels having one inlet on one side of the loop-shaped part and one outlet on the other side of the loop-shaped part and wherein a height of a step along a limb is increased by a length to accommodate said inlet and outlet.

Preferably, one of said plurality of limbs further provides an tap input opening on one side of the loop-shaped part, allowing connection of a tap to the coils, once mounted, and wherein a height of a step along a limb is increased by a length to accommodate said tap input opening.

Preferably, predetermined steps are formed for bridging a last coil loop of a row with a first coil loop on an adjacent row.

Preferably, the bridging is performed at corners of perpendicular limbs.

Preferably, the loop shaped part comprises interlockable first and second half portions.

Preferably, one of said plurality of limbs further provides channels for conducting fluids adjacently and transversely to the coils, each of the channels having one inlet on one side of the loop-shaped part and one outlet on the other side of the loop-shaped part, and wherein the channels are formed by transversal grooves traversing the base portion and at least one of the slanting sidewall portions.

Preferably, a port fluidly connects the inlets to the transversal grooves traversing the base portion.

Preferably, an inner surface of the loop-shaped part at the limb having the straight section is substantially semi-cylindrical and an inner surface of the loop-shaped part at the limbs perpendicular to said limb having the straight section is flat.

Preferably, a radius of curvature of the inner surface that is substantially semi-cylindrical is smaller than an inner radius of a cylindrical core mountable around said loop-shaped part.

According to the present invention, there is also provided an electrical coil assembly comprising an electrical coil and a frame onto which the coil is wound, made of an electrical conductor strip having a first end and a second end, at least one of the ends being folded over itself along a first fold line according to an angle between 15 and 75 degrees such that said one end extends transversally with respect to a plane where the coil lies to provide a connection lead.

Preferably, in one embodiment of the invention, the angle is 45 degrees.

Preferably, one end folded over itself is further folded along a second fold line parallel to a longitudinal axis of the strip.

Preferably, the electrical coil assembly is used in combination with an electrical transformer core assembly which comprises a support frame comprising a loop-shaped part, said loop-shaped part comprising a plurality of limbs and first and second opposite sidewalls, two of said plurality of limbs forming opposite top and bottom straight sections, said coil assembly comprising:

a primary electrical coil wound around said loop-shaped part, said primary electrical coil comprising first and second primary terminals at opposite ends of said primary coil, said first and second primary terminals extending from the first sidewall of the loop-shaped part;

a secondary electrical coil wound around the primary electrical coil, said secondary electrical coil being made from a conductor strip and comprising first and second secondary terminals at opposite first and second ends of said secondary coil, the first secondary coil terminal being formed by folding the first end of the strip over itself along a first 45 degree fold line with respect to the first sidewall such that a first length of the strip extends perpendicularly with respect to and from the second sidewall opposite the first sidewall from which the first and second primary sub-coil terminals extend, the second secondary terminal being formed by folding the second end of the strip over itself along a second 45 degree fold line to form a first intermediate fold and folding the second end of the strip over the first intermediate fold along a third 45 degree fold line perpendicular to the second 45 degree fold line such that a second length of the strip extends in parallel with and outside said first and second sidewalls.

According to the present invention, there is also provided a method of assembling an electrical transformer kernel assembly, comprising the steps of:

a) winding a primary electrical coil around a first loop-shaped part having a peripheral recessed portion along its outer surface for receiving the primary electrical coil, the first loop-shaped part having at least one straight section;

b) winding a secondary electrical coil on piggyback on the primary electric coil around the first loop-shaped part;

c) winding a primary electrical coil around a second loop-shaped part having a peripheral recessed portion along its outer surface for receiving the primary electrical coil, the second loop-shaped part having at least one straight section;

d) winding a secondary electrical coil on piggyback on the primary electric coil around the second loop-shaped part;

e) attaching the first loop-shaped part with respect to the second loop-shaped part so that only the straight sections are adjacent and form a central leg;

f) adjusting a distance between the first loop-shaped part and the second looped shaped part to a first spacing distance;

g) installing a mandrel around said central leg, said mandrel being sized to rotate freely around the central leg when the first loop-shaped part and the second looped shaped part are spaced by said first spacing distance; and h) winding a metallic ribbon around the central leg to form a magnetic core, wherein the winding step h) is distinct from the attaching step e).

Preferably, the method further comprises the steps of:

i) adjusting the distance between the first loop-shaped part and the second looped shaped part to a second spacing distance greater than the first spacing distance, such that the mandrel is inhibited from rotating around the central leg; and j) inserting spacer elements between the adjacent straight sections forming the central leg.

Preferably, the method further comprises, during steps a) and c), the steps of:

aa) forming a plurality of conductor loops with the primary electrical coil at distinct predetermined turn counts;
bb) individually twisting each of the conductor loops to form connection leads;
cc) inserting insulating sleeves between adjacent twisted conductor loops; and
dd) bending said leads transversally with respect to the winding of the primary electrical coil.

According to the present invention, there is also provided a system for assembling an electrical transformer kernel assembly, comprising:

a first winding system for winding a primary electrical coil around a first loop-shaped part and second loop-shaped part respectively, each loop-shaped part having a peripheral recessed portion along its outer surface for receiving the primary electrical coil, the first loop-shaped part and the second loop-shaped part each having at least one straight section;

a second winding system for winding a secondary electrical coil on piggyback on the primary electric coil around the first loop-shaped part and the second loop-shaped part respectively;

an attaching system for attaching the first loop-shaped part with respect to the second loop-shaped part by means of an adjustable attaching means, so that only the straight sections are adjacent and form a central leg;

a mandrel installation system for installing a mandrel around said central leg, said mandrel being sized to rotate freely around the central leg when the first loop-shaped part and the second looped shaped part are spaced by a first spacing distance; and a third winding system for winding a metallic ribbon around the central leg to form a magnetic core, the core being distinct from the adjustable attaching means.

Preferably, the above method may be used to manufacture electrical transformer kernel assemblies in series production.

Preferably, the present invention also provides a storage container for containing a plurality of electrical transformer kernel assemblies assembled by the above-described method.

BRIEF DESCRIPTION OF THE DRAWINGS

FIGS. 27 A to E are schematic drawings of sequences involved for assembling a transformer kernel with a core and two coil arrangements, for making electrical connections between coils, and for locating a transformer kernel in a transformer tank with electrical connections to the bushings;

FIG. 28 is a schematic drawing showing a front view of the transformer kernel shown in FIG. 27 in a tank;

FIG. 42 includes two perspective views from to viewing angles of an oval transformer tank assembly for enclosing a transformer kernel of the present invention;

PREFERRED EMBODIMENTS OF THE PRESENT INVENTION

Figure 1:
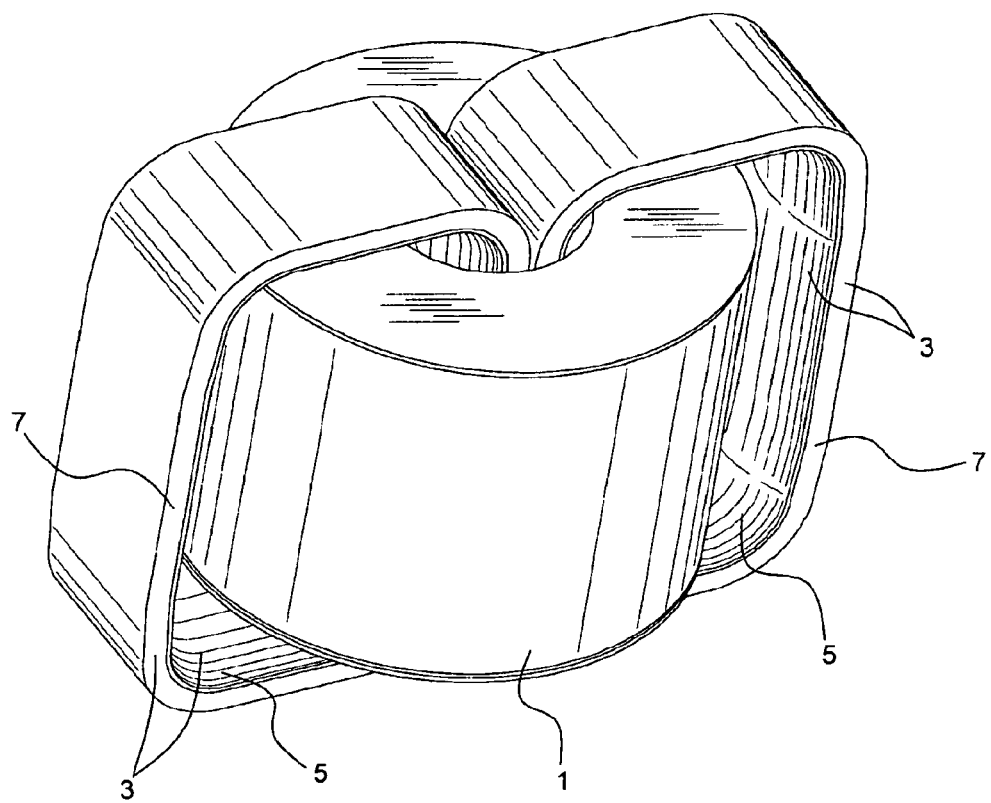
FIG. 1 is a schematic view of a transformer kernel comprising a circular core.

Different preferred objects of the present invention will now be presented.

Among all of the core and coil assembly methods for manufacturing distribution transformer kernels as described above, it is believed that a distribution transformer having a circular core made by rolling up a continuous single strip of an in-line curved annealed amorphous-steel ribbon around pre-wound coils is the method involving minimum discontinuous manufacturing steps, which can be better automated for mass production and is of minimal cost. U.S. patent application No. 61/262,603 discloses a new system and method for treating an amorphous metallic ribbon which is used to in-line anneal at low cost an amorphous-steel ribbon into a curved shape, such annealed ribbon showing good ductility to efficiently allow its rolling up to form a circular core. Furthermore, such an in-line curved annealed amorphous-steel ribbon can be rolled up to form circular cores showing low core loss and low exciting power at high magnetic induction levels from which distribution transformer kernels can be manufactured. Such distribution transformer kernels are small compared to conventional silicon-steel distribution transformer kernels at the same level of efficiency. Using such in-line curved annealed ribbons eliminates the breaking problem associated to unrolling and rolling up again the ribbon of furnace annealed core which renders the manufacturing of circular-uncut core distribution transformers possible and cost effective.

An object of the present invention is to provide a distribution transformer kernel having a circular core made from rolling up an in-line-annealed amorphous-steel ductile ribbon and not having the disadvantages and limitations associated to known configuration designs and manufacturing methods.

Another object of the present invention is to provide a distribution transformer kernel having a circular core which can be massively manufactured at low cost.

Accordingly, the present invention provides a method to efficiently coil and stack different widths of rows of conductors and wind an insulating strip between adjacent rows within a recess having a curved boundary.

Accordingly, the present invention also further provides means and a method to efficiently secure adjacent windings in an amorphous steel circular core transformer kernel.

Accordingly, the present invention also further provides a means to efficiently support the coil and the core of a circular amorphous-steel core transformer kernel.

Accordingly, the present invention also further provides a transformer kernel which can be efficiently enclosed and fixed in a small oval tank.

Accordingly, the present invention also further provides a means and a method to pre-form and to dress the secondary coil lead terminals for making easy connection between sub-coils and to the tank bushings.

Accordingly, the present invention also further provides a means and a method to efficiently secure an amorphous steel circular core transformer kernel into a tank.

Accordingly, the present invention also further provides a means and a method to efficiently remove heat generated within the coils of a circular amorphous-steel core transformer kernel.

Accordingly, the present invention also further provides a means and a method to efficiently sustain short-circuit forces in rectangular coils of a circular core transformer kernel.

Accordingly, the present invention also further provides a means and a method to efficiently wind a conductor on a coil frame and to make, locate the lead terminals.

Accordingly, the present invention also further provides a means and a method to efficiently roll up an amorphous steel strip to form a circular core around the coils of a transformer kernel.

Accordingly, the present invention also further provides a means and a method to allow rotation and immobilisation of a circular core mounted around a limb of a coil arrangement.

Accordingly, the present invention also further provides a transformer kernel that can be efficiently enclosed in an oval enclosure or tank.

FIG. 1 displays the basic geometric configuration of a single phase circular-uncut-core core-type transformer kernel. It comprises one circular core 1 interweaved with two rectangular coil arrangements 3. Preferably, the coil-core arrangement lies with the circular core central axis in a vertical position. Each rectangular coil arrangement 3 comprises an inner primary sub-coil 5 and an outer secondary sub-coil 7. The two rectangular coil arrangements 3 are positioned back-to-back to form a double coil arrangement having one common central limb of circular shape around which the magnetic circular core 1 is enlaced. Therefore, each coil arrangement 3 has a limb with the cross section fitting within a half-disc.

Figure 2:
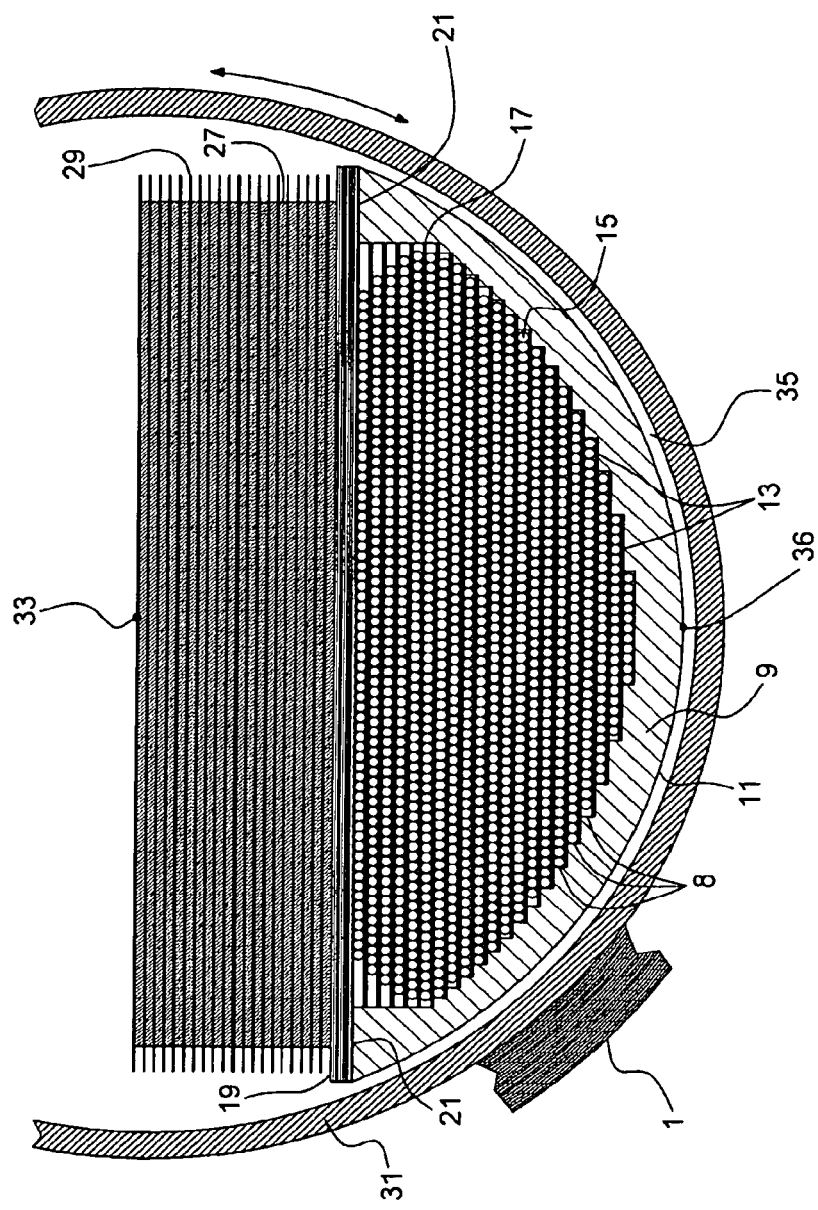
FIG. 2 is a schematic view of a cut cross section showing rows of conductors of one of the two coil arrangements in a supporting frame passing through the core window.

FIG. 2 shows a cut view of a limb from one of the two coil arrangements 3 passing through the core window. It comprises a supporting frame 9 preferably made of a mouldable dielectric reinforced material such as press board, epoxy, fibre reinforced epoxy, fibre glass, composite material. The outer wall 11 of the supporting frame 9 has an arc shape. The inner walls 13 of the supporting frame 9 are arranged in a series of steps 8 to provide a recess to accommodate the rows of small conductors 15 of the primary sub-coil 5. Each conductor 15 represents one coiled loop of an electrical coil, the first coiled loop being wound at the deepest part of the recess and the last one being wound on top of the coil. The thickness along the inner walls 13 and the outer wall 11 is determined to provide proper dielectric insulation between the core 1 and the primary sub-coil conductors 15. The conductors 15 from each coiled loop of the primary sub-coil 5 are arranged in rows preferably separated by a thin electrical insulating layer 17 of a material such as paper, epoxy coated paper or poly-aramid to provide insulation between rows. Each conductor 15 is covered by a thin electrical insulating coating, such as varnish, to provide proper electrical insulation between adjacent conductors. The bottom center portion of the inner recess walls 13 of the supporting frame 9 is flat and supports a first row of conductors 15. Multiple rows of conductors 15 are then stacked, preferably separated by a thin dielectric layer 17, to form the rows of sub-coil conductors. The maximum number of arranged conductors in each row is determined by the thickness along the inner walls 13 and the outer wall 11 which provides proper dielectric insulation between the core 1 and the conductors 15. The steps 8 of the inner walls 13 are aligned on both sides of the central bottom flat portion to accommodate each additional row of conductors with the thin insulating layer 17 having the corresponding row width. Each thin insulating layer 17 of a row can be produced by winding and stacking a few coiled loops of a thinner strip to limit the overlapping thickness which is preferably located outside of the core window. The height of each step 8 is equal to the sum of each row's height facing the step. On top of the last row of conductors, there is a thicker electrical insulating row 19 preferably made with several coiled loops of a thinner insulating strip such as a strip of paper, epoxy coated paper or poly-aramid, and extending on each side over the supporting frame. The junction between the thicker dielectric row 19 and the sides 21 of the supporting frame 9 represents a tracking path yielding lower dielectric strength than the dielectric strength in both materials. Therefore, a safe tracking distance is provided between the top rows of conductors 15 and the edge of the supporting frame outer wall 11. A conductor strip 27 adjoined to a thin insulating strip preferably made of paper, epoxy coated paper or poly-aramid, and which is slightly wider than the conductor strip 27 is simultaneously coiled in piggyback over the thick insulating row 19, each loop being made of one wide conductor strip. The width of the conductor strip is chosen to keep a safe tracking distance with the edge of the supporting frame outer wall 11. The portion of the supporting frame, the sub-coils and the insulating row shown in FIG. 2 are arranged to fit within a half-disc shape. The arc shape of the outer wall 11 of the coil frame is chosen to have a radius smaller or equal to the inner radius of the core supporting mandrel 31. The height between the midpoint 36 on the arc shape of the outer wall 11 of the supporting frame 9 and the midpoint 33 on top of the last coiled loop of the secondary coil is slightly smaller than the inner radius of the core supporting mandrel 31 in order to create a gap 35 between the limb and the inner wall of the mandrel 31 which supports the core 1. This gap 35 allows the core 1 with the mandrel 31 to rotate freely as shown by the arrow. With the supporting frame of the present invention, loops of conductors can be efficiently coiled in stacked rows with coiled loops of an insulating strip between adjacent rows.

Figure 3:
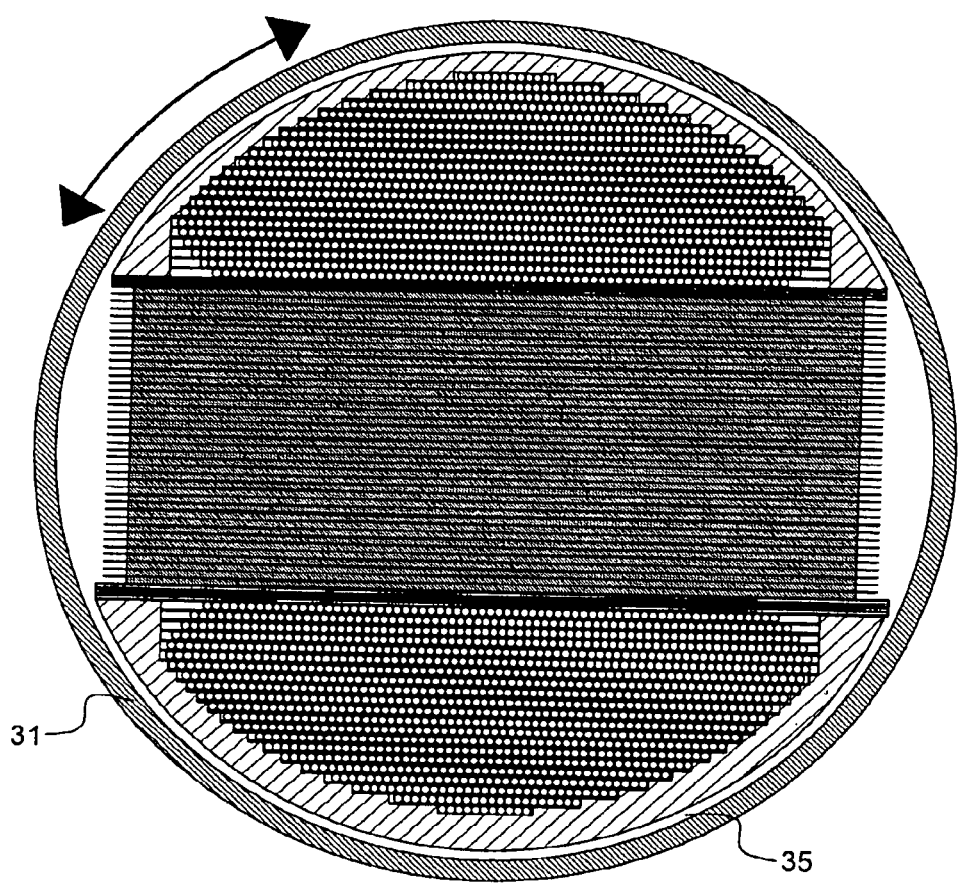
FIG. 3 is a schematic view of a cut cross section showing rows of conductors of two coil arrangements in a supporting frame passing through the core window when they are leaning back-to-back on each other.

Referring to FIG. 3, there are shown two half-disc limbs of two coil arrangements positioned back-to-back within the window opening of a circular core (the coil portions outside of the core are not shown). The two back to back limbs are leaning against each other in order to create the gap 35 which allows the mandrel 31 to rotate freely in order to be able to roll up the amorphous in-line annealed alloy ribbon on the mandrel to form the circular core 1.

Figure 4:
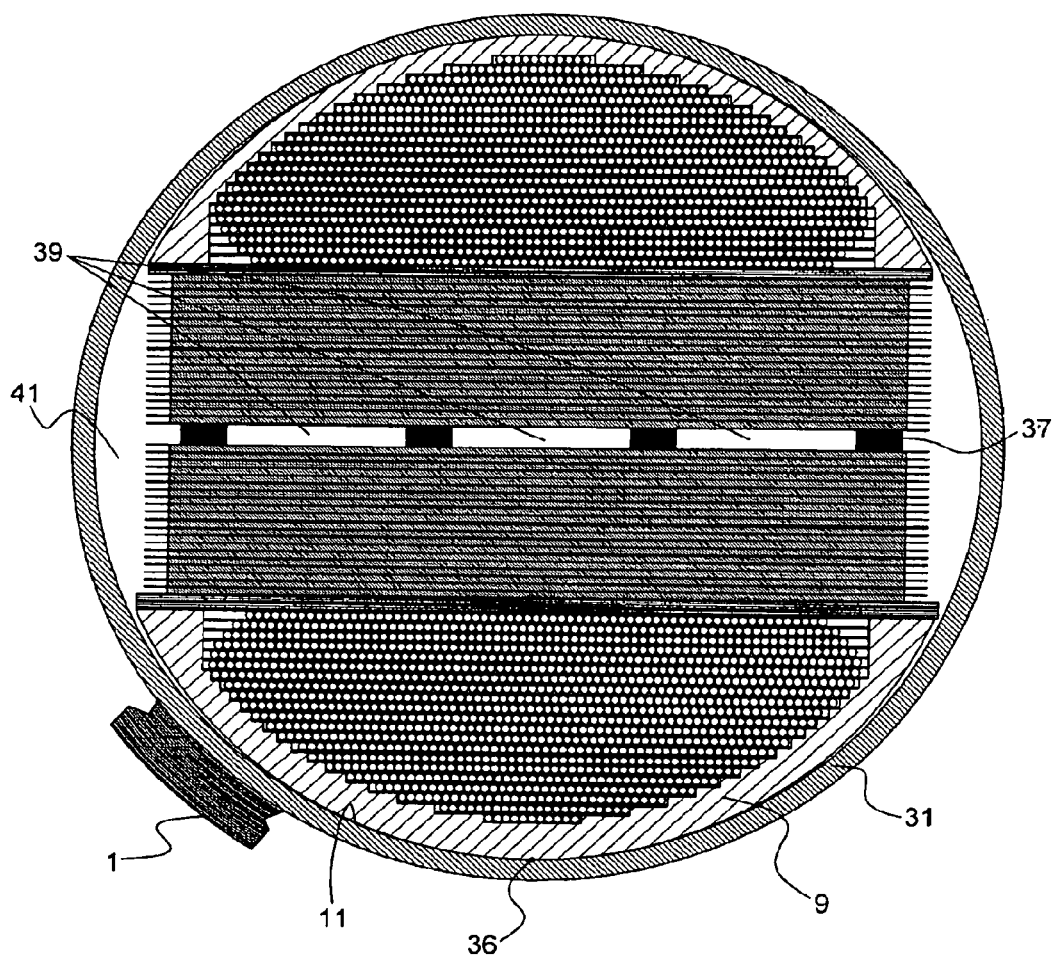
FIG. 4 is a schematic view of a cut cross section showing rows of conductors of two coil arrangements in a supporting frame passing through the core window when they are separated apart by spacers and leaning against the mandrel of the circular core.

Referring now to FIG. 4, there is shown a zoomed view of the central portion of the core with the two half-disc limbs of the two coil arrangements now separated by insulated spacers 37. The half-disc limbs of the two coil arrangements are separated apart and are immobilized by each leaning at their midpoint 36 against the inner wall of the core mandrel 31. The insulated spacers 37 are placed between the two back-to-back coil arrangements to maintain a gap and to create opening ducts 39 for oil to flow through in order to cool the conductors. Two openings 41 forming ducts on each side of the secondary coil are also available for oil to flow through in order to cool the coils. Preferably, the circular core lies in the transformer tank with its central axis in vertical position to allow flow of convecting oil in the ducts by a chimney effect. Preferably, entry and exit openings under and over the core-coil arrangement are provided for the transformer kernel in the tank for the cooled oil to get in from under and for the heated oil to get out from the top. Therefore, heat produced in the conductors within the core windows can be efficiently extracted through the formed cooling ducts.

Figure 5:
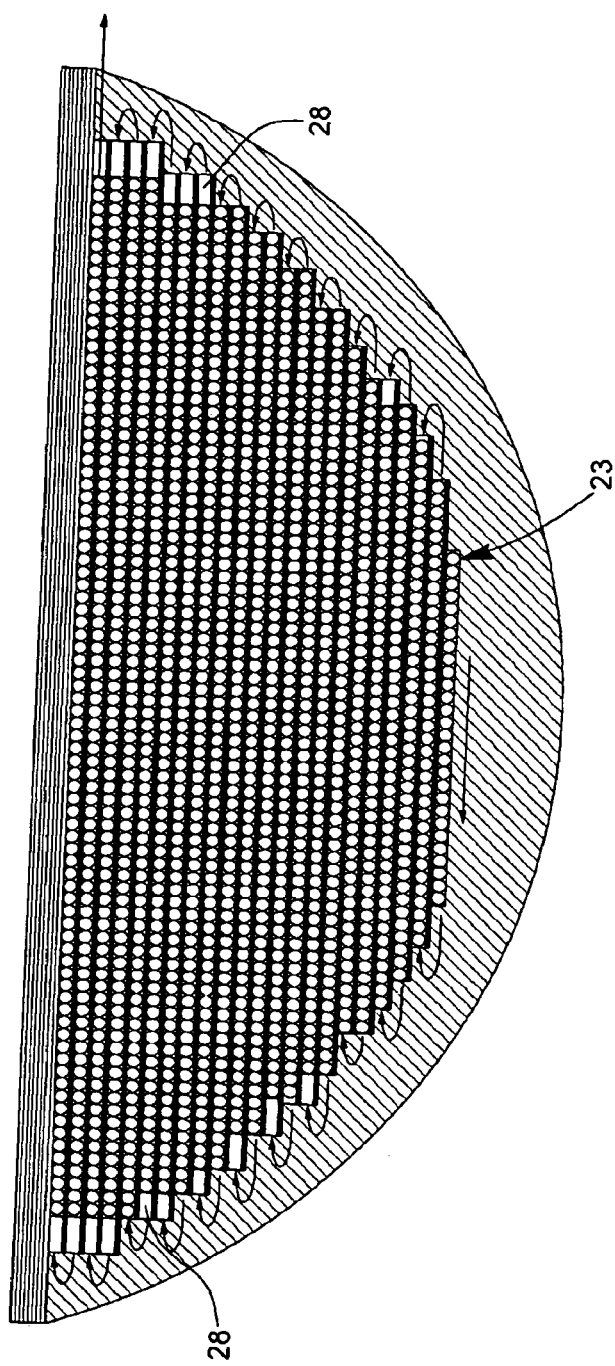
FIG. 5 shows rows of conductors of a primary sub-coil arrangement in a supporting frame according to a preferred embodiment.

Coiling of the conductor in rows increasing in width as they are stacked raises the problem of having to route the coiled conductor from one row to the next. Referring to FIG. 5, there is shown one preferred embodiment according to the present invention of a supporting frame with a different arrangement of steps and a coiling method. The first row of conductor is coiled from starting location 23 from the right end of the first row to the left end and then, is switched to the next upper row as shown by the curved arrow at the end of the row. The conductor is then coiled from left end to the right end of the corresponding row and then, is switched to the next upper row. This method of coiling requires a free passage way in the supporting frame at the end of some rows in order to bring the conductor under the starting end of the next upper wider row before the coiling of the conductor can start by then bringing up the conductor to the new row level. When required, a narrow strip of insulating material 28 can be added at the end of the row to provide a safe tracking distance between the first coiled loop of a row and the last coiled loop of the next upper row where the voltage between two conductors of adjacent coiled rows is maximal.

Figure 6:
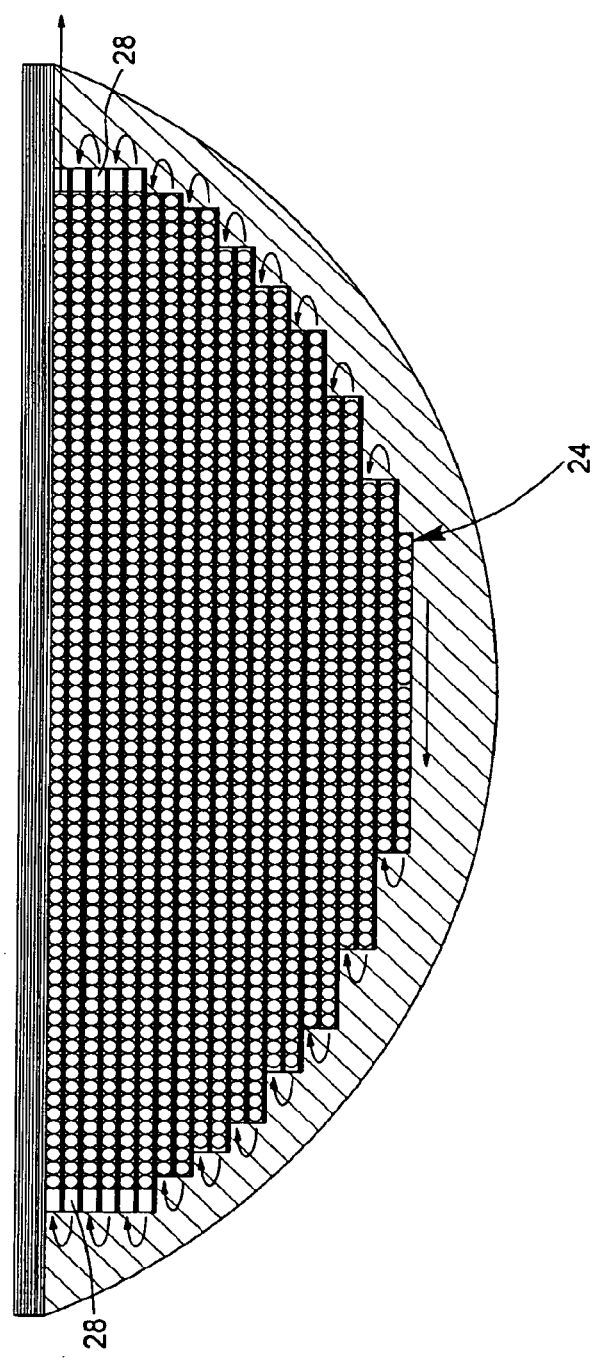
FIG. 6 shows rows of conductors of another primary sub-coil arrangement in another supporting frame according to another preferred embodiment.

Referring now to FIG. 6, there is shown another preferred embodiment of the present invention of a supporting frame with a different arrangement of steps not requiring free passage ways in the supporting frame to route the coiled conductor from one row to the next. The first row of conductor is coiled from starting location 24 at the right end of the first row to the left end and then, is vertically switched to the next upper row as shown by the curved arrow at the end of the aligned row. The conductor is then coiled from left end to the right end which extends beyond the starting coiled location 24 and then, is vertically switched to the next upper row to be coiled as shown by the curved arrow at the end of the extending row. When required, a narrow strip of insulating material 28 can also be added at the end of the row to provide a safe tracking distance between the first coiled loop of a row and the last coiled loop of the next upper row where the voltage between two conductors of adjacent coiled rows is maximal.

Figure 7:
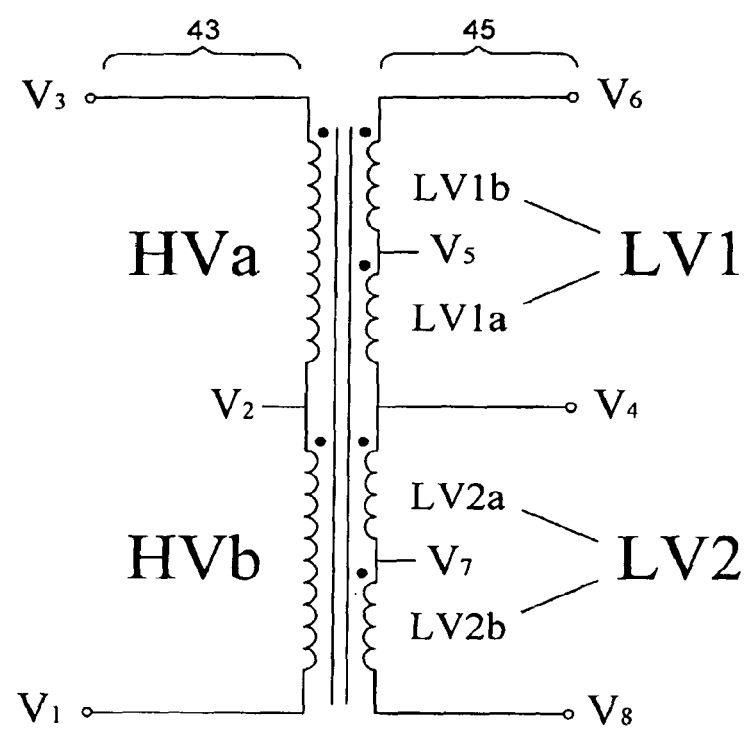
FIG. 7 is a schematic electrical diagram of a coil arrangement of a core-type transformer.

FIG. 7 is an electrical schematic drawing showing the interconnection arrangements between the sub-coils of a single phase transformer with two Low Voltage outputs. The High Voltage primary coil 43 comprises two sub-coils HVa and HVb connected in series. The two Low Voltage secondary coils 45, LV1 and LV2, each comprise two sub-coils LV1a, LV2a and LV1b, LV2b connected in series. Voltage points V1 to V8 are indicative values of voltage at each lead terminal of a coil. Typically, in a single phase transformer (like for a 14.4 kV-120/240V), voltage points V1 and V4 are connected to the electrical ground voltage reference, voltage point V3 is the high voltage on the primary side, and voltage points V6, V8 are two low voltages of the secondary outputs. In the schematic, V2, V5 and V7 are intermediate voltage points between two sub-coils.

Figure 8:
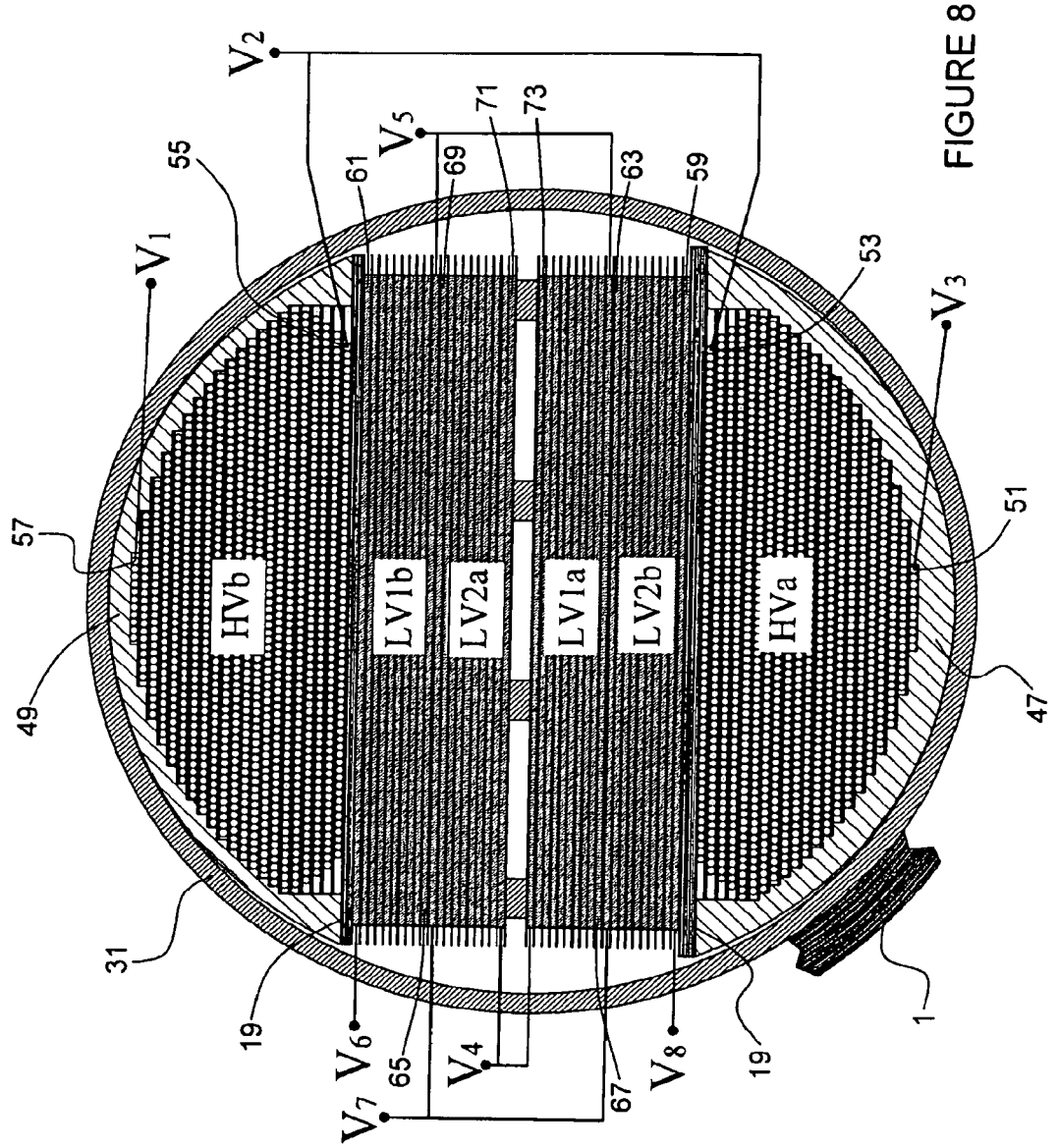
FIG. 8 is the schematic view of FIG. 4 wherein the lead connections shown in FIG. 7 are associated.

Referring to FIG. 8, each sub-coil shown in FIG. 7 is associated with a group of loops of conductors. Each coil arrangement 3 comprises a high voltage sub-coil (HVa or HVb), and two low voltage sub-coils (LV1a/LV2b or LV1b/LV2a), one from each secondary coil. The distribution of the secondary sub-coils on both coil arrangements 3 maintains an equilibrium in the flow of current in both coil arrangements 3 in case of a load unbalance (interlaced secondary coils). In each sub-coil shown in FIG. 8, there are two leads at both ends of the sub-coil which are respectively routed to the first and last coiled loop of a conductor of the sub-coil. Each lead connects to voltage points V1 to V8 of FIG. 7. Preferably, each lead exits the sub-coil at a location on one of the limbs located outside of the core window. Also, attributing a voltage point to a lead of a primary sub-coil will impact on the dielectric thickness of the coil frame between the primary sub-coil and the core mandrel 31. Preferably, in FIG. 8, the core mandrel 31 is made of an insulating material and the core 1 is electrically connected to the transformer tank which is connected to the ground voltage reference. Therefore, the dielectric thickness between a primary sub-coil and the core includes the coil frame and the mandrel thickness. The connections of the leads to voltage points V1 to V8 shown in FIG. 8 represent a preferred embodiment.

Using the schematic of FIG. 7 and referring to FIG. 8: Preferably, the lead extending from conductor loop 51 of the HVa sub-coil is connected to the point V3. Since point V3 corresponds to the highest voltage, the dielectric portion of the supporting frame at the location 47 which is facing the bottom row of HVa will preferably have the maximum thickness. Next, the leads extending from conductor loops 53 and 55 of the HVa and HVb sub-coils are connected to point V2. More than one lead can be provided on the last coiled row of loops of conductors in sub-coils HVa and HVb to allow connections to a tap selector for adjusting the voltage outputted at the secondary coils by choosing which pair of leads from respective sub-coils HVa and HVb will be connected to point V2. Since the voltage point V2 is at about half of V3, the thickness of the insulation layer 19 between HVa and LV2b sub-coils and between HVb and LV1b sub-coils is set accordingly. Next, the lead extending from conductor loop 57 of the HVb sub-coil is connected to point V1. Since voltage point V1 is lower than V3, the dielectric portion of the supporting frame at the location 49 which is facing the top row of HVb can be of smaller thickness compared to region 47. With the primary coil arrangement of the present invention, proper voltage insulation is provided between loops of conductors and the core, in order to withstand high voltage impulse tests.

Now, for the secondary sub-coils, preferably, the leads extending from conductor loops 59 and 61 of LV2b and LV1b sub-coils are respectively connected to points V8 and V6. Next, the leads extending from conductor loops 67 and 65 of LV1a and LV1b sub-coils are connected to points V5 and are connecting these sub-coils in series. Furthermore, the leads extending from conductor loops 69 and 63 of LV2a and LV2b sub-coils are connected to points V7 and are also connecting these sub-coils in series. Finally, the leads extending from conductor loops 71 and 73 of LV2a and LV1a sub-coils are connected to point V4. This way, the conductor of the last outer coiled conductor loop of each coil arrangement 3 shown in FIG. 1 will be at the lowest voltage, as V4 is normally connected to the ground voltage reference (this is generally the case for the 120/240V secondary coils of a distribution transformer). In the case where the transformer only has one secondary coil, there will only be two secondary sub-coils connected in series, with one secondary sub-coil per coil arrangement 3. With the conductor arrangement of the present invention, proper voltage insulation is provided to withstand high voltage impulse tests.

Figure 9:
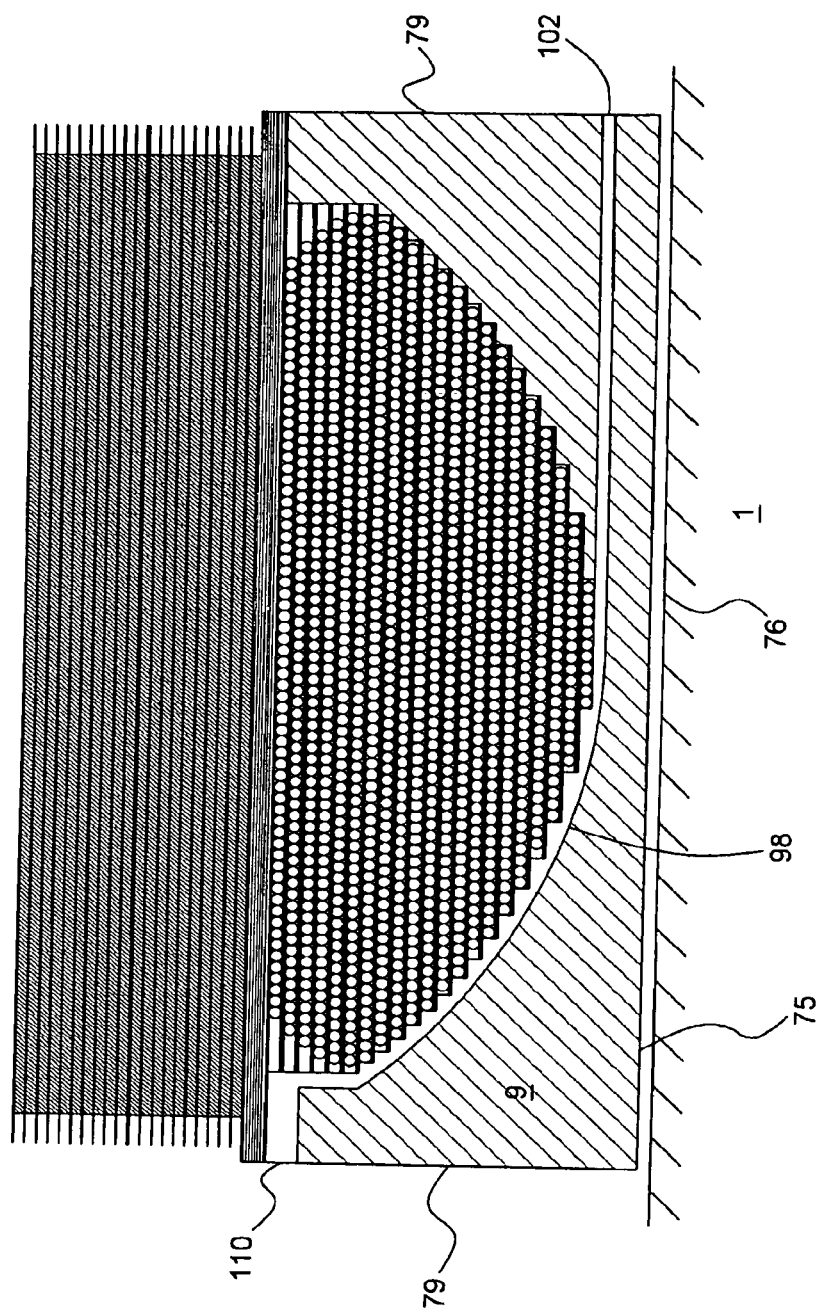
FIG. 9 is a schematic view of a cut cross section of a coil arrangement in a supporting frame of a horizontal limb located outside of the core window.
Figure 10:
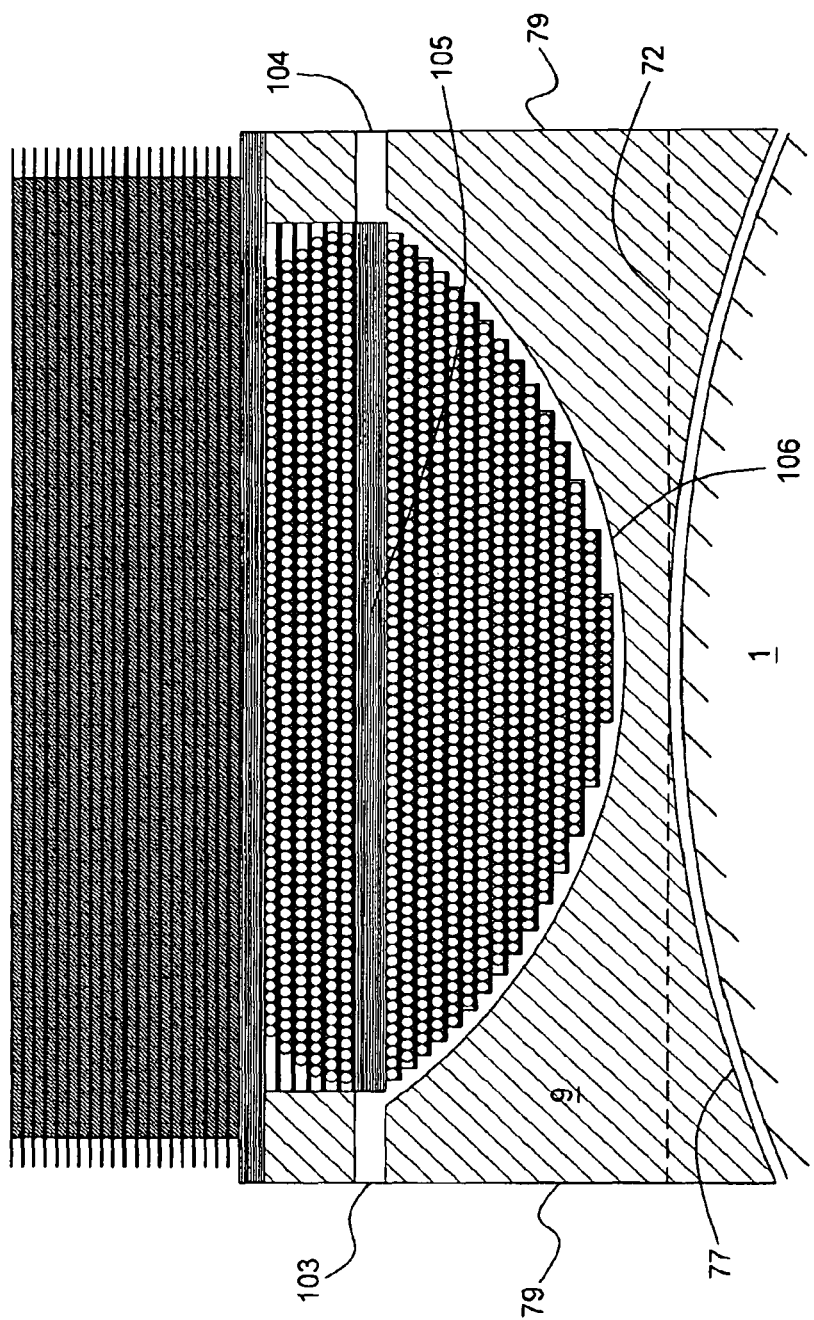
FIG. 10 is a schematic view of a cut cross section of a coil arrangement in a supporting frame of a vertical limb located outside of the core window.

Referring now to FIG. 9, a cross section of the top and bottom horizontal portions of the two coil arrangements 3 that are located outside of the core window opening is shown. The outline of the cross section for the supporting frame is not constrained by the circular shape of the window opening. In FIG. 9, the wall of the supporting frame 9 can be made thicker to assume a shape that suits best the requirement for providing stronger mechanical structural support. However, there is an immediate space limitation due to the presence of the core 1. For the top and bottom horizontal portion of the coil arrangements shown in FIG. 1, the bottom boundary 75 of the supporting frame shown in FIG. 9 is limited to a straight line to clear the flat surface 76 of the circular core edges. For the lower horizontal portion of the coil arrangement, the straight boundary can be efficiently used to create a flat surface for supporting the core. Referring now to FIG. 10, a cross section of the vertical portions of the two coil arrangements 3 that is located outside of the core window opening is shown. The bottom portion of the supporting frame can also have a straight boundary 72 or it can be extended to adopt a curved shape 77 as it needs to clear the outer radius of the circular core 1. As for the side boundaries in FIGS. 9 and 10, there is no immediate space limitation. For the portion of the supporting frame located outside the core window opening, preferably, the side boundaries 79 have a shape which increases the supporting frame thickness. In FIGS. 9 and 10, the two side boundaries 79 are straight and parallel.

Figure 11:
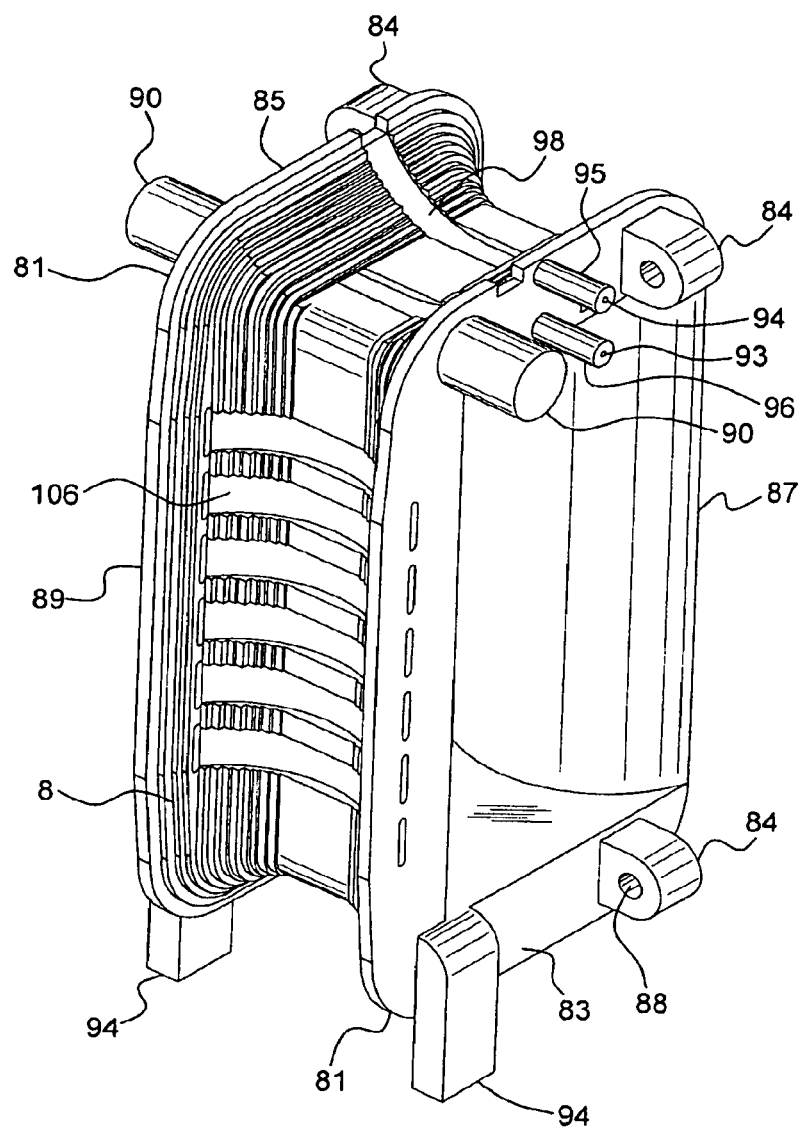
FIG. 11 is a perspective view of a supporting frame according to a preferred embodiment.

FIG. 11 shows a perspective view of a supporting frame having limbs that were extruded using the cross section outline shown in FIGS. 5, 9 and 10. The limb 87 is extruded according to the outline of the cross section of FIG. 5 and the limbs 83 and 85 are extruded according to the outline of the cross section shown in FIG. 9. As for the limb 89, it is extruded using the straight boundary 72 of FIG. 10. For all four limbs, the walls 13 of the recessed portion of the supporting frame are extruded based on the configuration of steps 8 of FIG. 5. All four limbs are preferably straight in order to provide a rectangular window opening for passing the core. At each corner, the outline of the supporting frame is an extrusion revolving around the inner corner where the limbs are meeting to provide a series of steps arranged in a curved shape 81 for a smooth transition of each conductor rows from limb to limb. Overall, the shown supporting frame is an arrangement taking the form of mounted U shaped beams outside the core windows and which provides strong structural integrity for supporting the coils and the core. The strong structural integrity of the supporting frame will efficiently withstand the strong short-circuit forces from hoop stresses exerted by the rectangular shaped coils. To reduce weight without losing structural integrity, openings (not shown) could be realized in predetermined regions in the material. These openings could expose external sections of the primary coil to oil in order to cool the conductors. The switching of the conductor loop 15 of the primary sub-coil from one row to the next, the overlapping of each insulating layer 17 coiled over each row, and the output leads for the primary and secondary sub-coils are all located on one of the three limbs of the coil arrangement situated outside of the core window opening.

Figure 12:
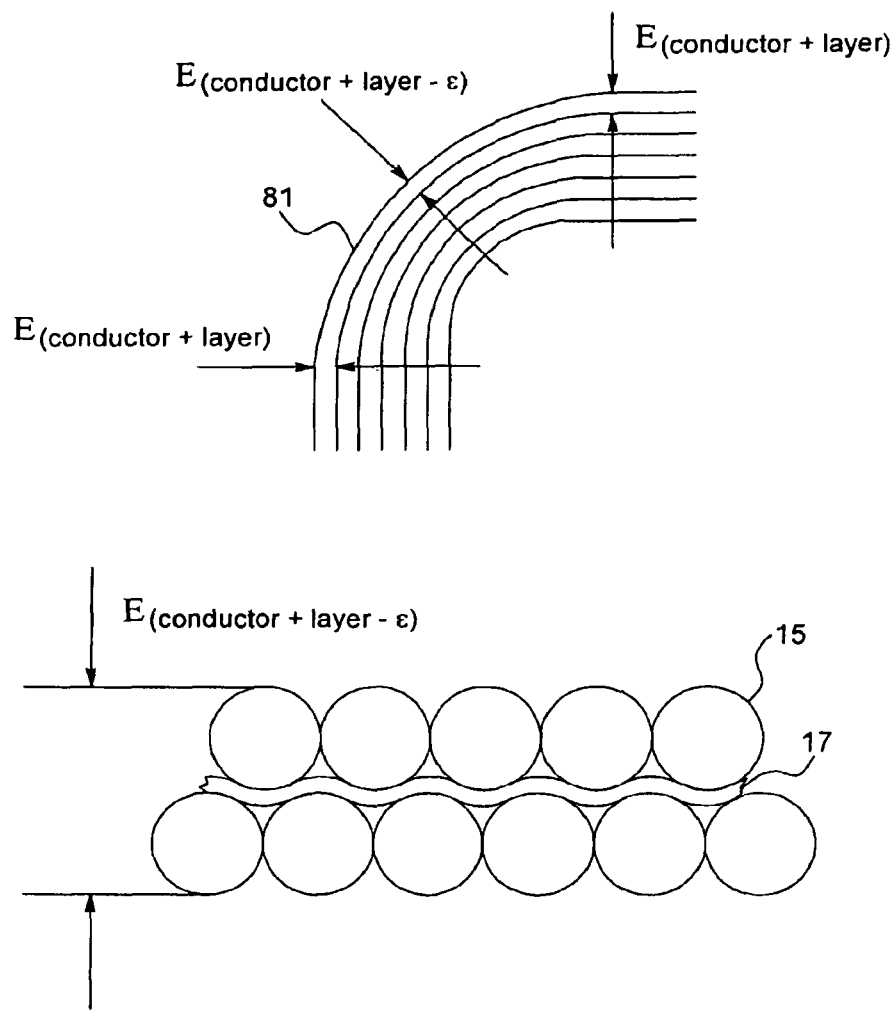
FIG. 12 is a schematic drawing of two compressed rows of conductors in a corner of the supporting frame of FIG. 11.

When coiling the conductor 15 of a row over an insulating layer 17, the tensile stress applied in the conductor during coiling exerts an inner pressure on the underneath rows at each corner on the curved shape 81 of the supporting frame. Referring now to FIG. 12, if the primary sub-coil is coiled with a round conductor, the coiled conductor will naturally position itself on the small recess appearing on the insulating layer by deformation due to the void located between two side by side conductors of the underneath row. Due to this deformation, the height between two conductors of adjacent rows will be smaller by a $\epsilon$ value which is dependant to the conductor coiled tensile stress and to the reciprocal of the bending radius of the coiled conductor when turning the corner. This $\epsilon$ value will reach its maximum for each row at mid point along the curved shape 81 in a corner as shown in FIG. 12. Accordingly, the step height 8 is gradually reduced from both ends of the curved shape 81 to reach a minimum height reduced by an $\epsilon$ value at mid point along the curved shape 81 in each corner of the supporting frame. The $\epsilon$ value for each step in the corners is dependent on the number of rows facing the step, on the tensile stress applied when coiling the conductor, and on the bending radius applied to the conductor when turning the corner. This ensures proper filling of each row in the recess portion of the supporting frame in accordance to the provided steps and allows efficient coiling of the supporting frame.

Figure 13:
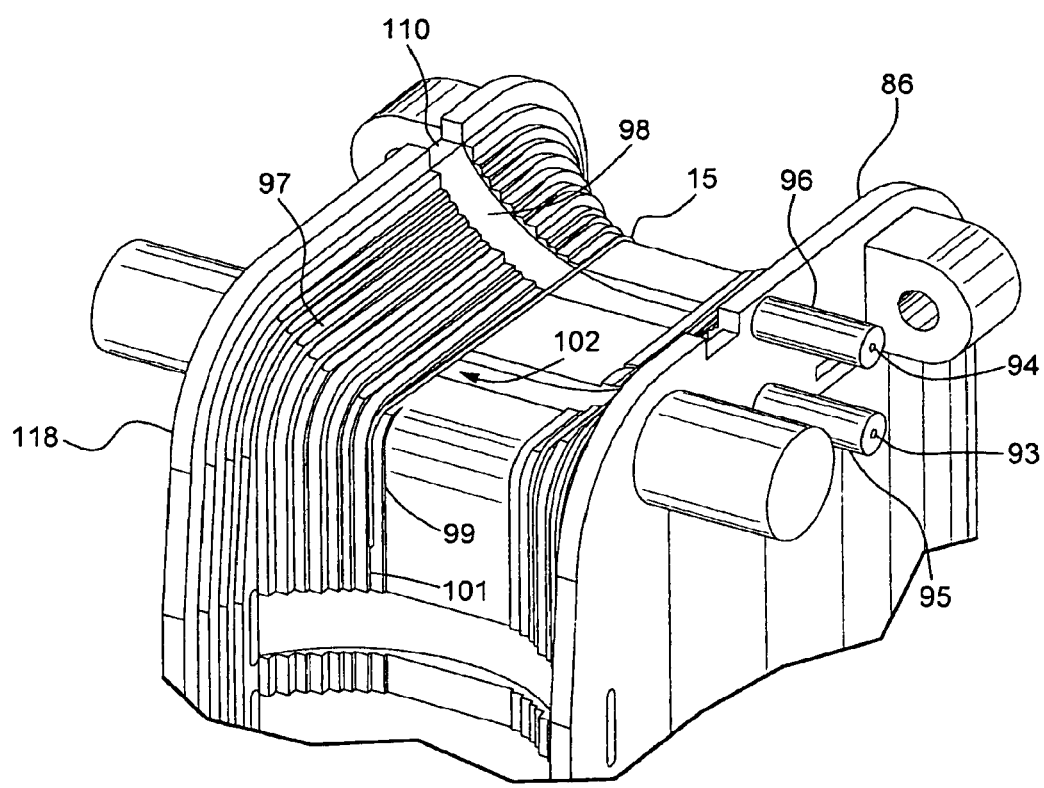
FIG. 13 is a perspective cropped view of the supporting frame shown in FIG. 11 showing how to coil a conductor from one row to the next according to a preferred embodiment.
Figure 14:
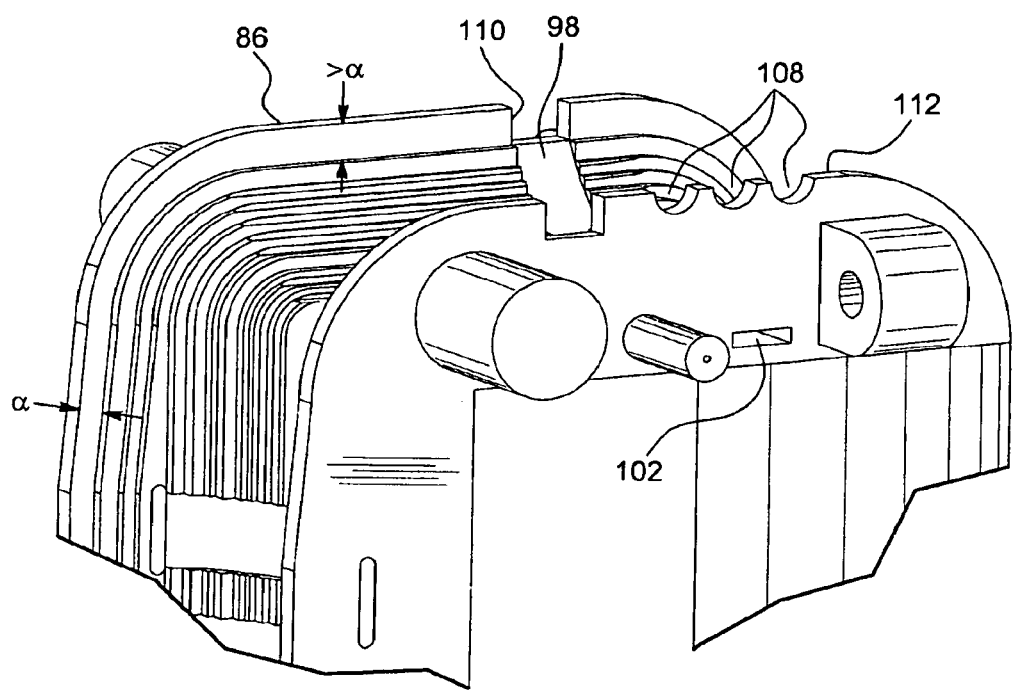
FIG. 14 is a perspective cropped view of the supporting frame providing space for routing taps according to a preferred embodiment.

Referring to FIG. 13, the support frame further comprises free passage ways 97 between rows for allowing the last coiled conductor in a row, next to the edge of a step 99, to switch to the upper row, next to the edge of the upper step 101, while bending around the corner 118. To exit the two coil leads out of the supporting frame, two holes 93 and 94 are perforated on one side of the supporting frame, one hole aligned with the flat surface of the recessed portion to start the coiling the first row, and the other aligned with the last coiled row. Insulating tubes 95 and 96 can be added to guide the coil leads away from the supporting frame so that an insulating flexible sleeve can be slid on each lead and strapped around the exit tube for increased insulation around the leads outside of the coil. Alternatively, the lead on the last coiled row can exit between the coil frame edge 86 and the insulating layer 19 through insulating paper sleeves. Referring to FIG. 14, the edges 86 on top of the supporting frame could extend over the last row of conductors to provide a space for the coil lead to exit. The supporting frame edge on the exit side would comprise at least one transverse slot 108 for allowing the dressed lead to make its way out. More slots can be provided if more than one dressed lead is required on the coil to allow connections to a tap selector.

Figure 15:
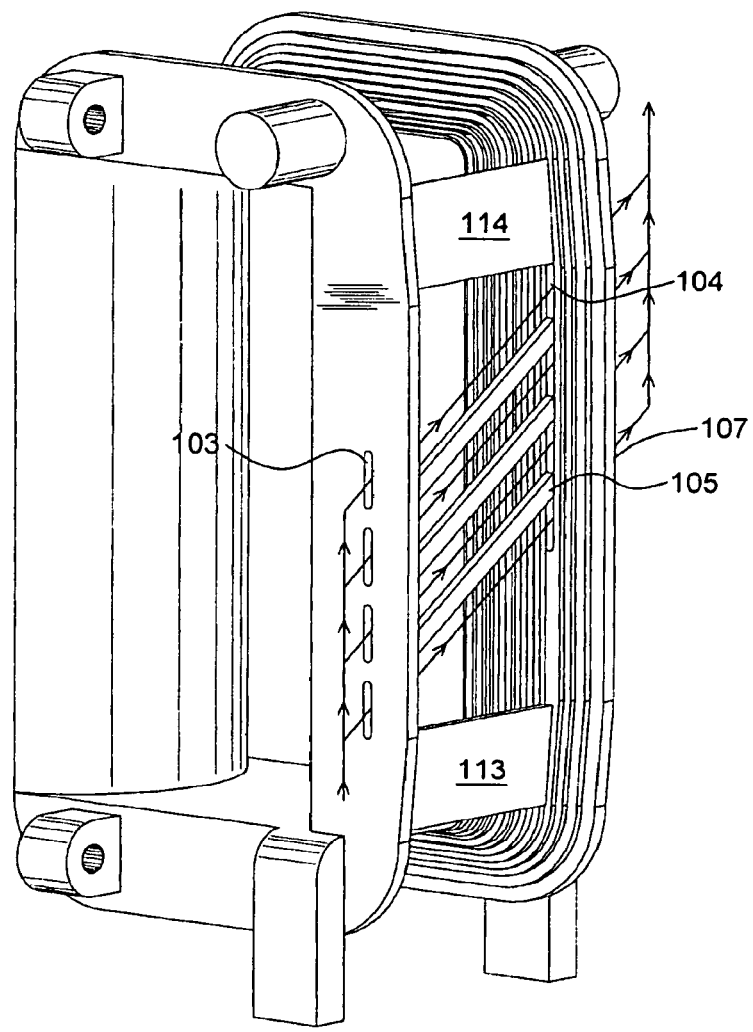
FIG. 15 is a perspective view of a supporting frame provided with skewed ducts for convecting oil to flow through according to a preferred embodiment.
Figure 16:
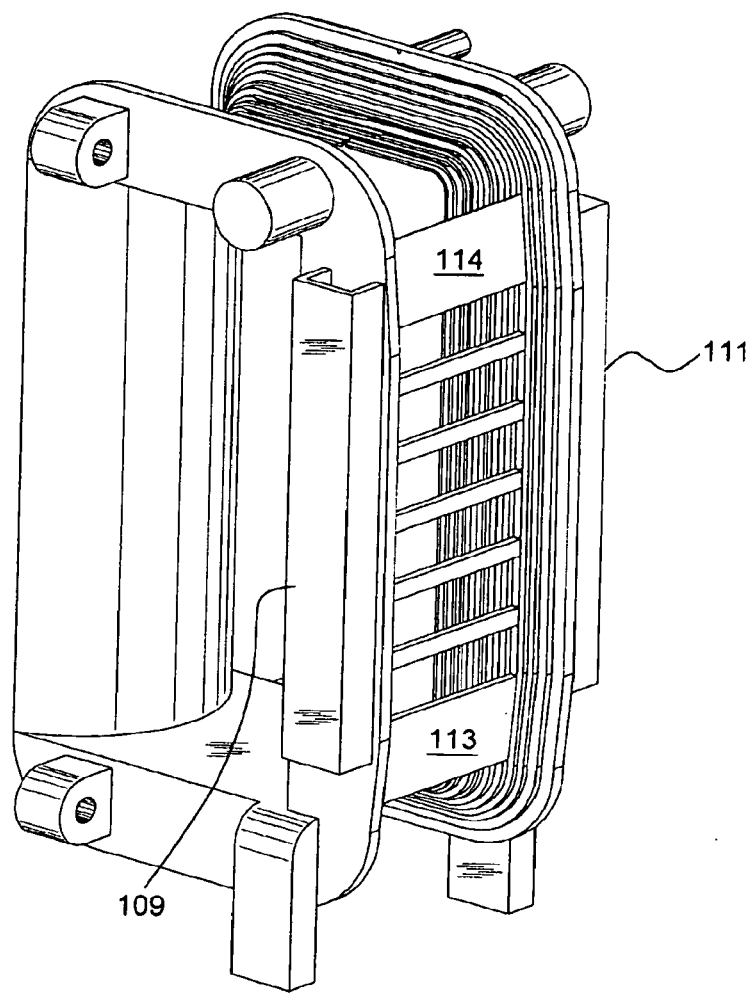
FIG. 16 is a perspective view of a supporting frame provided with horizontal ducts for convecting oil to flow through according to another preferred embodiment.
Figure 17:
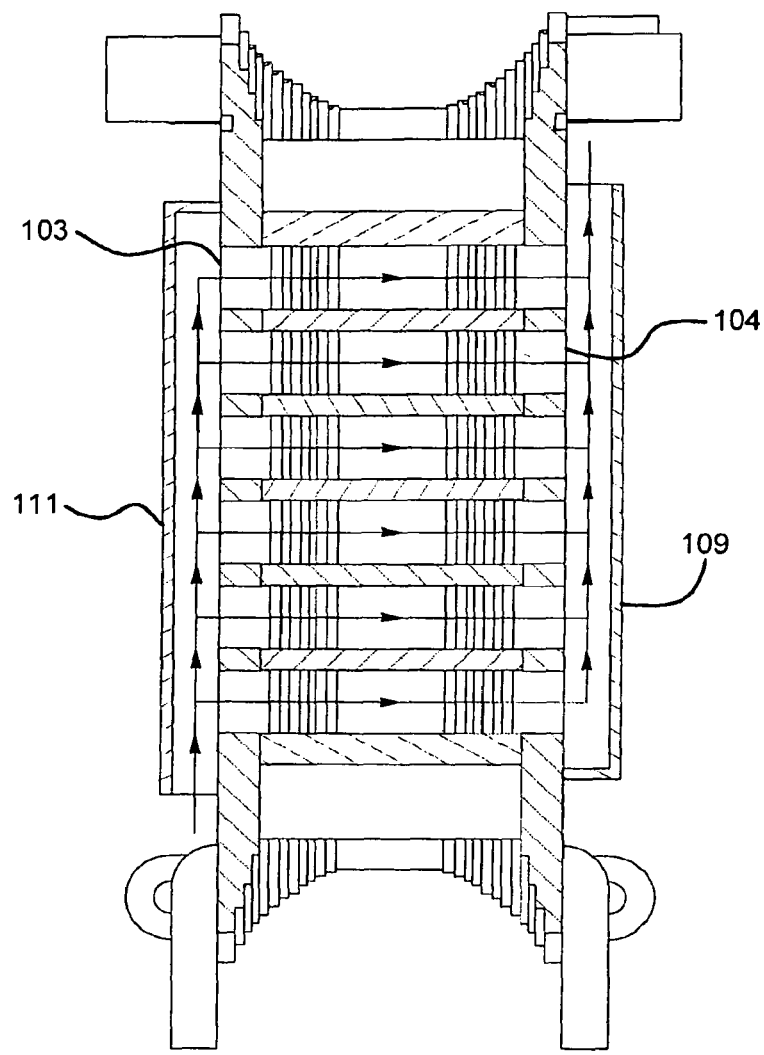
FIG. 17 is a cut view of a supporting frame shown in FIG. 16.

The secondary sub-coils 7 as shown in FIG. 1 have significant outer surface portions available for oil convection cooling within the transformer tank. This includes the portion located within the core window opening. For the primary coils however, the heat is evacuated via the secondary coil and the supporting frame. Further cooling capacity of the primary coils can be added by introducing cooling ducts between rows of conductors 15. Referring back to FIG. 10, the supporting frame is provided on each side with openings 103, 104 and transversal insulating spacers 105 inserted between two rows of conductors 15 to create opening ducts between spacers for oil to flow through in order to cool the conductors. FIG. 15 shows a perspective view of the cooling ducts. The spacers 105 are added in the recessed portion of limb 107 of the supporting frame and are skewed to create upward oil circulating ducts. To make space for the spacers, the height of the steps 8 on both sides of the spacers are increased. Two ramp-up spacers 113 and 114 could also be used to smooth the elevation of the conductors. The spacers 105 being skewed, flow of oil in the ducts is provoked by the chimney effect. The oil enters via the opening 103 and exits via the opening 104 on the other side of supporting frame. The spacers 105 could also be placed horizontally as shown in FIGS. 16 and 17. In this case, additional vertical ducts 109 and 111 are added on each side of the supporting frame to create the chimney effect. Each duct has an opening for oil to get in or to get out. Oil entering from the bottom of the tank is guided up by the vertical duct 111, enters in the openings 103, flows through the coil, flows through the openings 104 and is collected by the vertical duct 109 to exit at the top. The same vertical ducts can be added with the skewed spacers to increase the chimney effect and therefore the oil flow for better cooling. With the provided ducts, heat can be evacuated from the conductors of the primary coil located in the core window opening, by using the high thermal conductivity of the conductors themselves to carry the heat out to the location of the ducts. In another preferred embodiment, additional cooling ducts can be provided by transversely slotting the steps in the recessed portion of the supporting frame from one opening 103 to the other side opening 104 to create cooling ducts 106 as shown in FIGS. 10 and 11 that will allow flowing oil to cool the inner surface of the primary sub-coil facing the recessed portion of the supporting frame. Additionally, these ducts 106 can be skewed to create upward oil circulating ducts. Referring to FIGS. 9, 13 and 14, further cooling can be provided on the top and bottom horizontal portions of the supporting frame by slotting only one side in the steps from the flat bottom surface of the recessed portion of the supporting frame up to an opening 110 and, by providing a horizontal opening 102 through the other side, the opening 102 being aligned with the flat bottom surface of the recessed portion. The slot 98 with both openings 102 and 110 will provide an upward cooling duct to create a convecting flow of oil by chimney effect.

Figure 18:
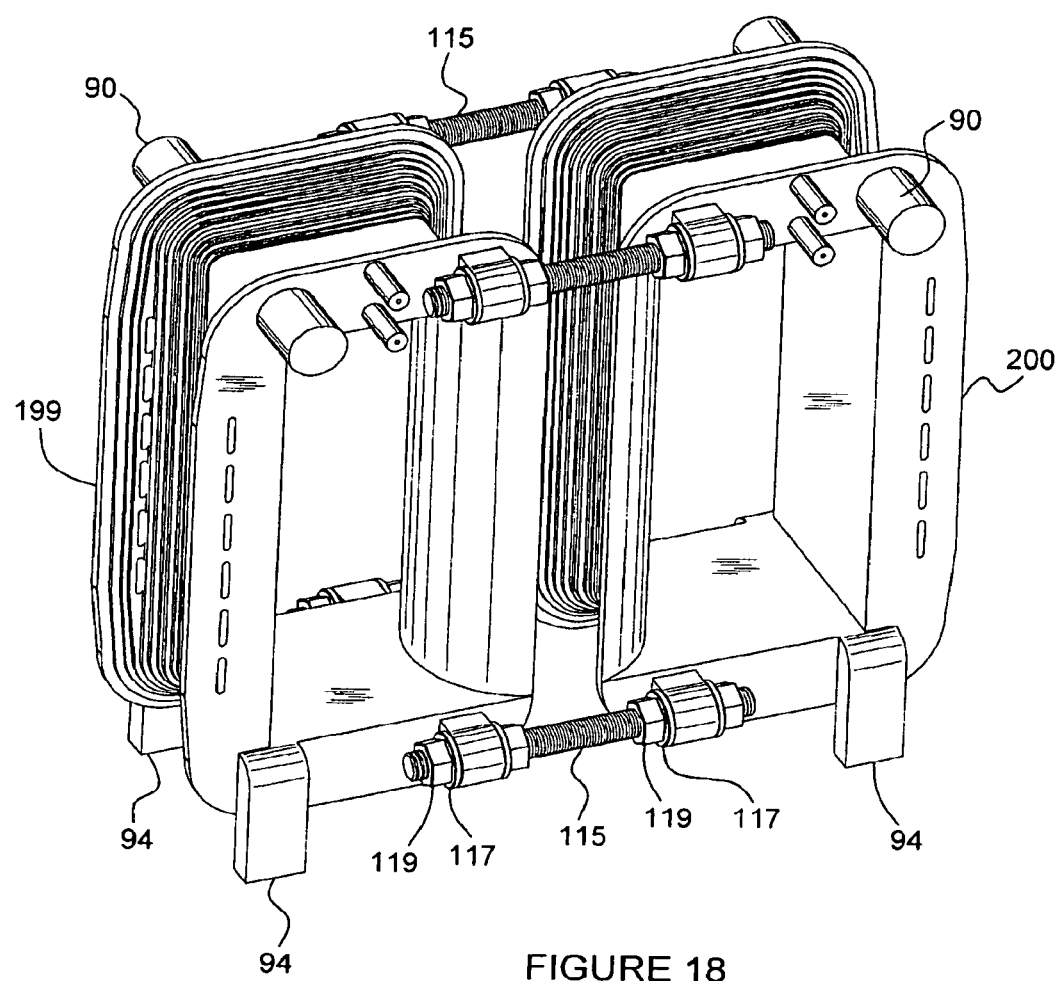
FIG. 18 is a perspective view of two supporting frames assembled back-to-back and secured with attaching means.

Referring back to FIG. 11, the supporting frame of the present invention further comprises protuberant portions 84 located at the top and bottom on each side of the supporting frame, near the arc shaped limb 87. These protuberant portions 84 comprise an opening 88 perpendicularly aligned with the edge of the arc shaped limb 87. FIG. 18 shows two supporting frames assembled back to back with adjusting attaching means such as insulated threaded rods 115 with insulated washers 117 and nuts 119. Such adjusting attaching means are used to secure both supporting frames together to form a unique rigid structure. Positioning the nuts on the rods allows adjustment of the distance between the two frames. Furthermore, the supporting frame is provided with at least two protuberant portions 94 located on each side to allow the assembled frames to lean on a flat base. Furthermore, the supporting frame is equipped with at least two protuberant portions 90 located on each side to provide bollards to ease lifting and handling of the assembly.

Figure 19:
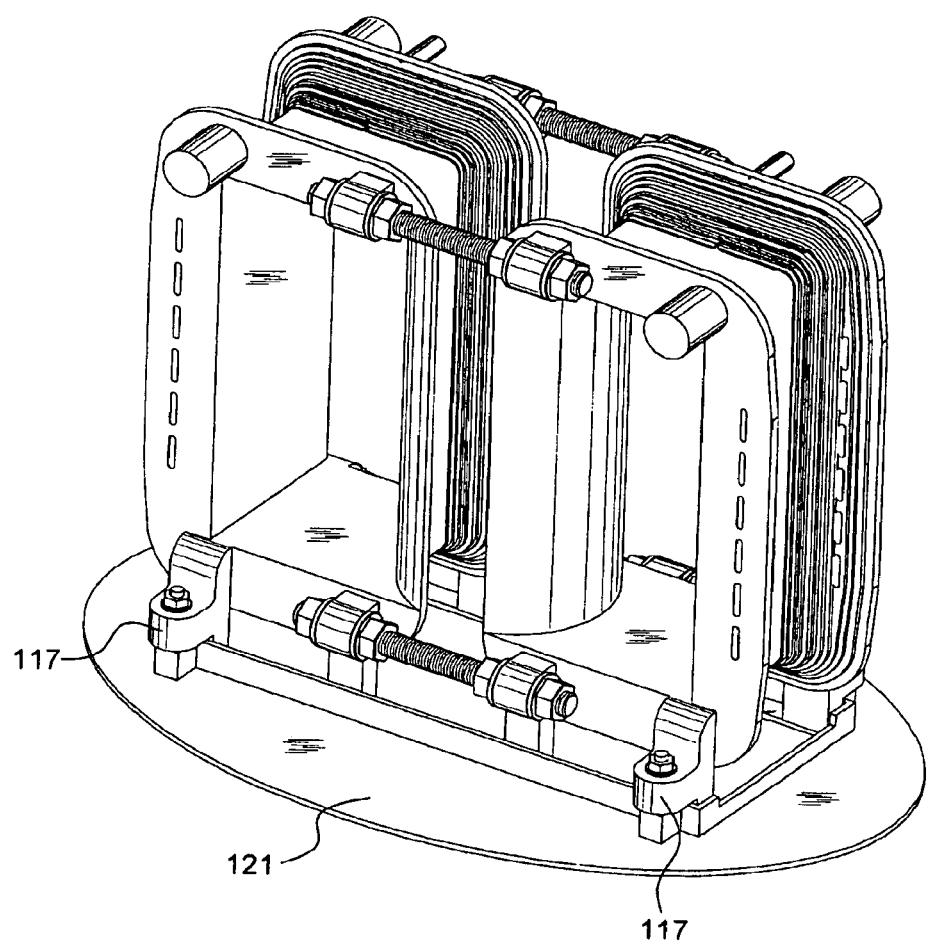
FIG. 19 is a perspective view of two supporting frames assembled back-to-back and secured to a base with attaching means at the lower portion of the frames according to a preferred embodiment.
Figure 20:
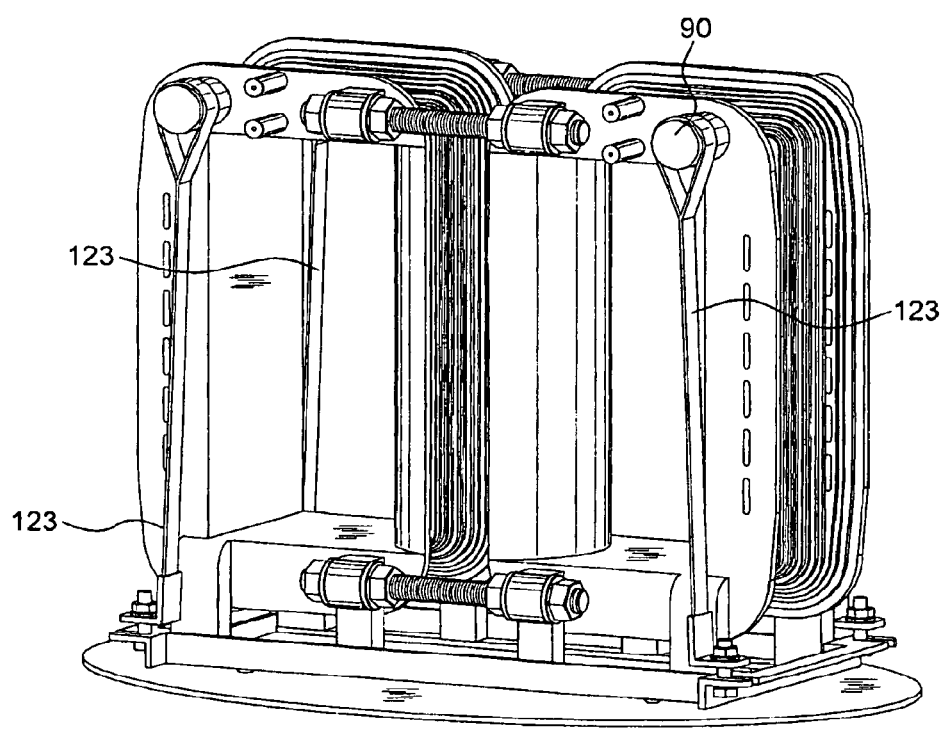
FIG. 20 is a perspective view of two supporting frames assembled back-to-back and secured to a base with attaching means to a base at the top portion of the frames according to another preferred embodiment.
Figure 21:
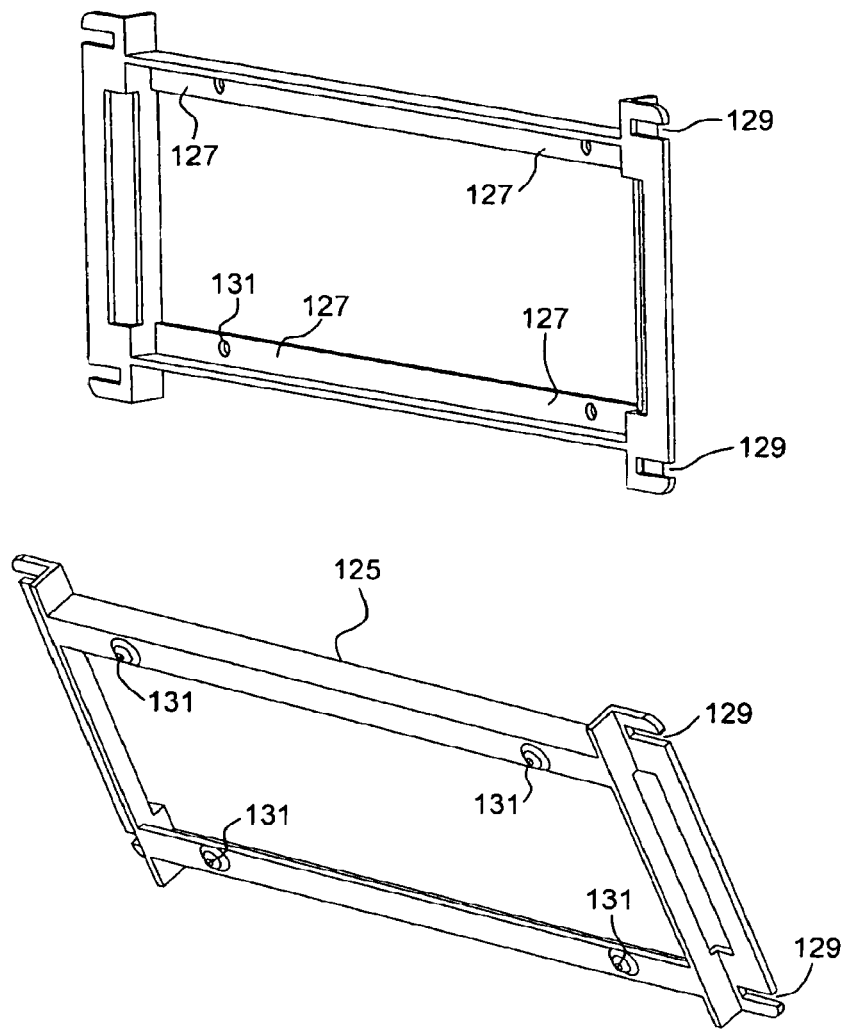
FIG. 21 is a perspective view from to viewing angles of a base frame for receiving two supporting frames assembled back-to-back.

The supporting frame of the present invention comprises means to secure the back to back supporting frames within a transformer tank. Referring to FIG. 19, each supporting frame comprises protuberant portions 117 located at the bottom on each side of the supporting frame. These protuberant portions 117 comprise an opening perpendicularly aligned with a base plane 121 for securing the assembled supporting frames to the base with nuts screwed on a threaded elevated rods fixed on the base plane. In another preferred embodiment shown in FIG. 20, attaching straps 123 secure the supporting frame to the base plane by each having one end looping around the bollard 90 and the other end being pulled and anchored with washers and nuts to a threaded rod fixed at the base. These attaching means using straps 123 have the advantage of holding the supporting frames by pulling down their top portions. Normally, the base plane is the inside bottom surface of a transformer tank onto which the elevating threaded rods are fixed on by means of a weld. However, it may be difficult to provide a uniform flat surface for the supporting frames to adequately lean on because the bottom surface of a tank may be slightly convex. The present invention comprises as shown in FIG. 21 a base frame 125 basically constituted of metal angles cut and weld together to provide a rigid levelled surface 127 to support the frame assembly and openings 129 for holding bolts for anchoring the support frame attaching means. The base frame also comprises nipples 131 formed under the base frame and which are used as welding points to secure the base frame at the tank bottom. The base frame 125 is shown for both attaching means in FIGS. 19 and 20. With the shown attaching and anchoring means, the two back-to-back supporting frames form one rigid structure which is solidly secured on the bottom of the tank. The two supporting frames offer the advantage of supporting the coils and the core in the tank without transmitting mechanical stresses to them.

Figure 22:
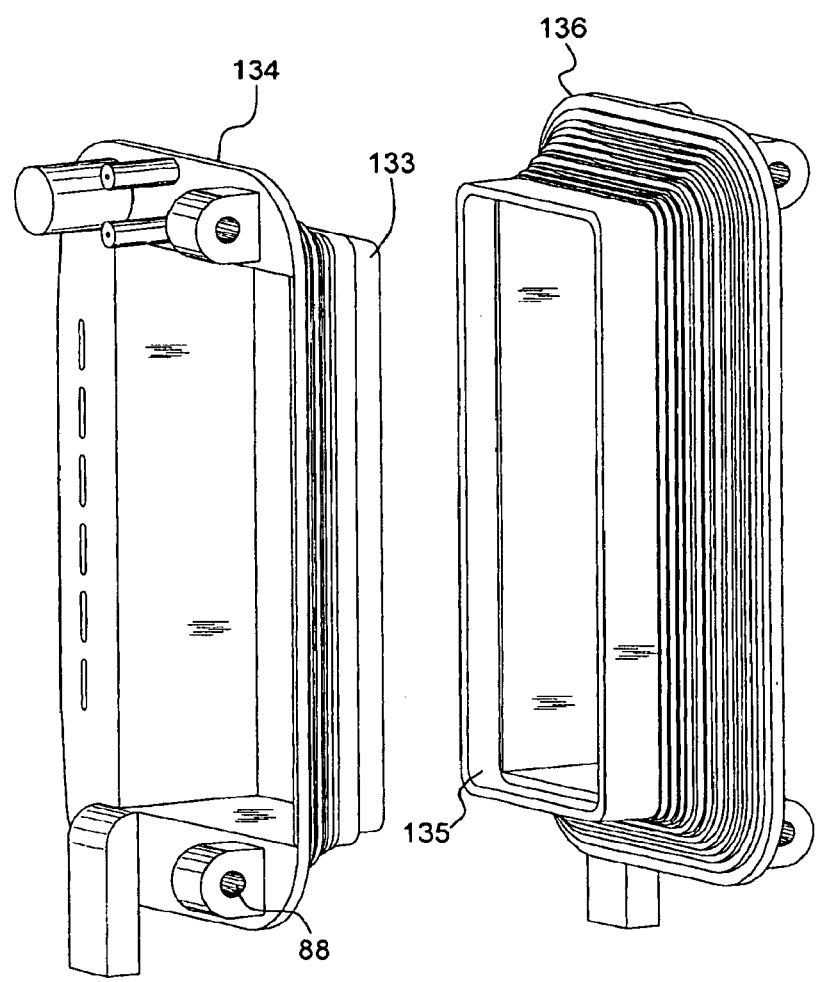
FIG. 22 is a perspective view of a two part assembly of a supporting frame.

Referring now to FIG. 22, there is shown a supporting frame made of a two part assembly. Both parts 134 and 136 are mated together by inserting the male portion 133 of the first half supporting frame 134 into the female portion 135 of the second half supporting frame 136. This mating junction provides a tracking path at least three times superior to the insulating thickness near the junction once the two halves are assembled. A proper binder compatible with the frame material can be used to fuse the two parts together at the junction. Each of the two parts frame assembly 134 and 136 can therefore be produced in series at low cost using a two part mould after which openings such as openings 88 are simply drilled.

The description of the supporting frame being complete, the following description will disclose how the primary and secondary sub-coils are wound around a supporting frame, and how two coiled supporting frames are assembled to provide a transformer coil, and how an in-line annealed amorphous metal ribbon is then rolled up on a mandrel around the coils to form a core. The coil arrangements of the present invention and the rolling of the ribbon can be assembled in a fully automated manner.

Figure 23:
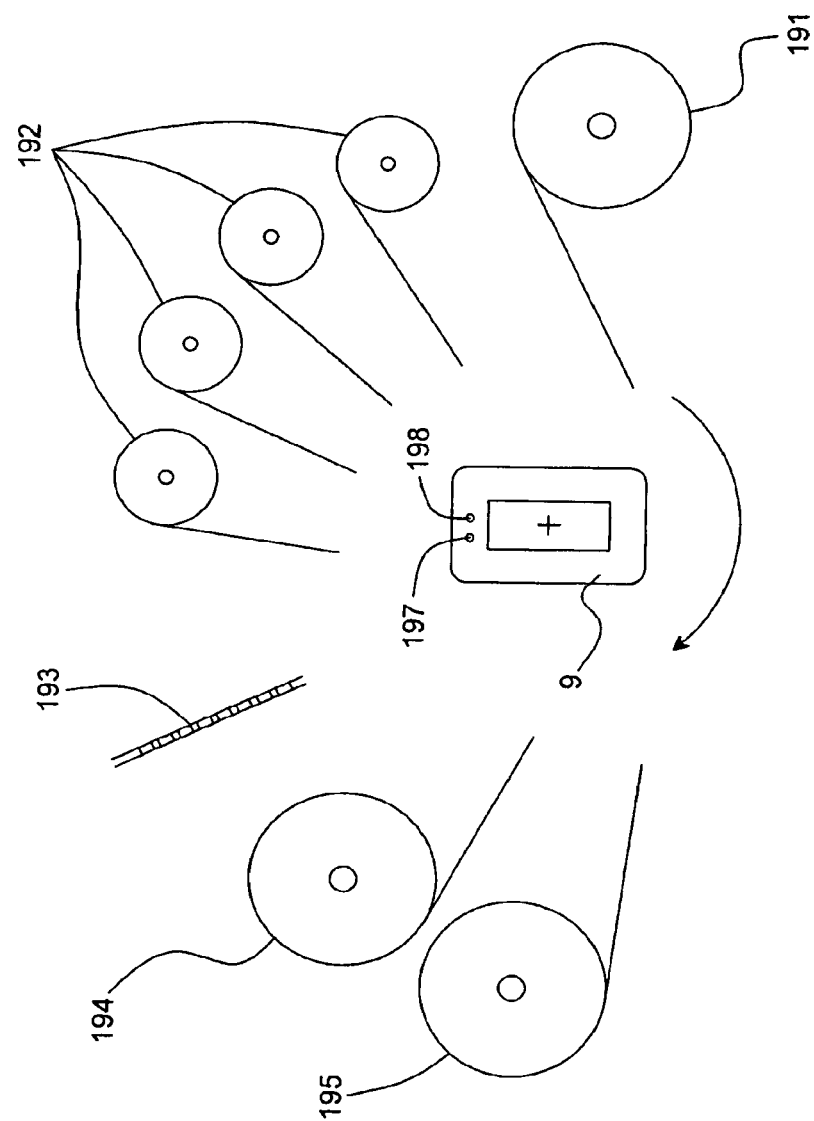
FIG. 23 is a schematic drawing of a system for winding conductors around a supporting frame.

FIG. 23 shows a schematic representation of a means used to assemble coil arrangements. An empty supporting frame 9 is mounted on a mandrel driven by a servo motor drive. Around the rotating frame, are located different material feeders, comprising: a reel containing a conductor wire 191; a plurality of reels each containing insulating strips 192 having different widths to fit in each row within the supporting frame; a cassette containing duct spacers 193; a reel containing a conductor strip 194; and a reel containing an insulating strip 195 slightly larger than the conductor strip. Each material feeder is provided with a robot manipulating arm and a cutting actuator to bring, engage, wound and cut the material on the rotating supporting frame 9. Preferably, each reel 191, 194 and 195 contains enough material to wind an integer number of supporting frames 9 to avoid making splices and to keep scrap to a minimum. The insulating strips 192 are partially pre-cut to make them frangible at a required length, and only require a small sudden tensile force to liberate the strip from the roll.

Figure 24:
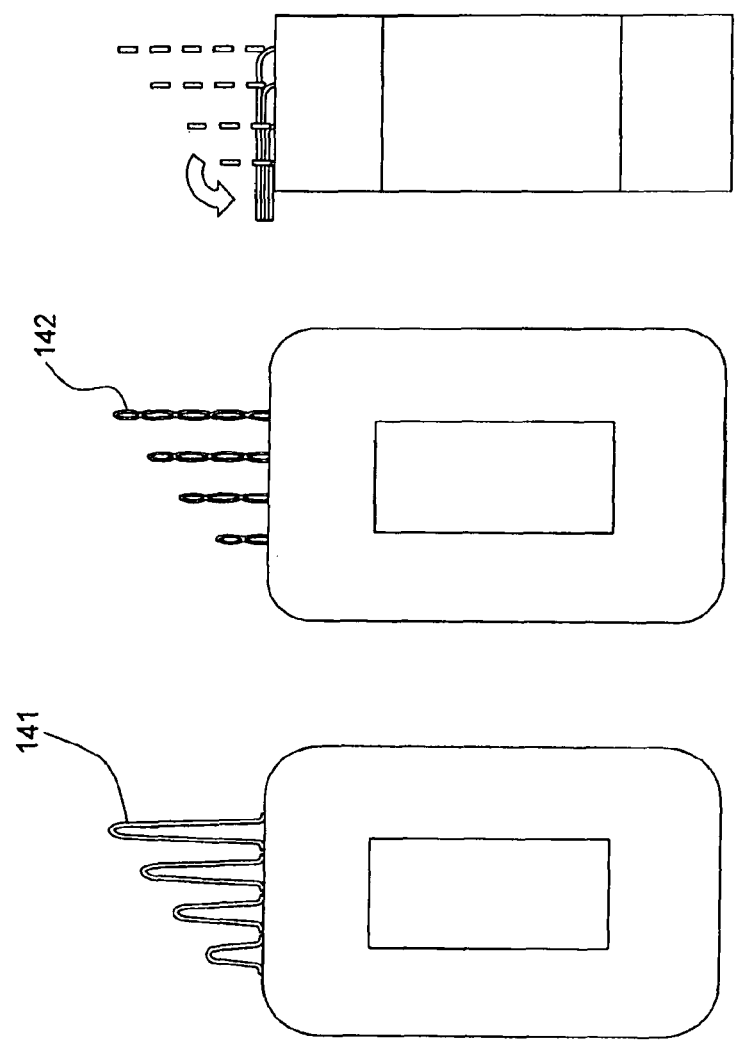
FIG. 24 is a schematic drawing of a supporting frame showing a method for making taps on the conductor coil during winding of said coil.
Figure 25A:
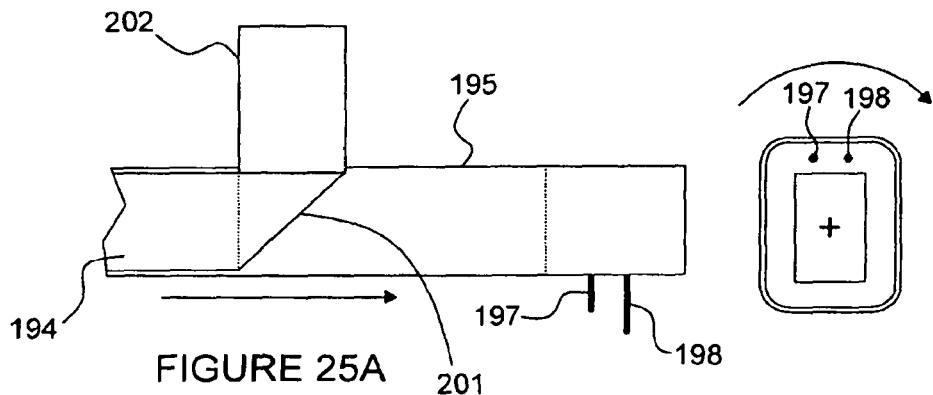
FIGS. 25 A to E' are schematic drawings of sequences involved for winding a conductor strip to form a coil around the supporting frame according to a preferred embodiment.
Figure 25B:
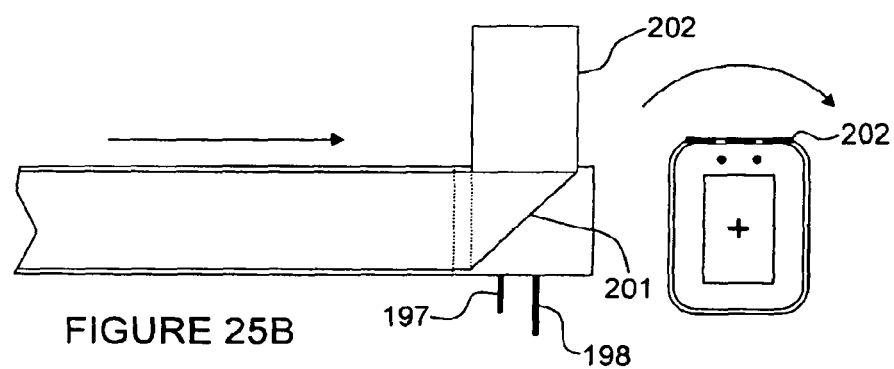
Figure 25C:
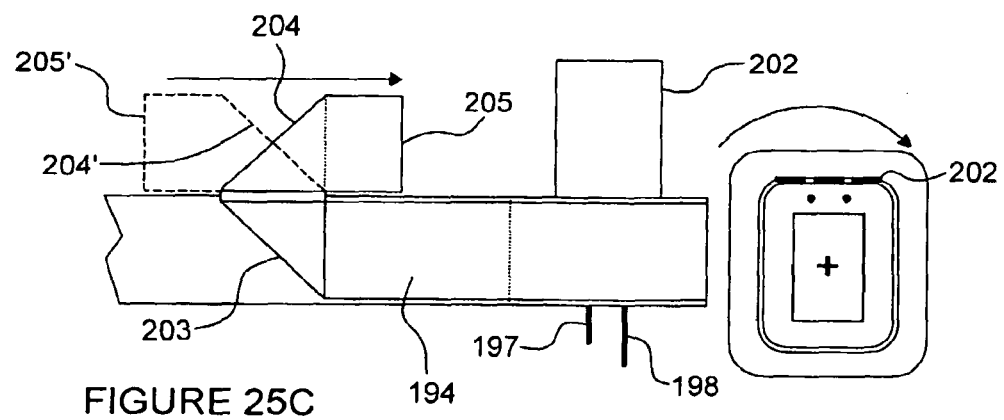
Figure 25D:
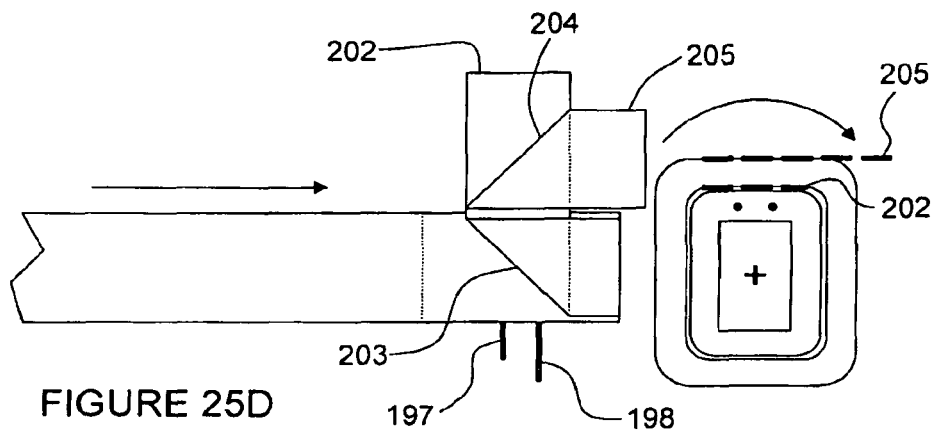
Figure 25E:
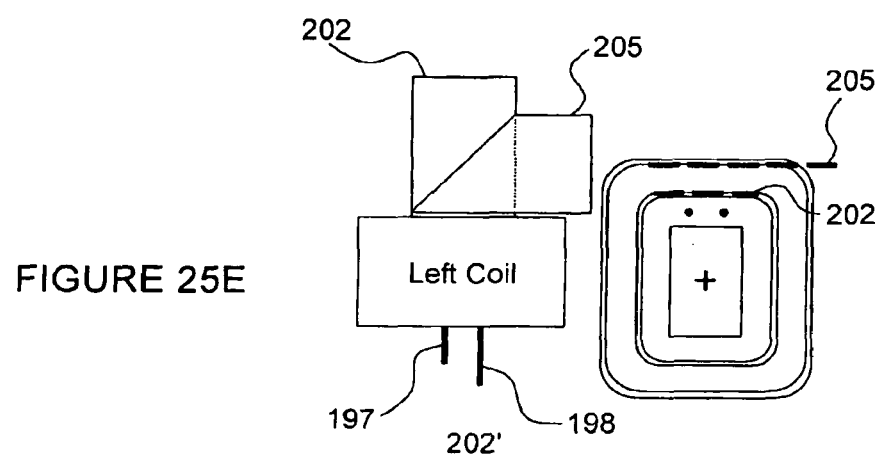
Figure 25E:
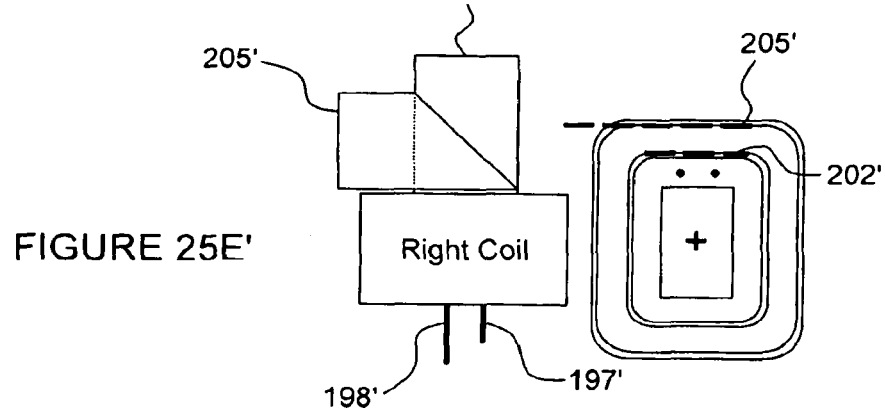
Figure 26A:
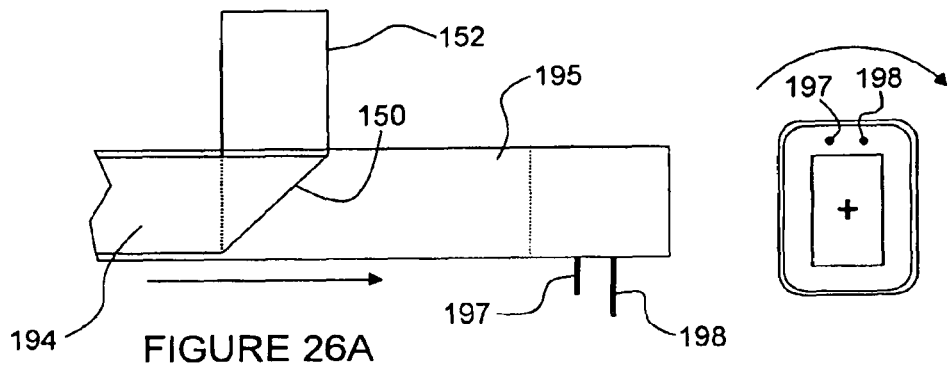
FIGS. 26 A to J' are schematic drawings of sequences involved for winding a conductor strip to form a coil around the supporting frame according to another preferred embodiment.
Figure 26B:
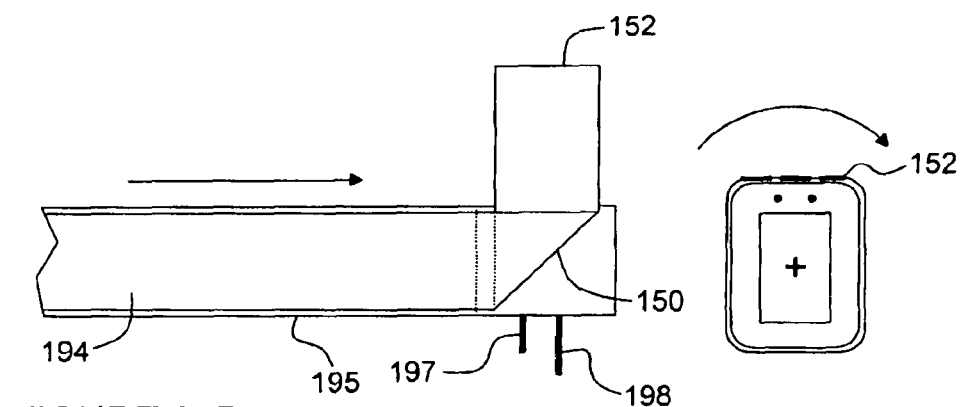
Figure 26C:
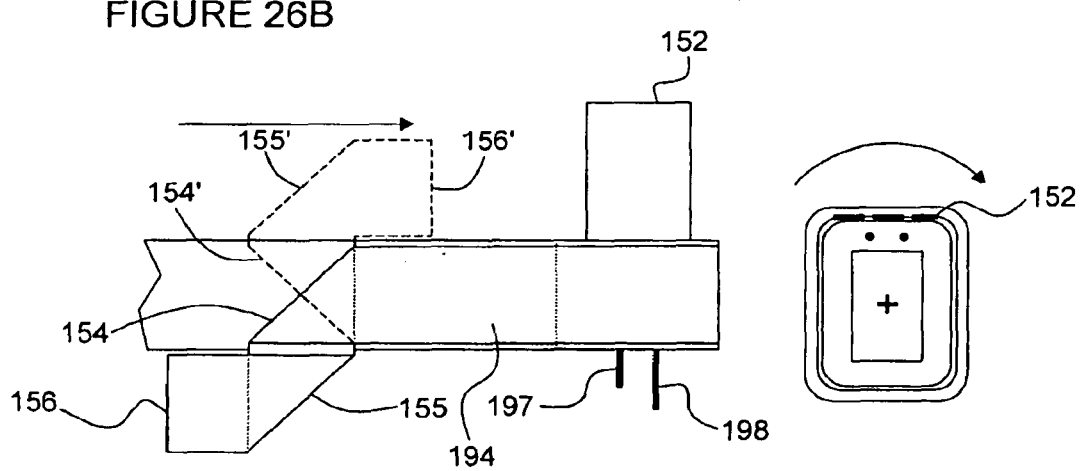
Figure 26D:
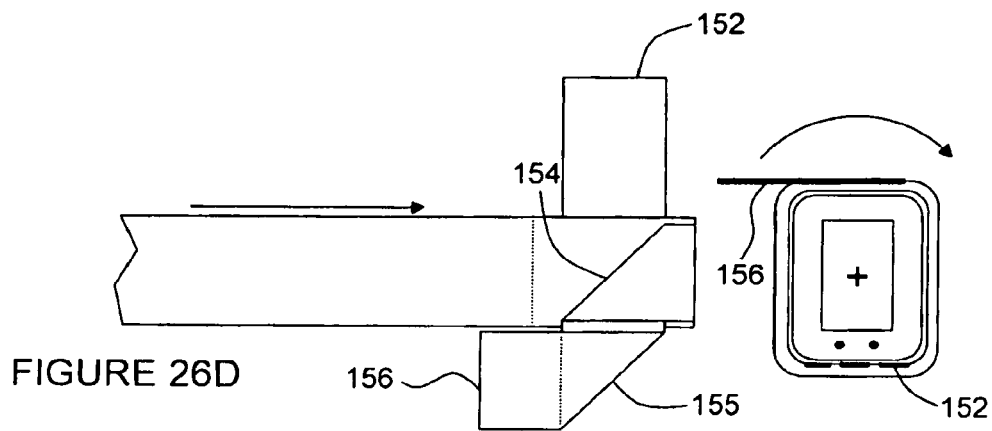
Figure 26E:
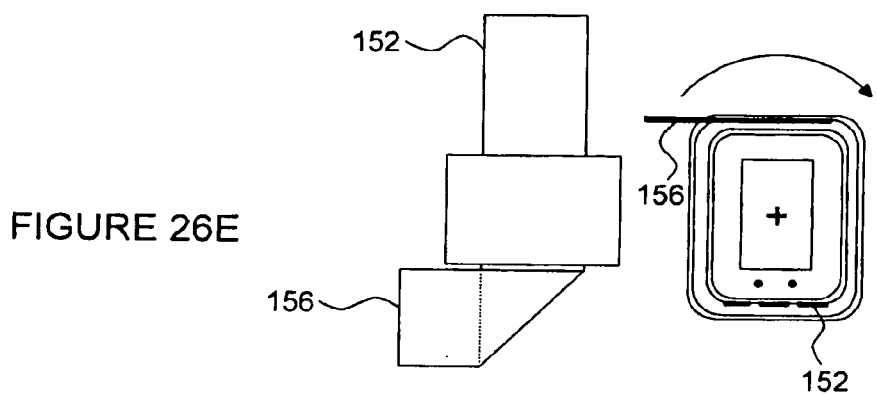
Figure 26F:
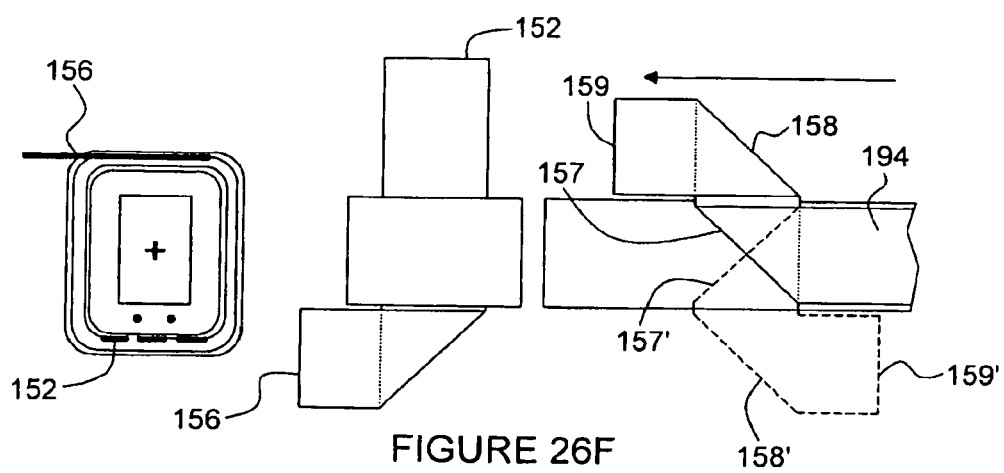
Figure 26J:
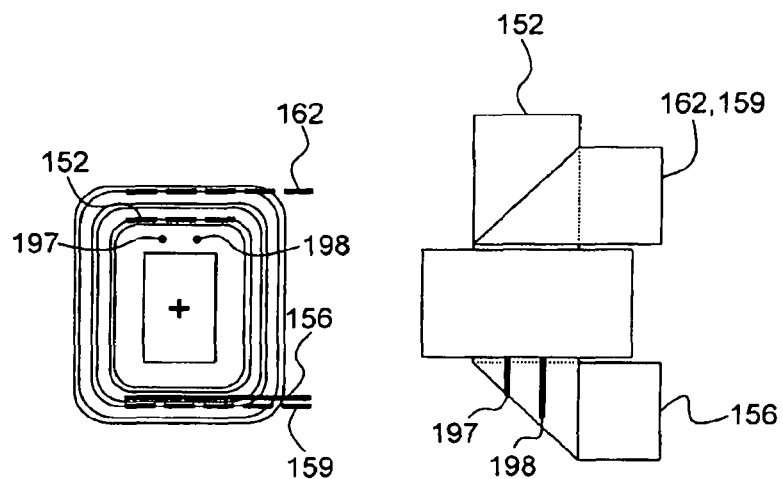
Figure 26J:
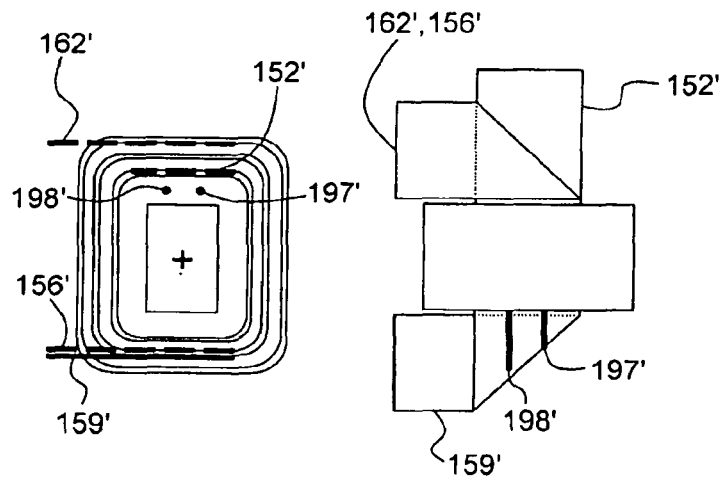

In the assembled supporting frames shown in FIG. 18, there are left-coil and right-coil supporting frames 199 and 200. Referring again to FIG. 23, to coil the primary sub-coil on a left-coil or a right-coil supporting frame, the conductor wire is first brought by the robot manipulating arm and guided through the exit opening 197 aligned with the first bottom row on one side of the supporting frame. The conductor is then wound for a predetermined number of turns on a single layer to fill the first row. Before engaging the wire on the next row, a segment of insulating strip 192 having the corresponding row width is wound around the frame to completely cover the first row with both extremities overlapping each other before starting to coil the next row with the conductor wire. If ducts are planned in between two determined rows, spacers 193 are picked from the cassette and are installed on the designated limb of the supporting frame. These spacers could be pre-glued to an insulating strip to ease installation. When the last row is coiled, the wire is cut and guided out through the exit opening 198 which is aligned with the row and which exits on the same side with the exit opening 197 on the supporting frame. FIG. 24 shows a case where the primary sub-coil is provided with a plurality of exit leads on the last coiled row for eventual connections to a tap selector. While the last row is being coiled, a protuberant conductor loop 141 is formed at a predetermined turn count. Each loop 141 is twisted to form a lead 142 which is then dressed with an insulating sleeve and bent on the side of the coil supporting frame, preferably in the slots 108 shown in FIG. 14. The primary sub-coil is then completed and has exit leads on the side of the supporting frame associated to a left-coil or a right-coil arrangement, whichever is being wound. The next step will be the winding of the secondary sub-coil.

The winding of the secondary sub-coil consists of winding both an insulating and conductor strip over the primary sub-coil of overall rectangular shape. When winding the conductor strip, transverse exiting leads must be provided at the extremities of the conductor strip to provide an electrical connection to the coil. Strip segments of conductors could be welded perpendicularly at each end of the strip to form a right angle exit. In the present invention, the robot manipulating arm includes means to fold and shape the extremity of the strip 194. FIG. 25, sequences A to E show with schematic views the steps involved to fold and wind the conductor strip 194 side by side with an insulating strip 195 to form one secondary sub-coil in piggyback over the primary sub-coil. The left portion of the drawing in each sequence shows a top view of the supporting frame being wound with the conductor foil and the insulating strip arriving over the supporting frame which is rotating clockwise with reference to the right drawing showing the supporting frame from a front view. The dashed lines on the right "front view" drawing are indicative of elements hidden behind the supporting frame. The drawing sequences show the winding of a left-coil arrangement. For a right-coil arrangement, differences in the folding procedure will be shown with a dashed line and the identifier will include an additional superscript mark ('). Starting with sequence A, prior to starting the winding of the conductor strip 194, a thick insulating layer 19 is built by winding multiple turns with the insulating strip 195. Once the desired dielectric thickness is obtained, the lead of the conductor strip 194 is folded once by the robot manipulating arm on the opposite side to the primary sub-coil leads 197 and 198 location, along folding line 201 to create a lead 202 extending transversely to the coil. Then, the length of a lead must be sufficiently long to allow connection to a transformer tank bushing with further upward folding, or to the exit lead of another coil. The folding line shown can have an angle between 15 and 75 degrees which will provide a lead at an exit angle from 30 to 150 degrees with reference to the side of the supporting frame. Such play in the angle can be practical for aligning the upward folded lead strip with the bushing attached to a curved wall of a round or oval transformer tank. For the purposes of the description, the strip is folded along a 45 degrees folding line. In sequence B, the folding line 201 of the strip 194 is brought on top of the supporting frame limb where the exits leads 197 and 198 are located. Both conductor strip 194 and insulating strip 195 are then wound simultaneously for an appropriate number of turns. In sequence C, the conductor foil 194 is cut and the trailing end is folded twice along two 45 degree folding lines 203 and, 204 (204') on the opposite side to the primary sub-coil leads 197 and 198 location to provide a lead 205 (205') extending in parallel with the coil and oriented in the same direction (opposite direction for a right-coil) as the direction of travel of the strip being wound. The location of the folding line 203 on the strip 194 has been chosen in order to arrive on top of the limb of the supporting frame where the exit leads 197 and 198 are located as shown in sequence D. The winding of the secondary sub-coil is then completed. To finalize the winding of the coil arrangement, a few turns of the insulating strip 195 are wound. Sequences E and E' show completed left-coil and right-coil arrangements.

FIG. 26, sequences A to J show with schematic views the steps involved to fold and wind the conductor strip 194 with insulating strip 195 to form two secondary sub-coils in piggyback over the primary sub-coil. The drawing sequences show the winding of a left-coil arrangement. For a right-coil arrangement, differences in the folding procedure will also be shown with a dashed line and the identifier will include an additional superscript mark ('). Prior to starting the winding of the conductor strip 194, a thick insulating layer 19 is built by winding multiple turns with the insulating strip 195. Once the desired dielectric thickness is obtained, the lead of the conductor strip 194 is folded once by the robot manipulating arm on the opposite side to the primary sub-coil leads 197 and 198 location, along a 45 degree folding line 150 to create a lead 152 extending perpendicularly to the coil. In sequence B, the folding line 150 of the strip 194 is brought on top of the supporting frame limb where the exits leads 197 and 198 are located. Both conductor strip 194 and insulating strip 195 are then wound simultaneously for an appropriate number of turns. In sequence C, the conductor foil 194 is cut and the trailing end is folded twice along two 45 degree folding lines 154 (154') and, 155 (155') on the same side (opposite side for a right coil) to the primary sub-coil leads 197 and 198 location to provide a lead 156 (156') extending in parallel with the coil and oriented in the opposite direction (same direction for a right-coil) with respect to the direction of travel of the strip. The location of the folding line 154 (154') on the strip 194 has been chosen in order to arrive on top of the limb of the supporting frame which is the opposite to the one where the exit leads 197 and 198 are located as shown in sequence D. Then, a few turns of insulating strip 195 are wound to completely cover the first secondary sub-coil and the winding of the first secondary sub-coil is now completed as shown in sequence E. Next, in sequence F, with the conductor strip now being fed from the other side and the supporting frame now rotating counter clockwise, the end of the conductor strip 194 is folded twice on the opposite side (same side for a right-coil) with respect to the primary sub-coil leads 197 and 198, along two 45 degree folding lines 157 (157') and 158 (158'), to provide a lead 159 (159') extending in parallel and oriented in same direction (opposite direction for a right-coil) with respect to the direction of travel of the strip. The first folding in sequence C could have been done on the opposite side (same side for a right-coil) with respect to the primary sub-coil leads 197 and 198, in which case the first folding in sequence F will be done on the same side (opposite side for a right-coil) with respect to the primary sub-coil leads 197 and 198. In sequence G, the folding line 157 (157') of the strip 194 is brought on the supporting frame limb opposite to the limb where the exits leads 197 and 198 are located. Both conductor strip 194 and insulating strip 195 are then wound simultaneously for an appropriate number of turns. In sequence H, the conductor foil 194 is cut and the trailing end is folded twice on the opposite side to the primary sub-coil leads 197 and 198 along two 45 degree folding lines 160 and 161 (161') to provide a lead 162 (162') extending in parallel and oriented in opposite direction (same direction for a right-coil) with respect to the direction of travel of the strip. The location of the folding line 160 on the strip 194 has been chosen in order to arrive on top of the limb of the supporting frame where the exit leads 197 and 198 are located as shown in sequence I. The winding of the second secondary sub-coil is then completed. To finalize the winding of the coil arrangement, a few extra turns of the insulating strip 195 are wound. Sequences J and J' show completed left-coil and right-coil arrangements.

FIG. 27, sequences A to F show steps on how to assemble a core-coil arrangement to produce a transformer kernel. First, in sequence A, the two coil arrangements, one left-coil and one right-coil, are put back-to-back with the leads 156 with 156', 159 with 159', and 162 with 162' aligned towards each other with their ends overlapping. The two coil arrangements are then secured together using attaching means shown in FIG. 18. The sequences shown involve usage of coil arrangements comprising two secondary sub-coils. In the case of a single secondary sub-coil, the leads 156, 156', 159 and 159' are not present. Then in sequence B, a ductile and cuttable in-line curved annealed iron-based amorphous metallic ribbon is rolled on a mandrel pre-installed around the central circular limb formed by the back-to-back coil arrangements to form a circular core 1. In sequence C, when the core is completed, the two coil arrangements are unsecured and pushed away to lean against the internal wall of the window opening in the circular core 1 as shown in FIG. 4 and, are secured again together. Spacers 37 are then inserted between the two coil arrangements and the leads 162 with 162' and 198 with 198' are welded together at welding point 163 and 166. In sequence D, the leads 156 with 156' and 159 with 159' located under the circular core (upside-down view) are also welded together at welding points 164 and 165. The circular core transformer assembly of the present invention is best suited to be installed in an oval tank. In sequence E, the core-coil arrangement is put into a transformer oval tank comprising three low voltage bushings 212, 213 and 214 which are then respectively aligned and connected to upward folded leads 152, 162-162' and 152'. A top cover bushing 215 (high voltage) and ground lead 216 are respectively connected to leads 197 and 197'. Some tanks could be equipped with four low voltage bushings instead, where the leads 162 and 162" would not be welded together but would rather be each connected to a respective bushing. In cases where the core-coil arrangement would only comprise one secondary coil, the bushing 213 would not be present. FIG. 28 shows a front view of the core-coil arrangement in the tank with the bushings up front. Each lead 152, 162-162' and 152" is linked to the bushing by an upward folded strip segment that may have been welded on the lead, or which is realized by further folding the leads that were extending further away from the coils when they were wound in FIGS. 25 A to E' or 26 A to J'.

Figure 29A:
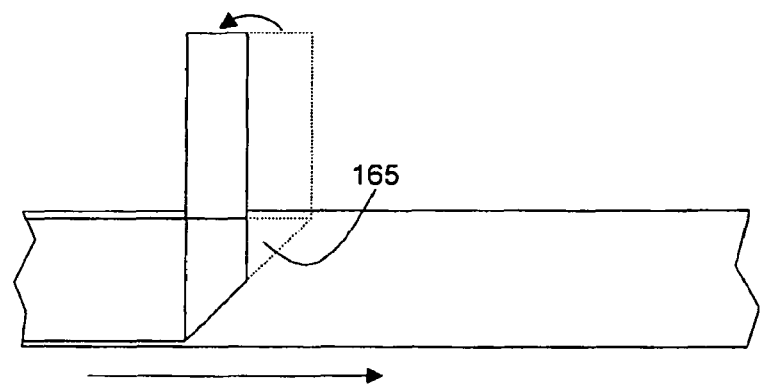
FIGS. 29 A and B are schematic drawings of an additional sequence involved for winding a conductor strip to form a coil around the supporting frame according to another preferred embodiment.
Figure 29B:
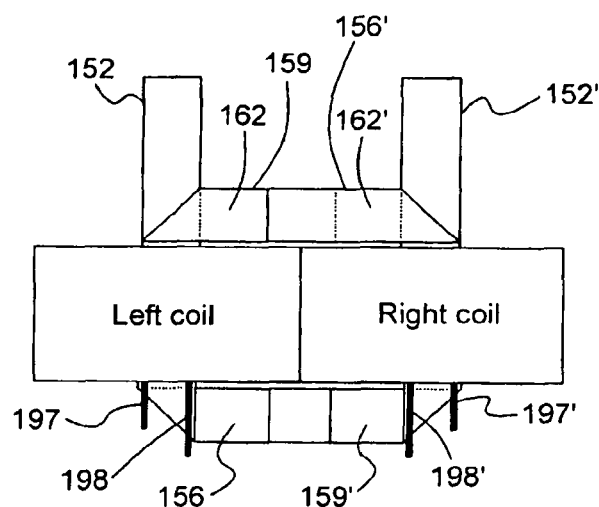

In cases where the conductor foil 194 produces bulky leads that are too large when folded, the winding sequences FIGS. 25 A to E' or 26 A to J' may incorporate an additional folding step as shown in FIG. 29A. The width of a lead is reduced by half by performing an additional fold along the folding line 165 once the first 45 degrees fold is executed and before further folding is performed. This will provide a coil arrangement with narrower leads as shown in the FIG. 29B.

Figure 30A:
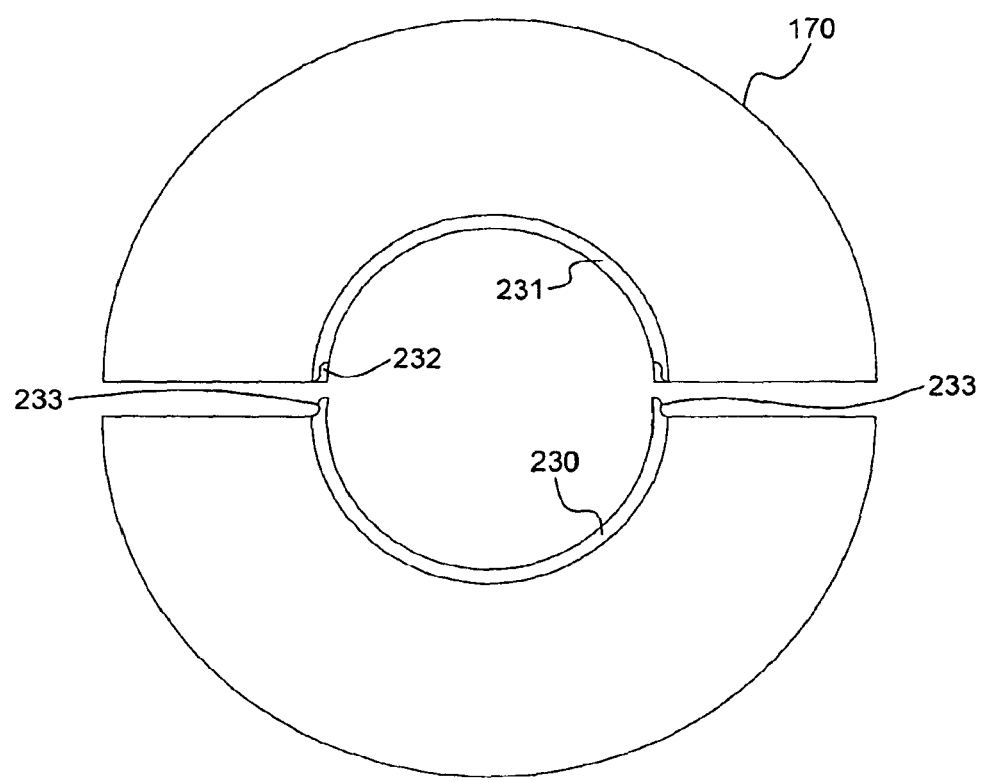
FIGS. 30 A to C are two front and perspective views respectively of a supporting mandrel for rolling-up a magnetic strip to form a circular core.
Figure 30B:
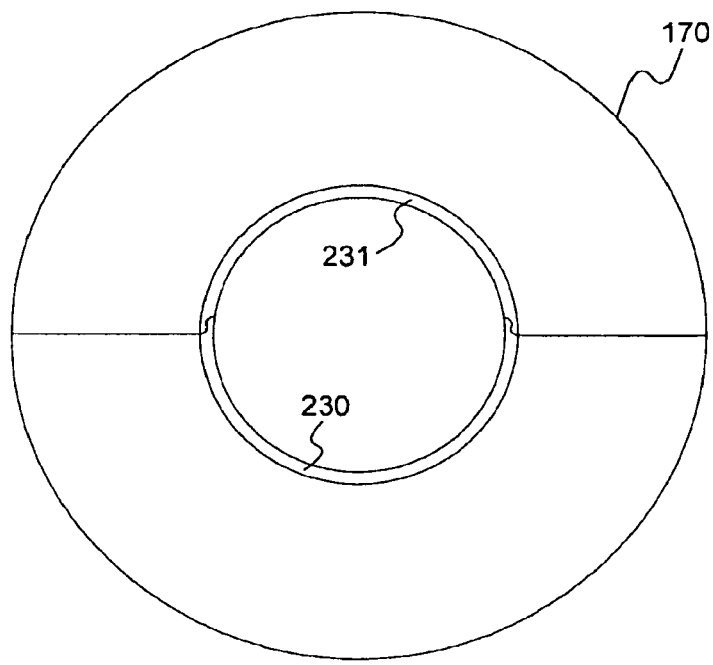
Figure 30C:
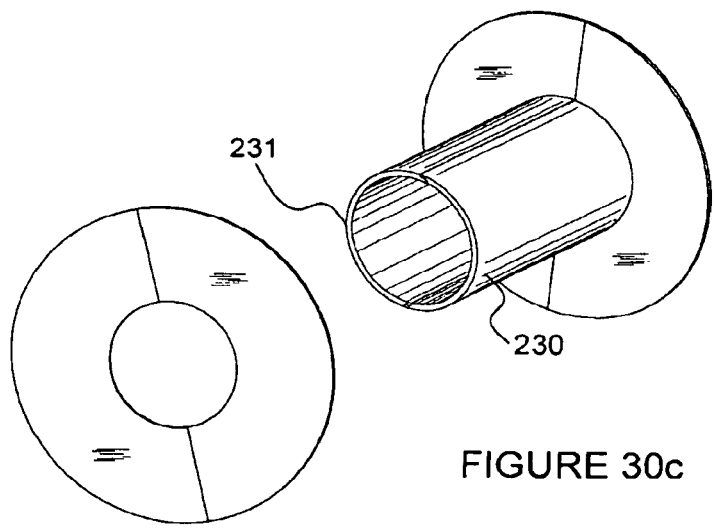
Figure 31:
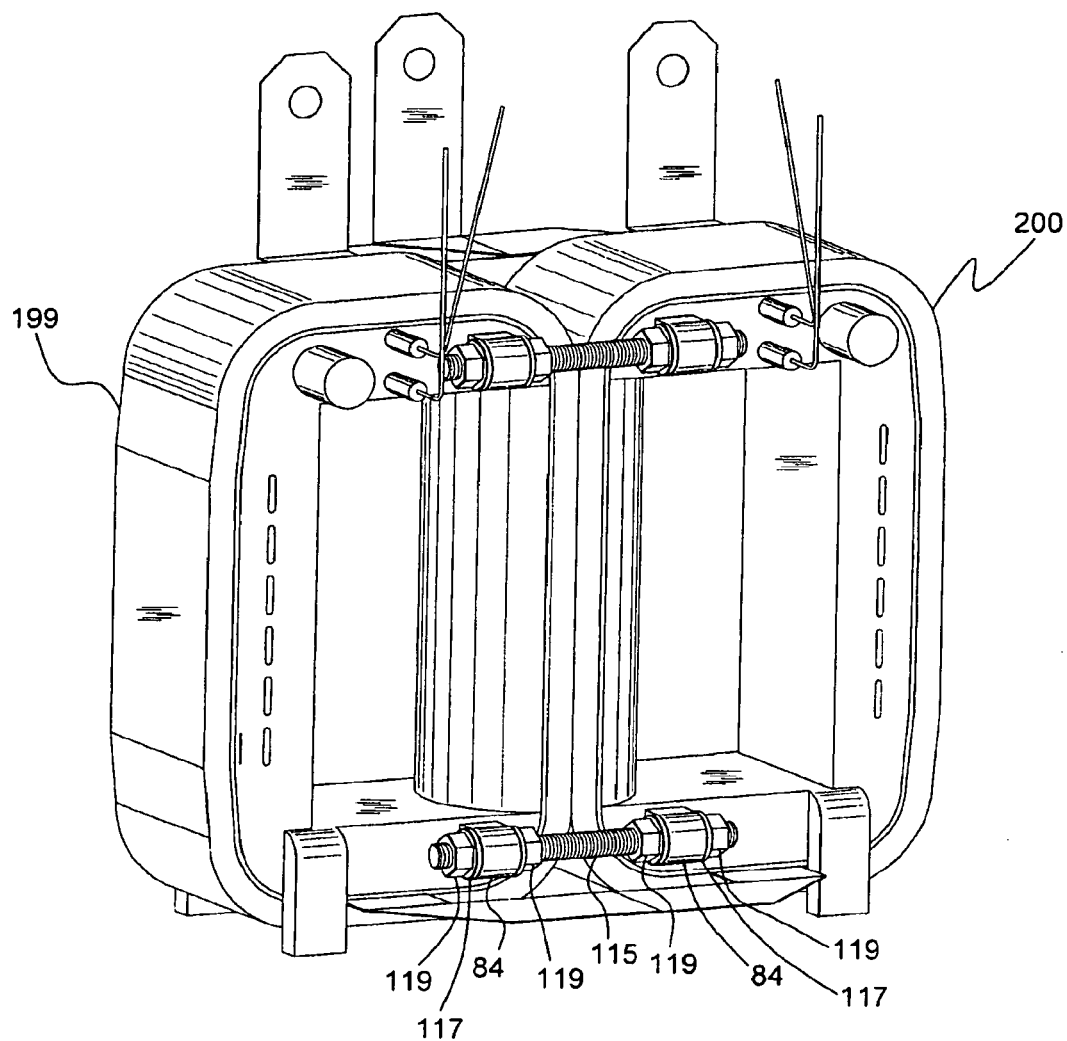
FIG. 31 is a perspective view showing two coil arrangements assembled back-to-back and secured before installing the core mandrel.
Figure 32:
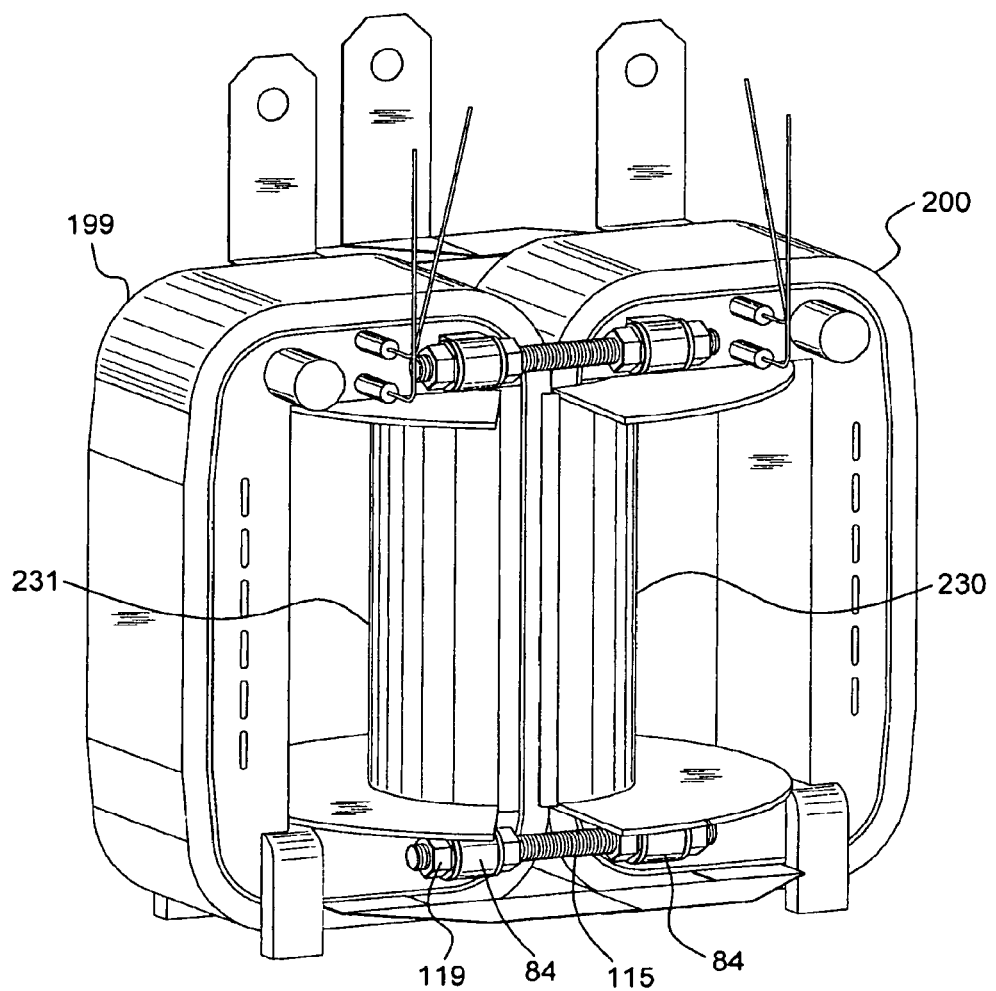
FIG. 32 is a perspective view showing the installation of the core mandrel around the central leg of two coil arrangements assembled back-to-back and secured.
Figure 33:
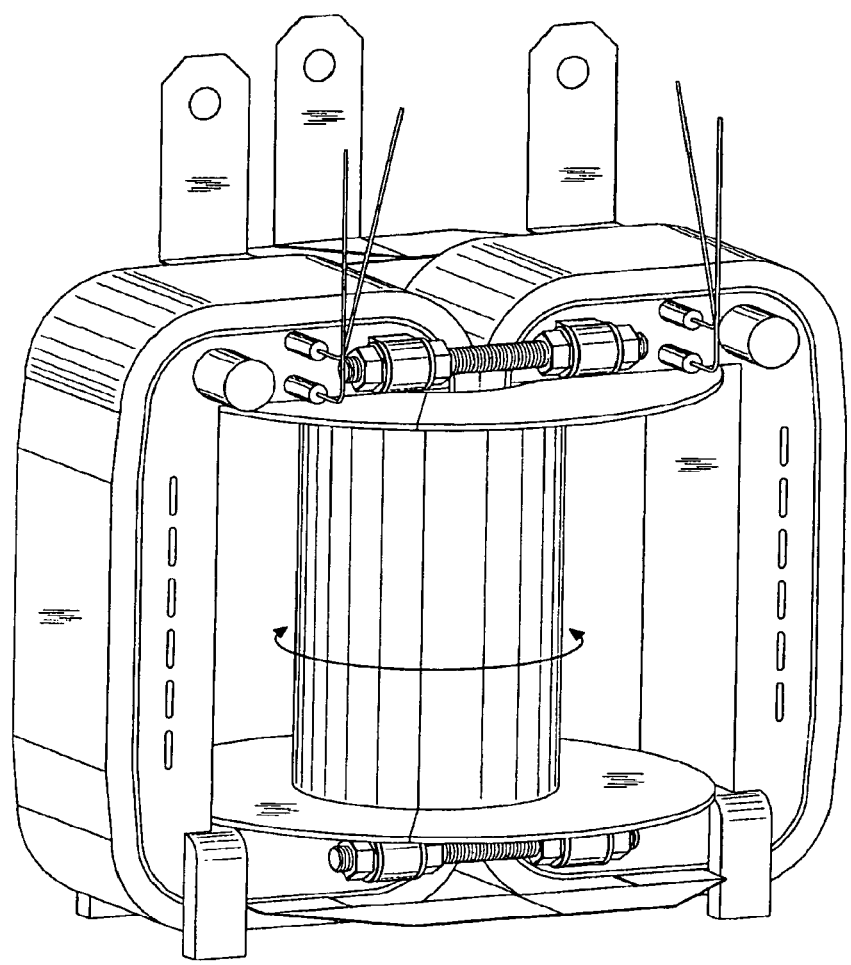
FIG. 33 is a perspective view showing an installation and rotation of a core mandrel around the central leg of two coil arrangements assembled back-to-back and secured.
Figure 34:
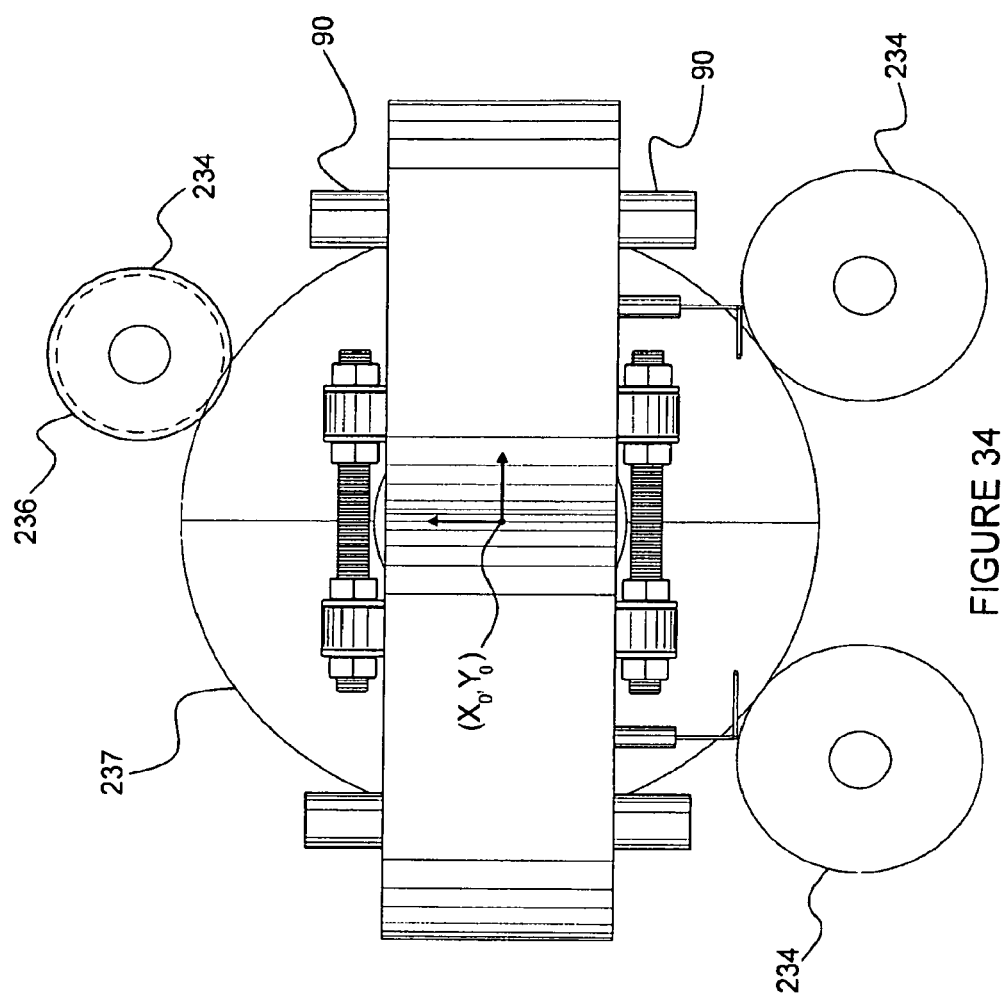
FIG. 34 is a top view of a system for rolling up a magnetic strip around a mandrel installed around the central leg of two coil arrangements assembled back-to-back and secured.
Figure 35:
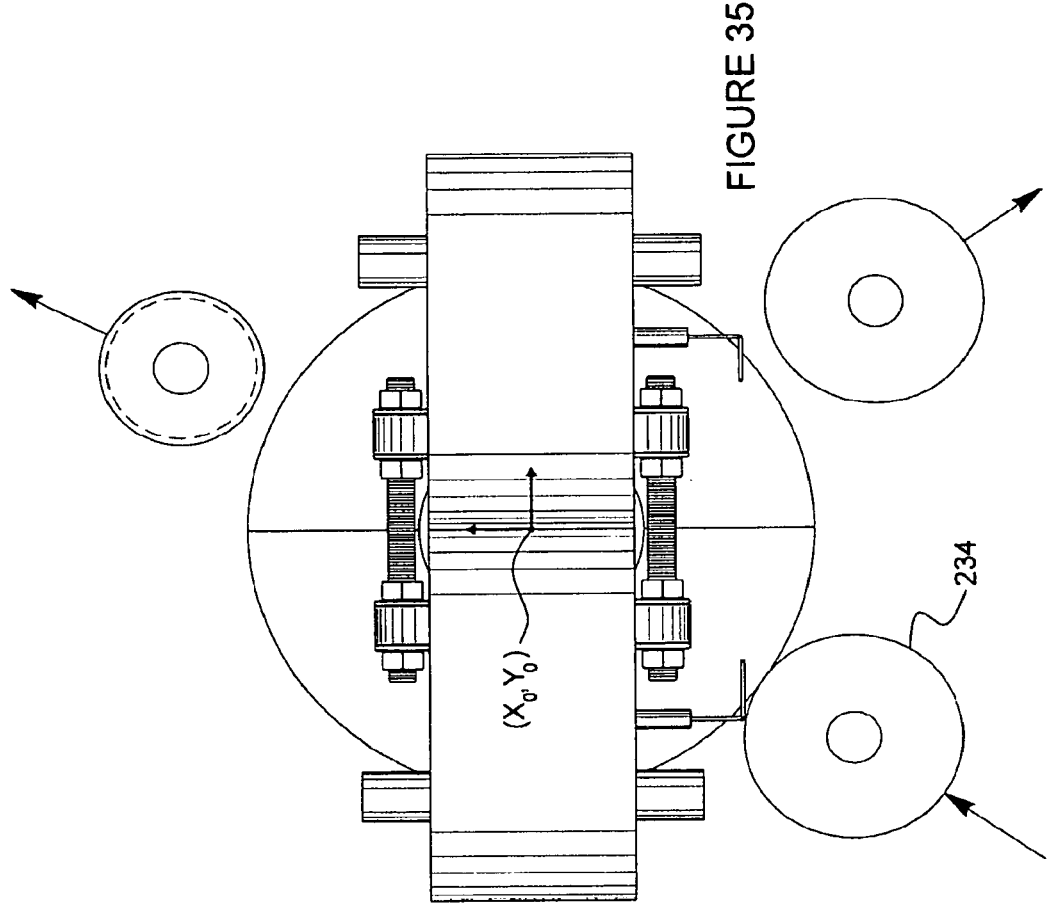
FIG. 35 is a top view of the system shown in FIG. 34 showing an adjustment procedure before the rolling up of a magnetic strip around a mandrel installed around the central leg of two coil arrangements assembled back-to-back and secured.

The distribution transformer of the present invention also provides a method to assemble the core with a back-to-back coil arrangement. FIGS. 30A to 30C show a mandrel assembly for rolling up a ribbon. It comprises two walls 230 and 231 each having an arc shape of a predetermined internal radius and a thickness, and having a height both at least equal to the width of an annealed iron-based amorphous metallic ribbon. Preferably, the wall 230 is provided on each of its two ends with an internal S-shaped pattern cavity 232 which is each intended to fit in an outer S-shape pattern cavity 233 located on both ends of the wall 231. When the two walls are aligned and pressed against each other, they will snap together as shown in FIG. 30B and they will form a cylindrical tube having the given internal radius and given height. The walls of the mandrel are preferably made of a pressed or moulded rigid insulating material, although stainless steel or any non-ferromagnetic material having good structural rigidity could also be used. Both ends of the walls have a half disc flange 170 such that when the two walls are snapped, a mandrel with flanges is formed. A binder can also be used to fuse the two walls and flanges together. Referring to FIG. 31, completed left-coil and right-coil arrangements 199 and 200 are put back-to-back and secured together with the threaded rods 115, nuts 119 and washers 117. The nuts 119 are positioned on the threaded rods 115 such that when the coil arrangements are pushed towards each other, the two arc shaped back to back limbs fit within a circular outline as shown in FIG. 3 and the coil arrangements are aligned. Then the nuts 119 are tightened to squeeze the protuberant portions 84 between the nuts 119, thus creating a complete rigid assembly having constant geometric dimensions from one assembly to the next. To assemble the core, in FIG. 32, the two walls 230 and 231 are mounted around the central circular limb of the back-to-back coil arrangement and are pressed together until they snap in place as shown in FIG. 33. When snapped in place, the cylindrical mandrel has an internal radius slightly greater than the outer radius of the circular outline of the two back to back arc shaped limbs and its height is slightly smaller than the height of coil supporting frames window opening in order to allow the mandrel to rotate freely around the limb. To roll up an annealed amorphous ribbon material onto the formed mandrel, the back-to-back coil arrangement is installed and held in place using the bollards 90 in a predetermined position by a retaining setup. Then, as shown in FIG. 34, at least three rollers 234 with at least one provided with small flanges 236 are brought by actuators to be positioned around the periphery of the mandrel flanges 237 with all rotating axes in parallel with the circular limb center axis $(X_0, Y_0)$. Three narrow rollers 234 can be used on each flange 237 of both sides of the mandrel to clear the access of the middle portion of the mandrel for the ribbon. The angular distance between rollers can be different as long as they are localized over an angle greater than 180 degrees to keep the mandrel from getting out of the axis of rotation. The internal distance between the flanges 236 of the rollers 234 from one side of the mandrel to the other is just wide enough to allow the width of the mandrel to fit in between to maintain its axial position in order to avoid frictional contact with one of the limbs surface of the supporting frames. The XY position for each of the three rollers 234 is precisely controlled by the actuators based on commands provided by a CPU. In order to rotate the mandrel and the accumulating ribbon, at least one of the rollers 234 is motorized. Since the back-to-back coil arrangement is installed and held in place in a predetermined position, the CPU knows the position of the circular limb center axis $(X_0, Y_0)$. If greater precision is needed, each roller can successively push on the mandrel until it leans against the circular limb and then the CPU records the corresponding XY position, as shown in FIG. 35. With the recorded data and the radius of each roller 324, the CPU computes the center position $(X_0, Y_0)$ of the circular limb. Once the core is completed, the nuts 119 are loosened and positioned on the threaded rods 115 such that when the two coil arrangements are pushed away, they will lean against the internal face of the core mandrel as shown in FIG. 4 and will be aligned. It is preferable to place the transformer kernel in upright position to allow the core to lean on the provided flat surface of the two horizontal bottom limbs of the coil frames, therefore providing support to the core. Then, the nuts 119 are tightened to squeeze the protuberant portions 84 between the nuts, thus creating a complete rigid transformer core-coil assembly. The spacers 37 are then inserted between the two coil arrangements and the leads are welded together.

Preferably, the ribbon rolling process of FIG. 34 includes an automated ribbon feeding reel switcher to provide uninterrupted ribbon supply and a ribbon tensioner to control the tension in the ribbon during rolling up. Continuous supply of ribbon can be provided by bringing a filled reel in rotation in proximity of the emptying reel, and by launching and fixing the ribbon end of the filled reel to the trailing end of the ribbon leaving the emptying reel. Preferably, continuous rolling-up of a ribbon to form cores of transformer kernels can be provided by bringing the mandrel of a new coil arrangement in rotation in proximity of the filling mandrel of the core-coil arrangement being formed, and by cutting the ribbon and fixing the incoming ribbon end to the mandrel while the completed transformer kernel is moved away.

Figure 36:
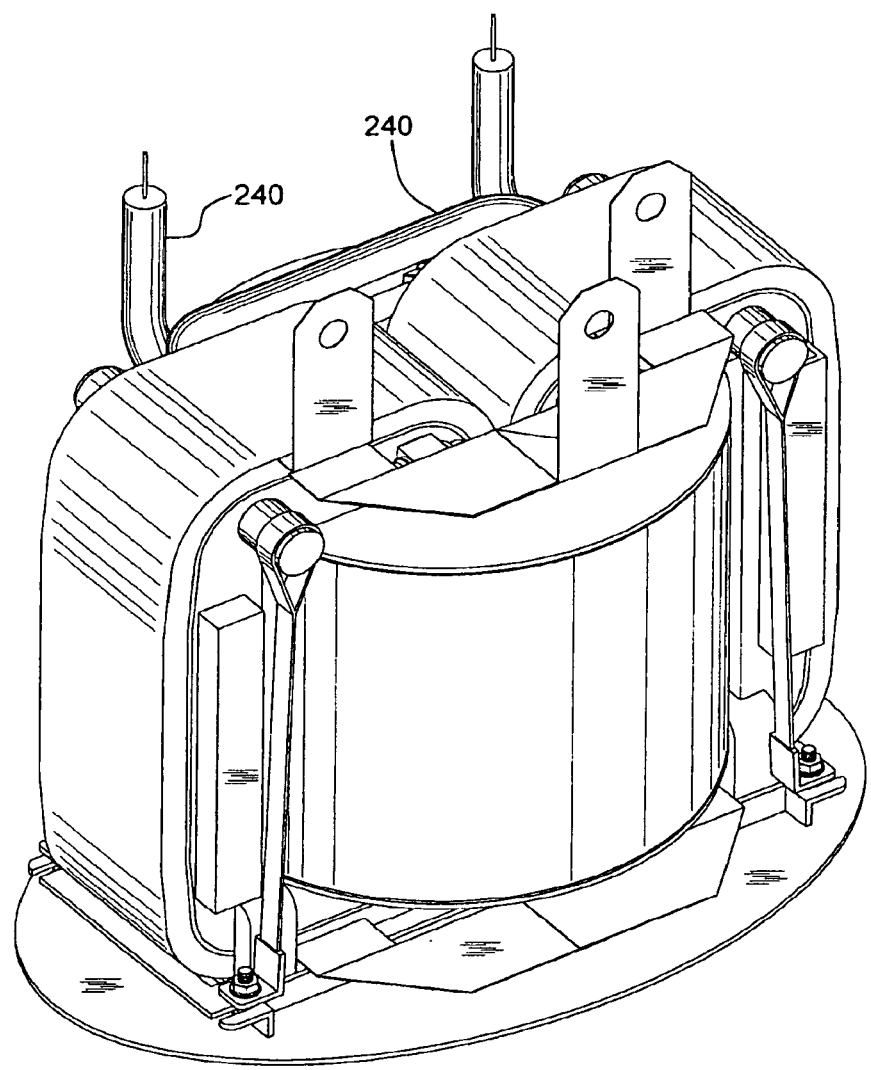
FIG. 36 is a perspective view from a first angle showing a completed transformer kernel assembly attached to a base on the bottom of an oval tank.
Figure 37:
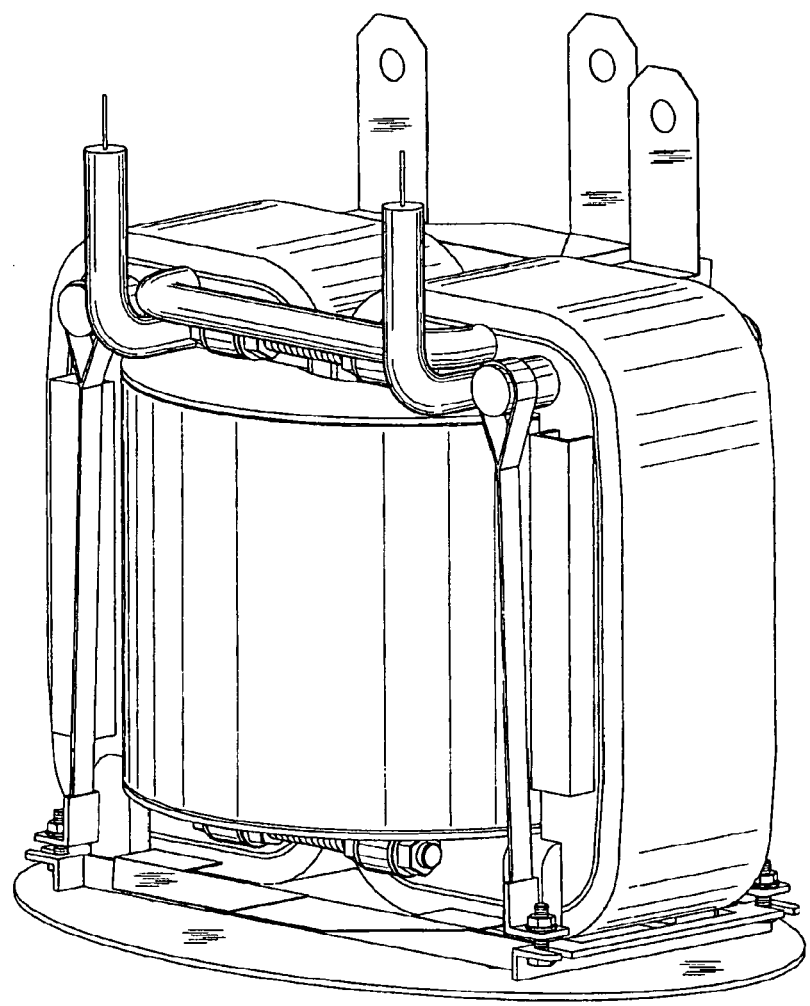
FIG. 37 is a perspective view from a second angle showing a completed transformer kernel assembly attached to a base frame on the bottom of an oval tank.
Figure 38:
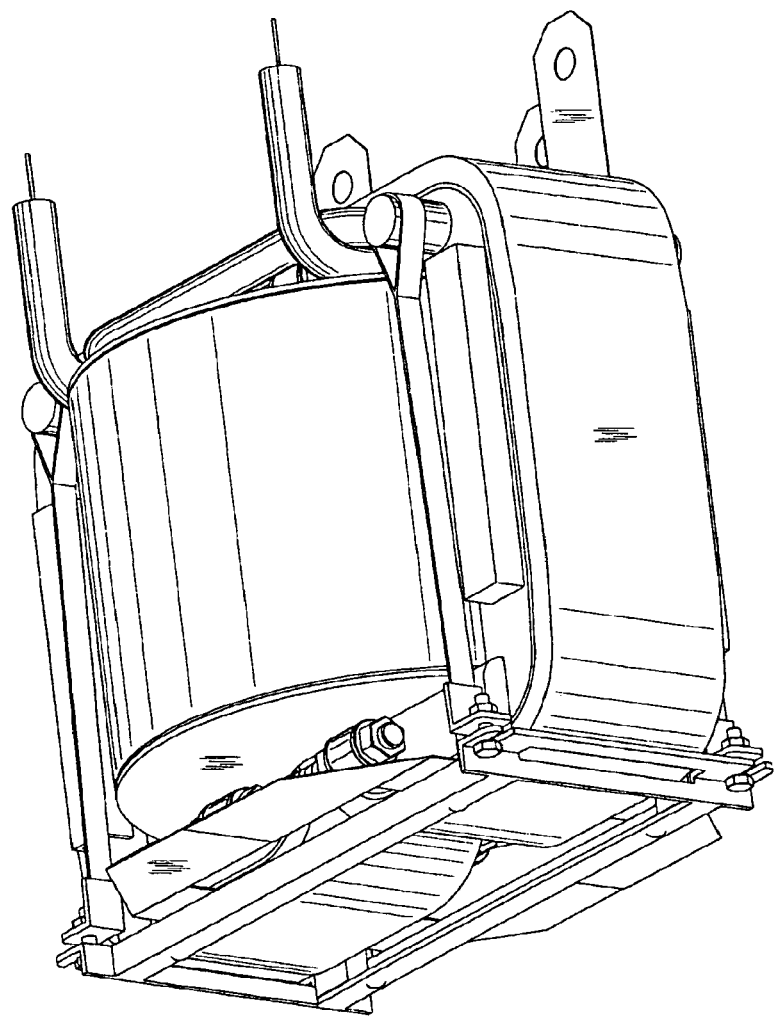
FIG. 38 is a perspective view from a third angle showing a completed transformer kernel assembly attached to a base frame.

FIGS. 36 to 38 show a final transformer kernel assembled according to the present invention. Insulating sleeves 240 have been added around the primary coil external leads. Insulating sleeves could also be provided on the secondary leads if required. However, the preformed shapes done by a robot manipulating arm when the coils were formed help avoid usage of insulating sleeves on the secondary leads as they are preformed to fit in the transformer tank and to be aligned with the tank low voltage bushings for easy connection. This will reduce labour and costs for tanking the kernel.

Figure 39:
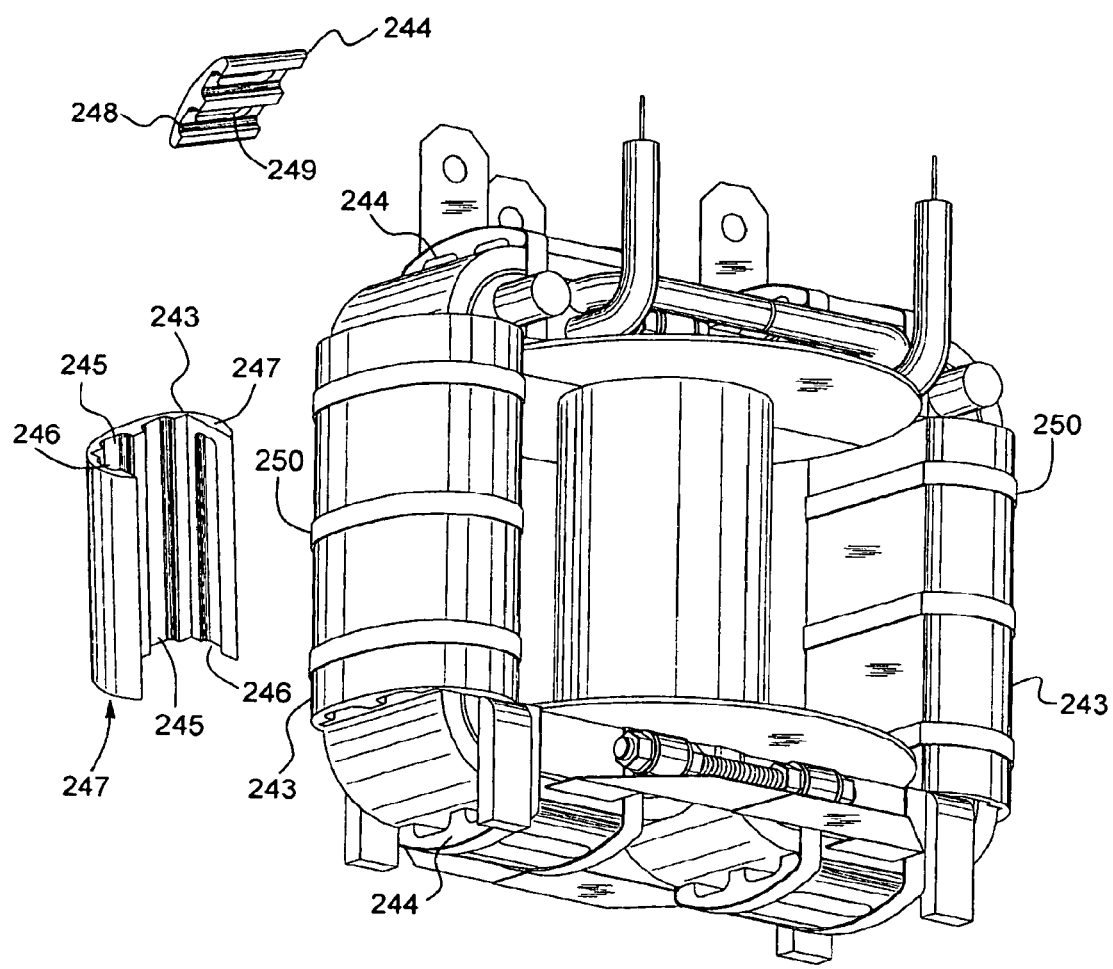
FIG. 39 is a perspective view from a third angle of a transformer kernel assembly without the core and comprising bracing members to secure the coils on the supporting frames.

FIG. 39 shows the core-coil arrangement further comprising bracing members 243 and 244 that are held against the external limbs of the coil arrangement by straps 250 once the core is formed (core is not shown for purpose of clarity). The bracing member 243 is preferably made of an insulating material and comprises slots 245 that will provide vertical ducts along the secondary coil surface for cooling fluid to flow up via a chimney effect. Additional vertical slots 246 are formed in the bracing member with opposite upper and lower obstructions 247 to replace the side ducts 109 and 111 of FIG. 17. These ducts increase cooling efficiency by providing increased flow of fluid near the surface of the coil. The bracing member 244 also includes slots 248 and an opening 249 to allow a flow of cooling fluid near the top and bottom surface of the secondary coils. The bracing members will increase the transformer ability to withstand repulsion forces between the primary and secondary coils under short-circuit conditions. The frame 243 will work with supporting frames 244 and 245 to keep the primary and secondary sub-coils from separating apart due to the repulsive forces created by the short-circuit currents flowing in respective sub-coils.

Figure 40:
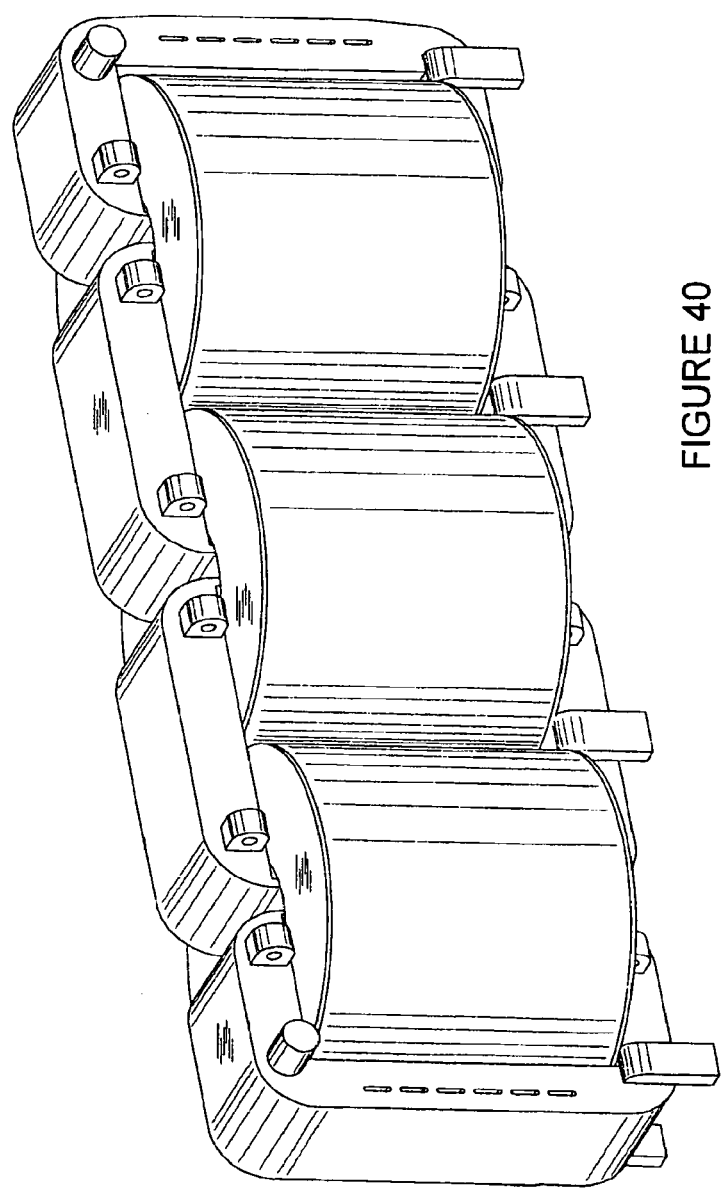
FIG. 40 is a perspective view showing a three-phase transformer kernel comprising a series of back-to-back coil arrangements and three circular cores.

More than two core-coil arrangements produced with the system of the present invention can be grouped back to back together to produce a three-phase transformer as shown in FIG. 40.

Figure 41:
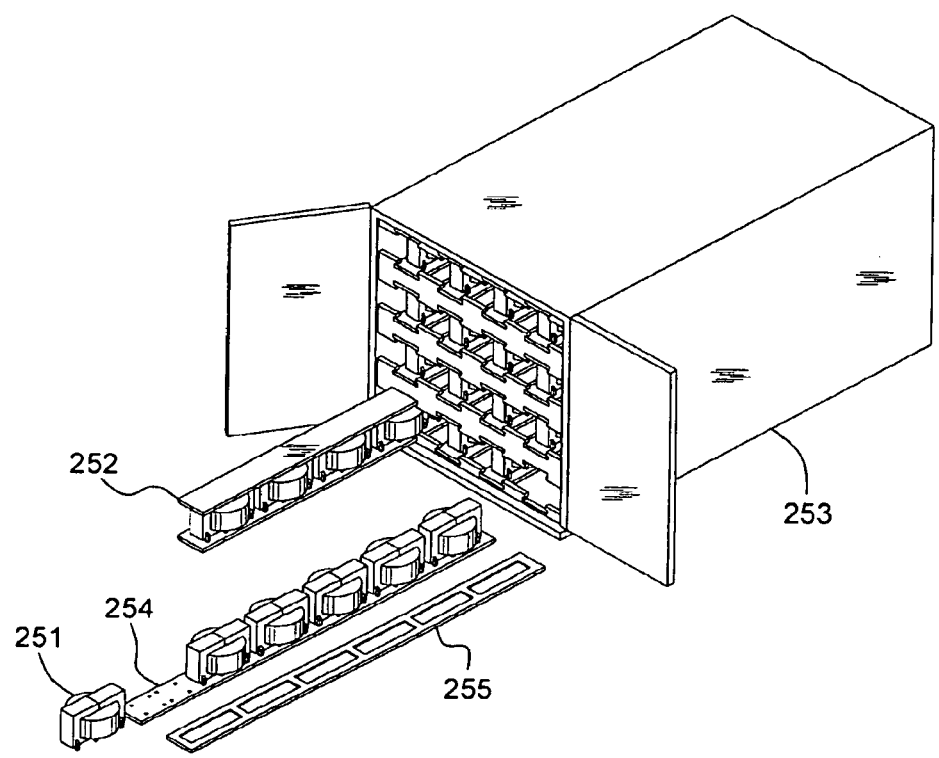
FIG. 41 is a perspective view of a container used for storing and shipping multiple transformer kernels.

The manufacturing of transformer kernels in the present invention can be fully automated and is compatible for mass production of transformer kernels using compact assembling equipments occupying small floor space. Mass production of transformer kernels at a given standard efficiency becomes possible through sub-component manufacturers which will provide the kernels to transformer assemblers. Such centralization of transformer kernel manufacturing brings economies of scale by eliminating significant core and coil assembling equipments, labour and floor space required at each transformer assembler plant which contributes to increase the cost of the transformer. Referring to FIG. 41, core-coil arrangements produced with the system of the present invention can be grouped in rows on a on a rack 252 and multiple racks 252 containing a number of coil arrangements 251 can be put in a sealed container 253 for shipment to transformer assemblers which will assemble each core-coil arrangement with the tank, oil and other required accessories. The rack comprises a base means 254 with foot-prints for supporting a group of core-coil arrangements and a top means 255 for securing the group of core-coil arrangements with the base. Each rack of core-coil arrangements can be stacked to fill the container height. Also, each rack of core-coil arrangements can be wrapped with a plastic film in order to be protected from dust. An efficient shipping enclosure is therefore provided for shipping the transformer kernels in quantity from the transformer kernel manufacturer to transformer assemblers.

Referring to FIG. 42, a distribution transformer final assembly comprising an oval tank which is capable of enclosing the transformer kernel of the present invention is shown. Such a distribution transformer will have a centre of gravity located closer to the pole attaching bracket, thus putting less stress on the holding bracket.

Although preferred embodiments of the present invention have been described in detailed herein and illustrated in the accompanying drawings, it is to be understood that the invention is not limited to these precise embodiments and that various changes and modifications may be effected therein without departing from the scope or spirit of the present invention.

What is claimed:

1. A support frame for an electrical transformer assembly, comprising:
   (a) two loop-shaped parts, each loop-shaped part including a plurality of limbs, each limb having a peripheral recessed portion in which a primary electrical coil is mountable, and at least one secondary coil mountable in piggyback on said primary electrical coil, at least one limb of each loop-shaped part having a straight section;
   (b) an adjustable attaching means for attaching one of the loop-shaped parts with respect to the other loop-shaped part and adjusting a distance therebetween, so that only the straight sections are adjacent and form a central leg, the central leg being for receiving a magnetic core distinct from the attaching means; and
   (c) a securing means for securing the loop-shaped parts to a transformer tank, wherein the securing means comprises:
      (i) a base frame;
      (ii) a first fixing means for fixing the loop-shaped parts to the base frame; and
      (iii) a second fixing means for fixing the base frame to the transformer tank.

2. The support frame according to claim 1, wherein the first fixing means fixes a bottom portion of the loop-shaped parts to the base frame.

3. The support frame according to claim 1, wherein the first fixing means fixes a top portion of the loop-shaped parts to the base frame.

4. The support frame according to claim 2, wherein the securing means comprises alignment means for aligning the loop-shaped parts with respect to the base frame.

5. The support frame according to claim 3, wherein the securing means comprises an alignment means for aligning the loop-shaped parts with respect to the base frame.

6. The support frame according to claim 3, wherein the top portion of the loop-shaped parts further provides a handling means for handling and displacing the support frame from one location to another.

7. A loop-shaped part of a support frame of an electrical transformer assembly, comprising:
   (a) a plurality of limbs on which a primary electrical coil and at least one secondary electrical coil are mountable, each limb having a peripheral recessed portion in which the primary electrical coil is mountable, and said at least one secondary coil being mountable in piggyback on said primary electrical coil, one limb of the loop-shaped part having a straight section, the peripheral recessed portion comprising:
      (i) a base portion for supporting said primary electrical coil; and
      (ii) slanting sidewall portions extending from both sides of said base portion, said slanting portions comprising a plurality of steps allowing a stacking of rows of conductors and insulating layers of the primary electrical coil,
wherein predetermined ones of said plurality of steps are formed for bridging a last coil loop of a row with a first coil loop on an adjacent row.

8. The loop-shaped part according to claim 7, wherein said last and first coil loops face a raiser of a corresponding step.

9. The loop-shaped part according to claim 7, wherein at least one of the adjacent rows extend beyond a corresponding row on either one of both sides of said base portion.

10. The loop-shaped part according to claim 8, wherein at least one of the adjacent rows extend beyond a corresponding row on either one of both sides of said base portion.

11. The loop-shaped part according to claim 7, wherein the height of a step in a corner between adjacent perpendicular limbs is gradually reduced.

12. The loop-shaped part according to claim 7, wherein one of said plurality of limbs further provides a tap input opening on one side of the loop-shaped part, allowing connection of a tap to the coils, once mounted, and wherein a height of a step along a limb is increased by a length to accommodate said tap input opening.

13. The support frame according to claim 7, wherein a selected one of said plurality of limbs further provides channels for conducting fluids adjacently and transversely to the coils, each of the channels having one inlet on one side of said one limb and one outlet on the other side of said one limb.

14. The support frame according to claim 13, wherein the channels form an angle with respect to the horizontal to produce a chimney effect in the fluids.

15. The support frame according to claim 13, further comprising a first chimney for enclosing the inlets of the channels, the first chimney having a closed top and an open bottom, and a second chimney for enclosing the outlets of the channels, the second chimney having a closed bottom and an open top, to produce, by means of the first chimney and the second chimney, a chimney effect in the fluids.

16. The support frame according to claim 13, wherein the channels are formed by transversal grooves in the recessed portion of the loop-shaped parts.

17. The support frame according claim 13, wherein the channels are delimited by insulating spacers positioned between adjacent rows of coils once mounted on the loop-shaped parts.

18. The support frame according to claim 7, further comprising at least one bracing member mountable on an external surface of at least one of said limbs for securing the coils, once mounted, in position within the loop-shaped parts.

19. The support frame according to claim 18, wherein said at least one bracing member provides channels for conducting fluids adjacently to the coils, each of the channels provided by said at least one bracing member having an inlet and an outlet for allowing circulation by a chimney effect.

* * * * *